(12) United States Patent
Chikaraishi et al.

(10) Patent No.: US 12,323,011 B2
(45) Date of Patent: Jun. 3, 2025

(54) ELECTRIC WORK MACHINE

(71) Applicant: MAKITA CORPORATION, Anjo (JP)

(72) Inventors: Makoto Chikaraishi, Anjo (JP);
Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 257 days.

(21) Appl. No.: 17/936,035

(22) Filed: Sep. 28, 2022

(65) Prior Publication Data

US 2023/0119735 A1  Apr. 20, 2023

(30) Foreign Application Priority Data

Oct. 18, 2021  (JP) .................................. 2021-170387

(51) Int. Cl.
| | |
|---|---|
| *H02K 11/25* | (2016.01) |
| *H02K 1/16* | (2006.01) |
| *H02K 3/12* | (2006.01) |
| *H02K 11/33* | (2016.01) |

(52) U.S. Cl.
CPC .............. *H02K 11/25* (2016.01); *H02K 1/16* (2013.01); *H02K 3/12* (2013.01); *H02K 11/33* (2016.01)

(58) Field of Classification Search
CPC ............ H02K 1/16; H02K 3/12; H02K 3/522; H02K 7/14; H02K 7/145; H02K 11/25; H02K 11/33; H02K 5/225; H02K 11/215; H02K 2203/09
USPC ............................................ 310/68 B, 68 C
See application file for complete search history.

(56) References Cited

U.S. PATENT DOCUMENTS

| | | | |
|---|---|---|---|
| 2003/0193768 A1 | 10/2003 | Boischio | |
| 2009/0140614 A1* | 6/2009 | Heim ................... | H02K 11/25 |
| | | | 310/68 C |
| 2015/0155760 A1 | 6/2015 | Bessho et al. | |

(Continued)

FOREIGN PATENT DOCUMENTS

| | | |
|---|---|---|
| JP | 2003092858 A | 3/2003 |
| JP | 2008301633 A | 12/2008 |

(Continued)

OTHER PUBLICATIONS

Office Action from the Japanese Patent Office dispatched Mar. 19, 2025 in counterpart Japanese application No. 2021-170387, and machine translation thereof.

*Primary Examiner* — Alexander A Singh
(74) *Attorney, Agent, or Firm* — J-TEK LAW PLLC; Jeffrey D. Tekanic; Scott T. Wakeman

(57) ABSTRACT

An electric work machine (1) includes: a motor (6) having a rotor (23), which rotates about a rotational axis relative to a stator (22A; 22B; 22C; 22D); an output part (8) driven by the rotor; and a temperature-detecting device (101; 111; 121; 131) disposed on or in the stator. The stator includes: a stator core (33; 330) having teeth (38; 380), which radially protrude from a yoke (37); an insulator (34; 340), which has tooth-covering parts (42; 420) that respectively cover at least a portion of surfaces of the respective teeth and is fixed to the stator core; and coils (35; 350) respectively wound on the teeth over the tooth-covering parts. The temperature-detecting device is disposed in a recess (56) provided on (in) the insulator.

20 Claims, 32 Drawing Sheets

(56) References Cited

U.S. PATENT DOCUMENTS

2015/0349611 A1* 12/2015 Hino ............... H02K 11/25
                                                310/68 C
2021/0091640 A1   3/2021 Aoyama
2022/0085698 A1*  3/2022 Niwa ............... H02K 11/25

FOREIGN PATENT DOCUMENTS

| JP | 2015106955 A | 6/2015 | |
|----|---|---|---|
| JP | 2019180165 A | 10/2019 | |
| WO | WO-2020137911 A1 * | 7/2020 | ............ B25F 5/00 |

* cited by examiner

FIG.5
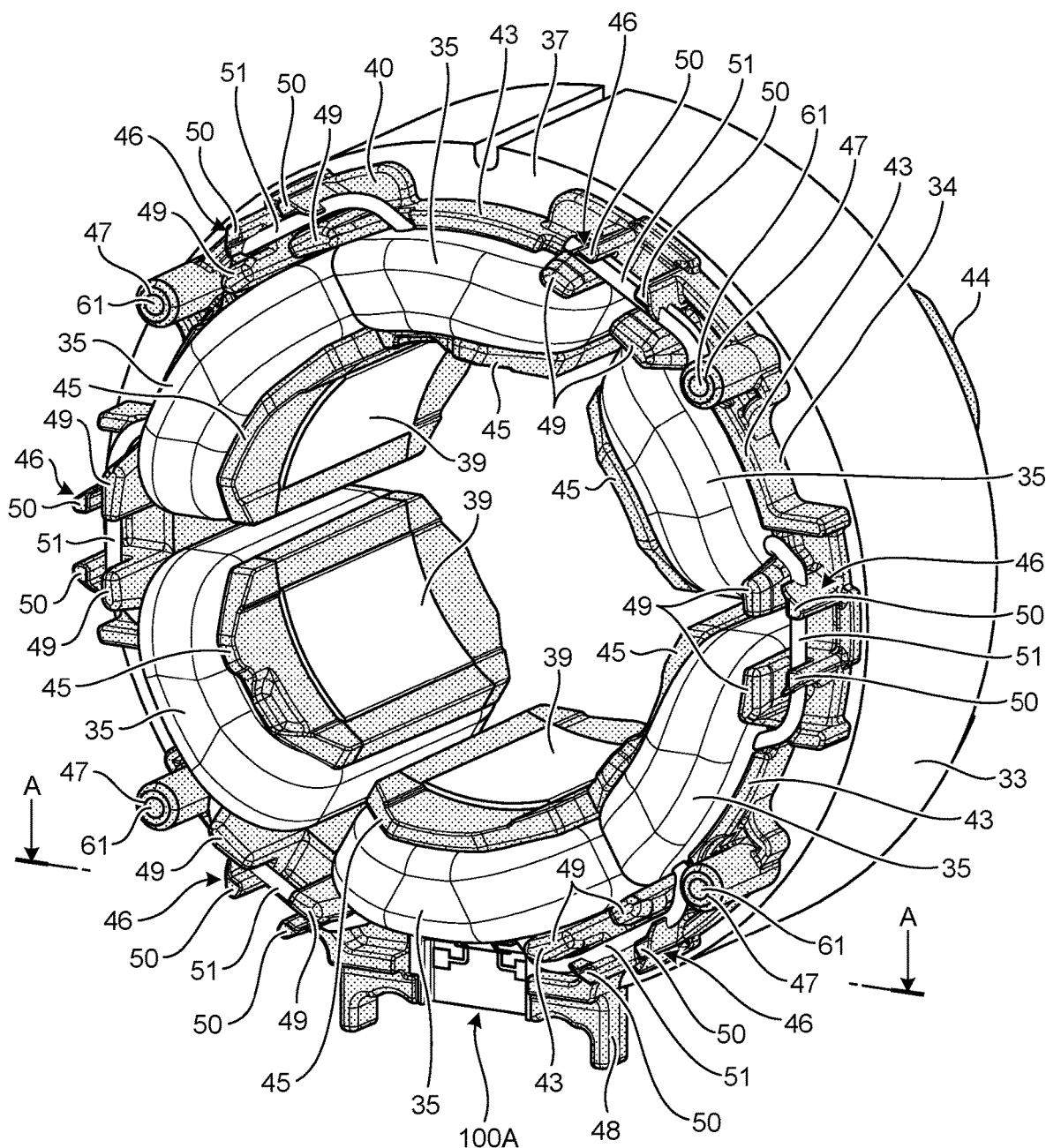
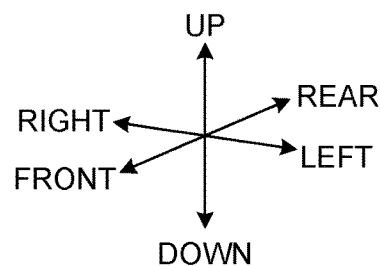

FIG.6
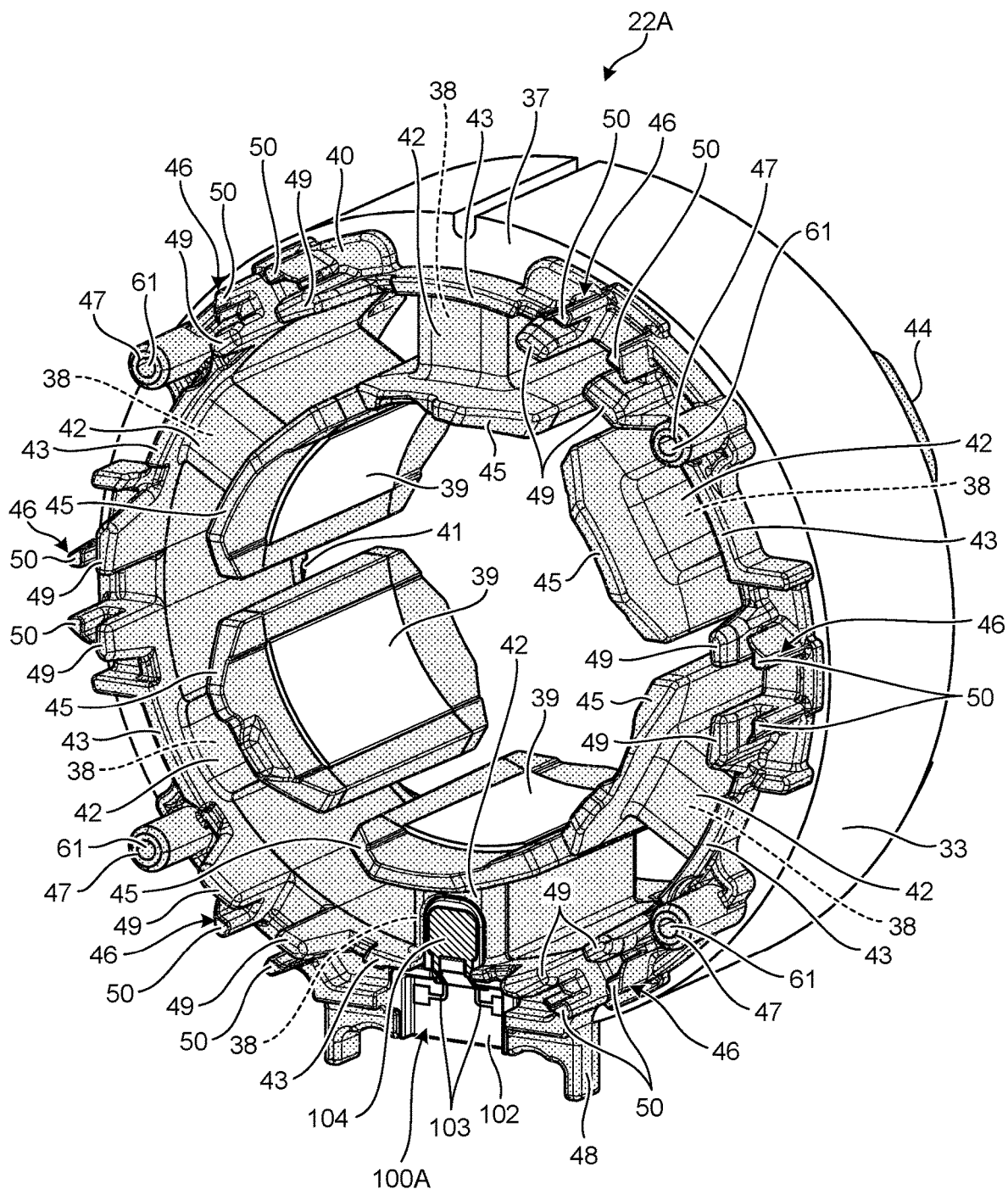
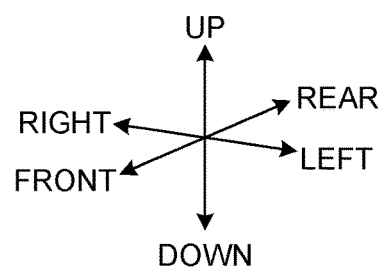

FIG.12
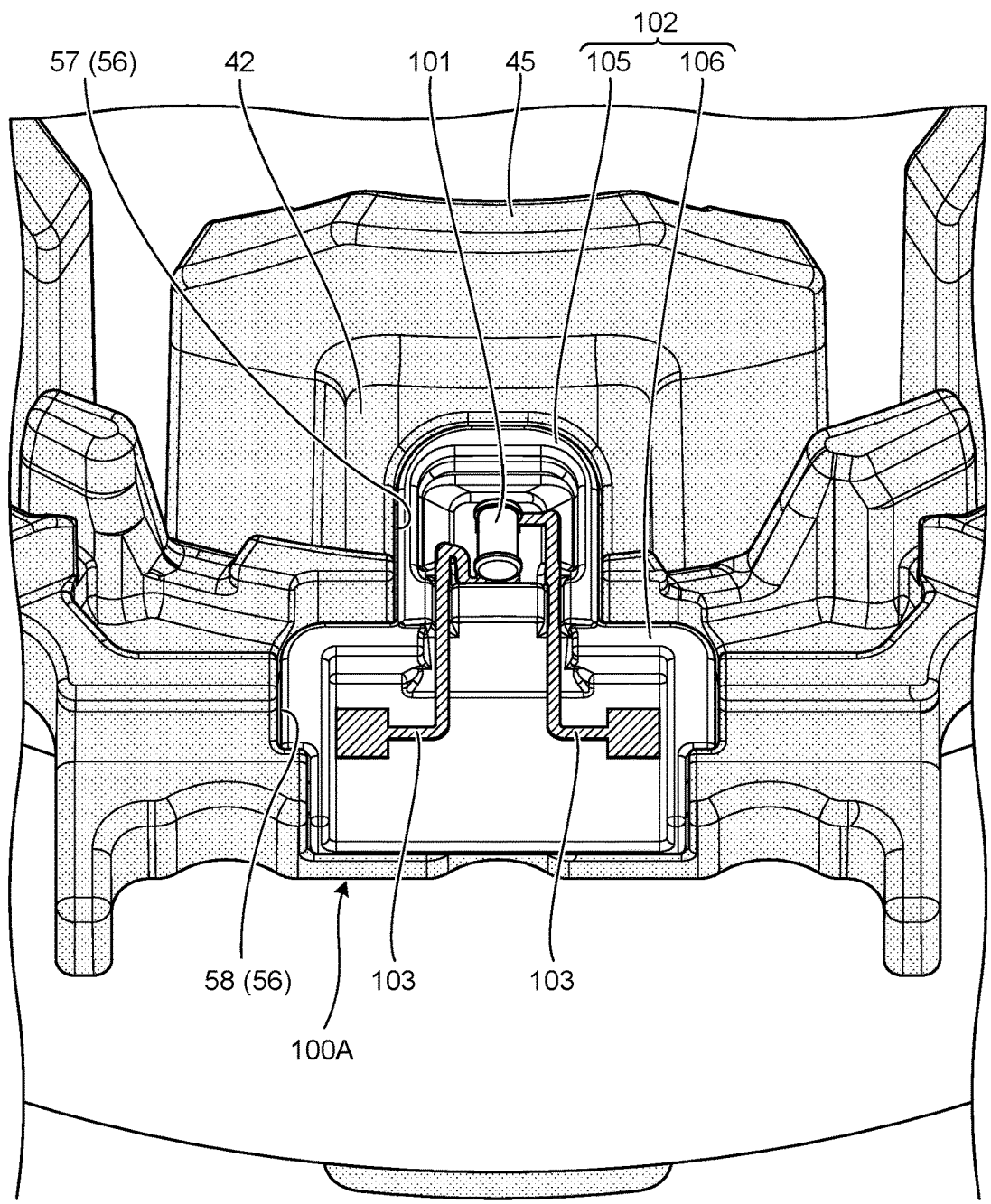
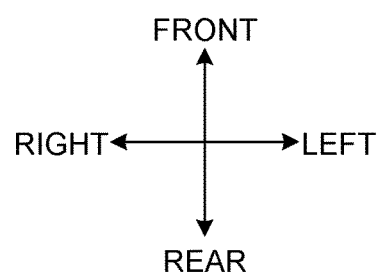

FIG.13
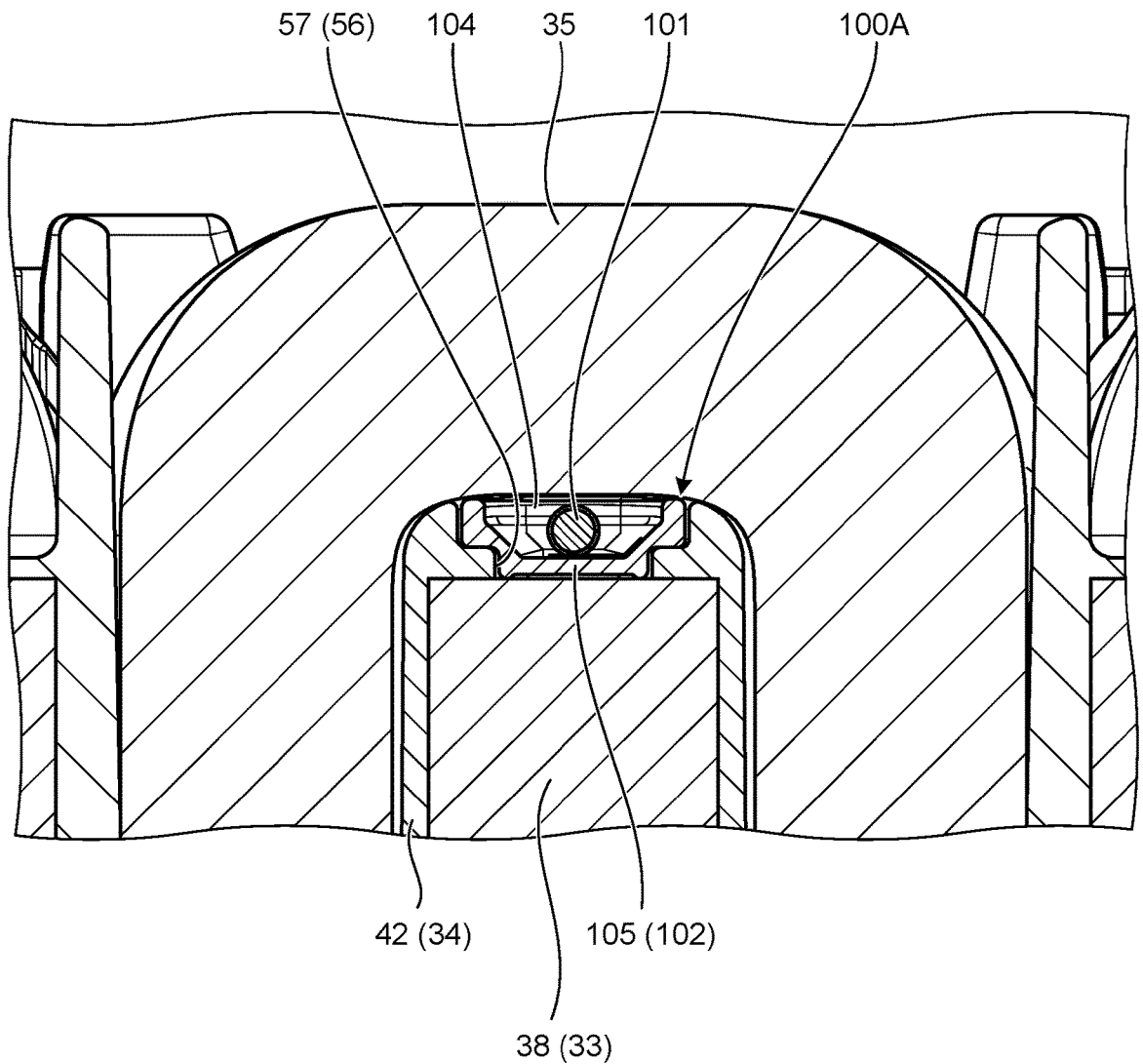
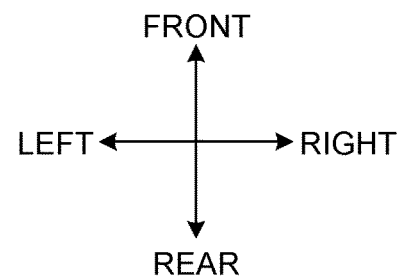

FIG.14
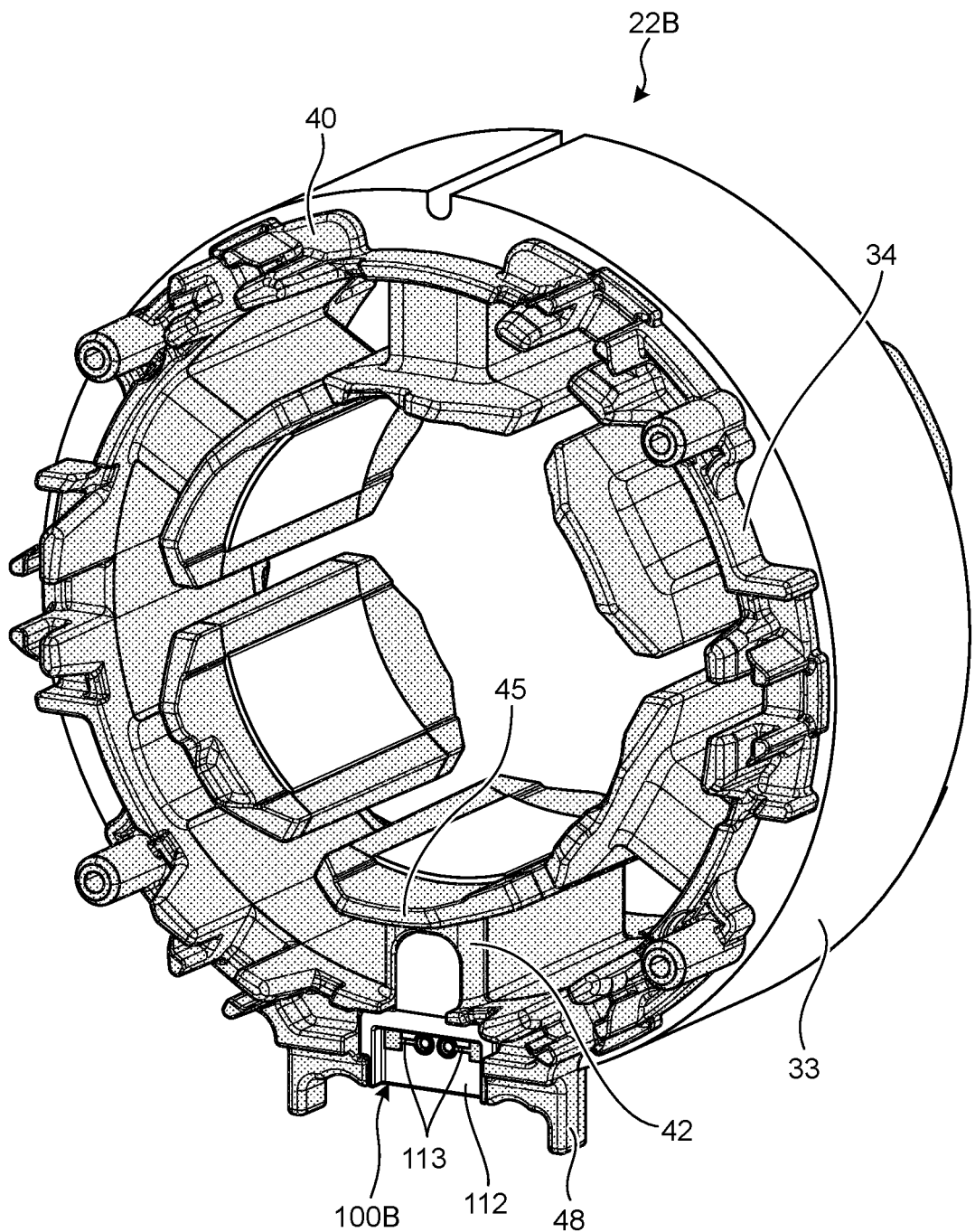
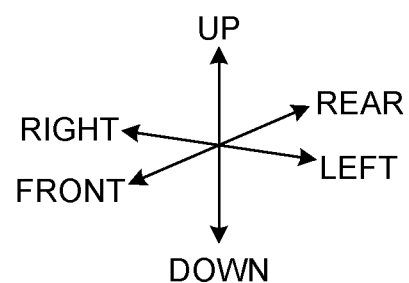

FIG.18
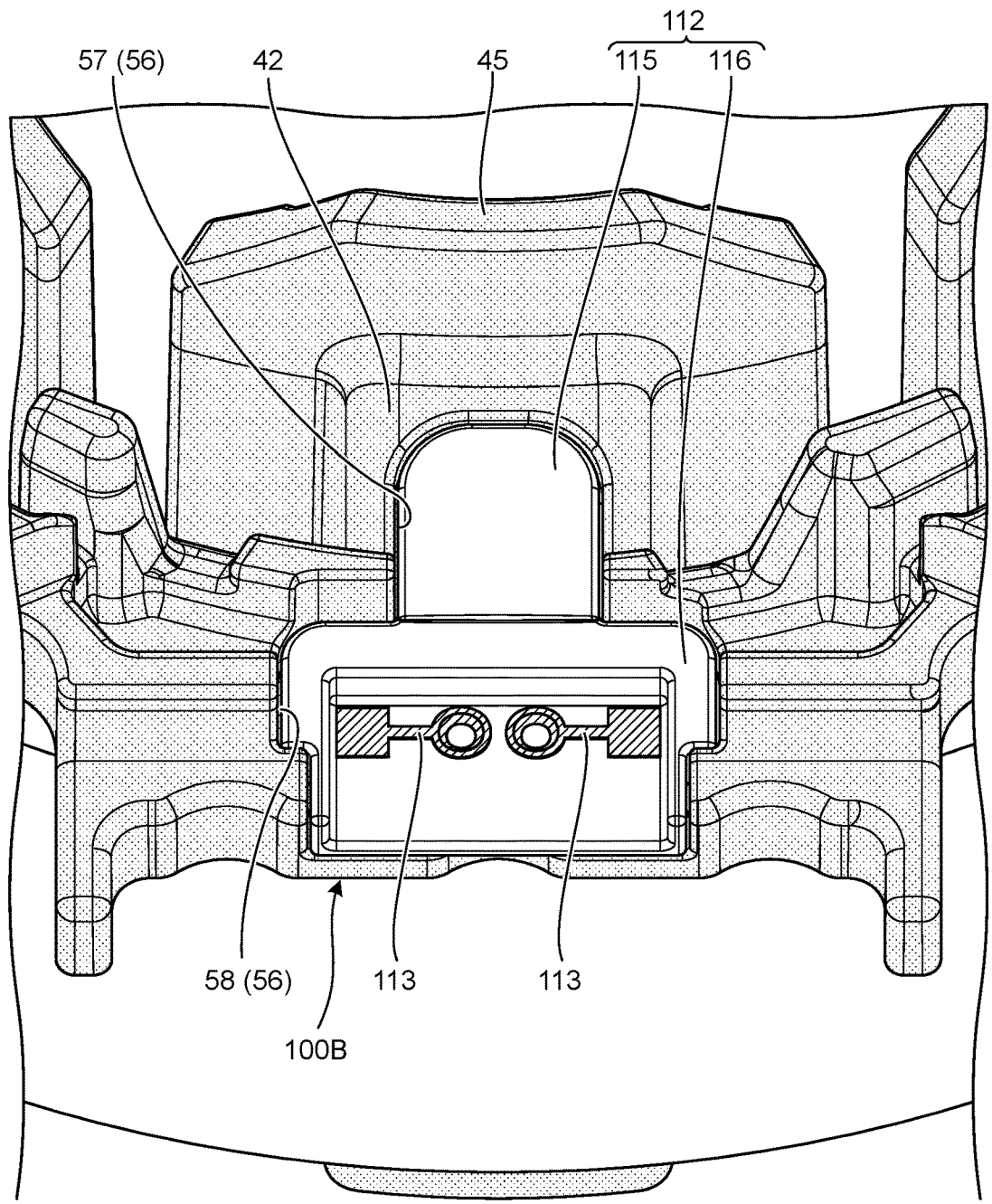
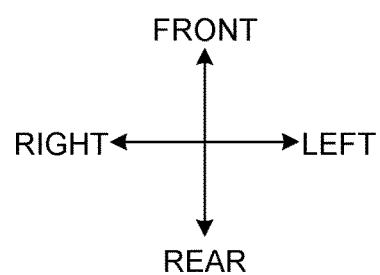

FIG.19
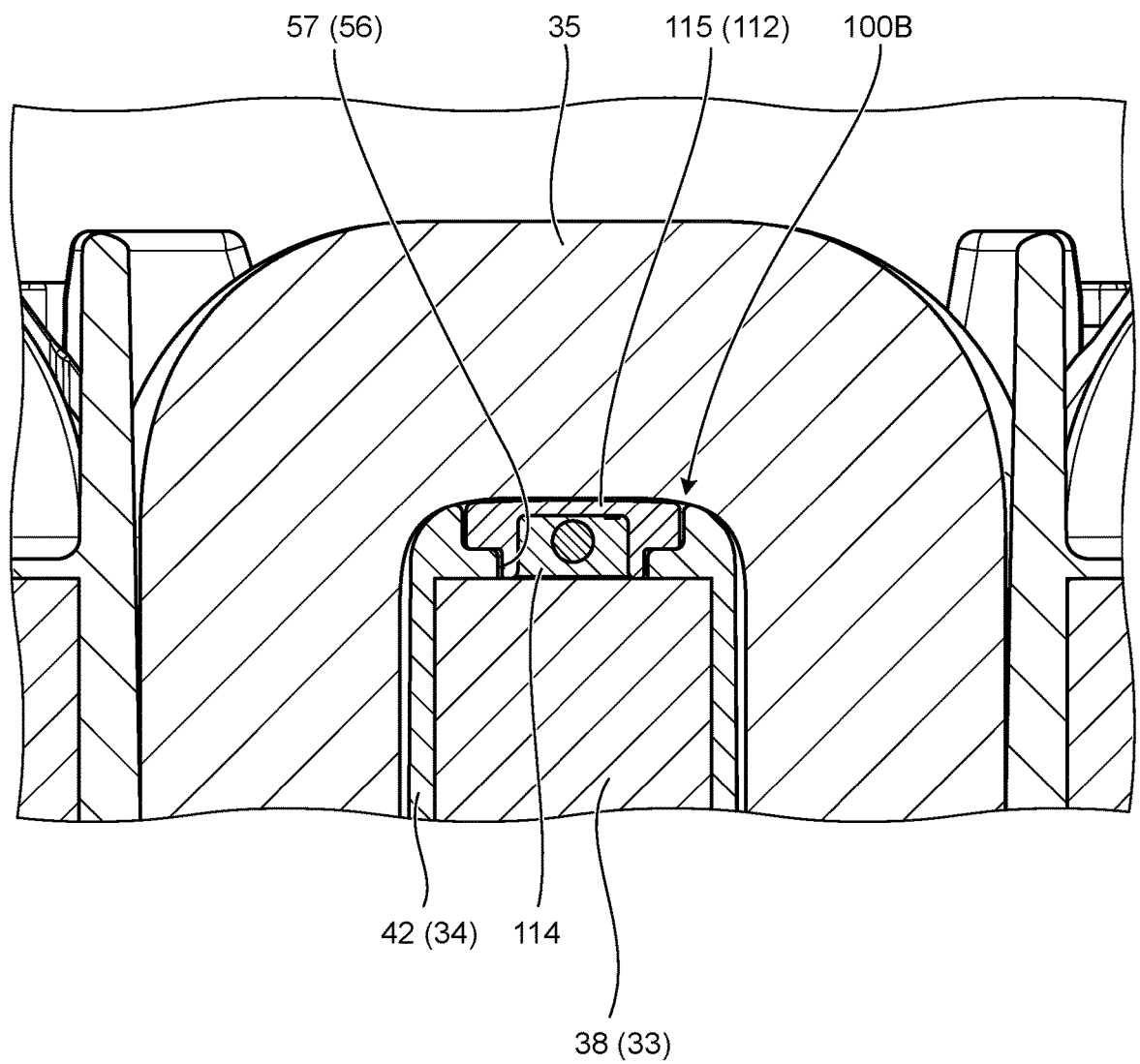
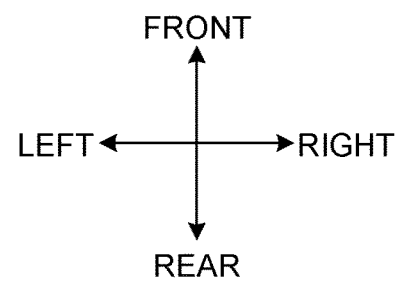

FIG.20
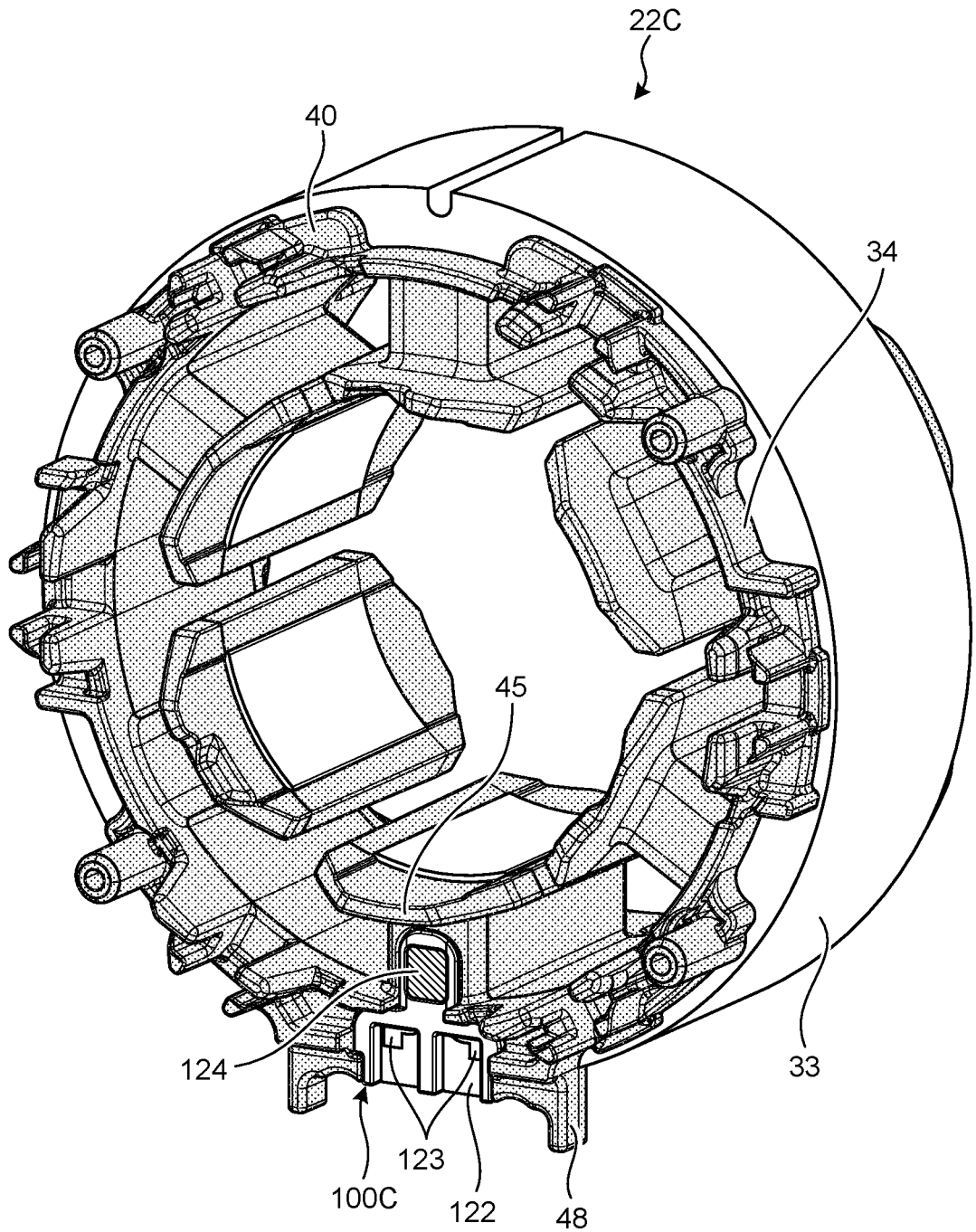
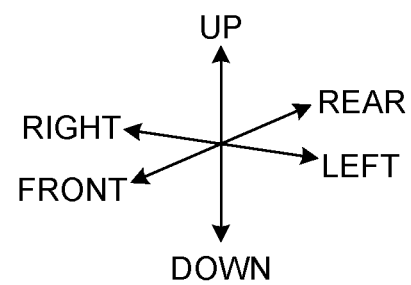

FIG.24
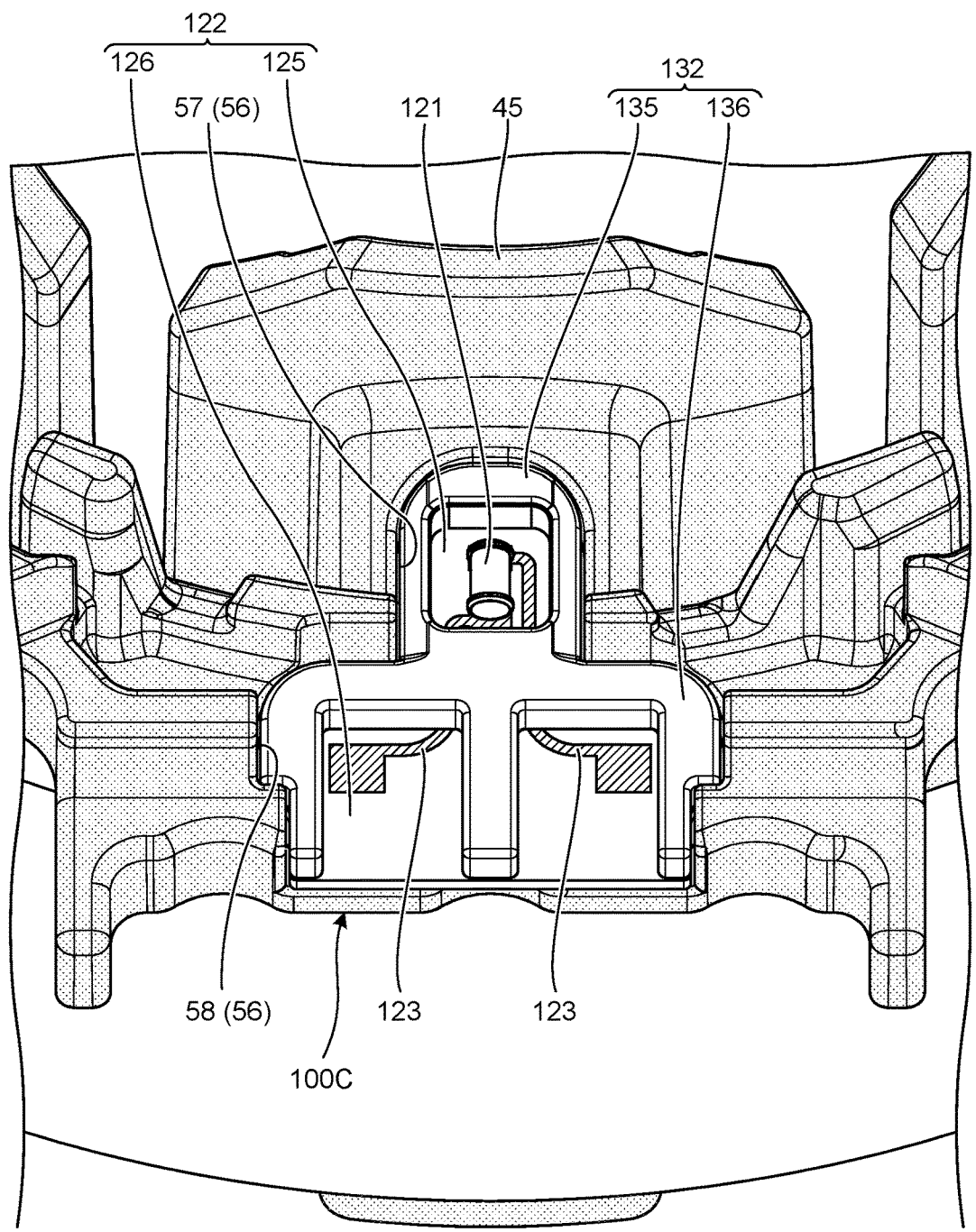
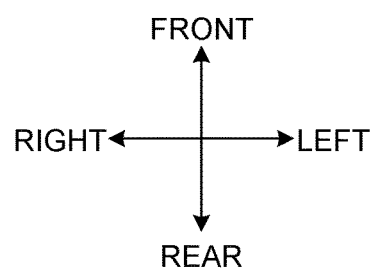

FIG.25
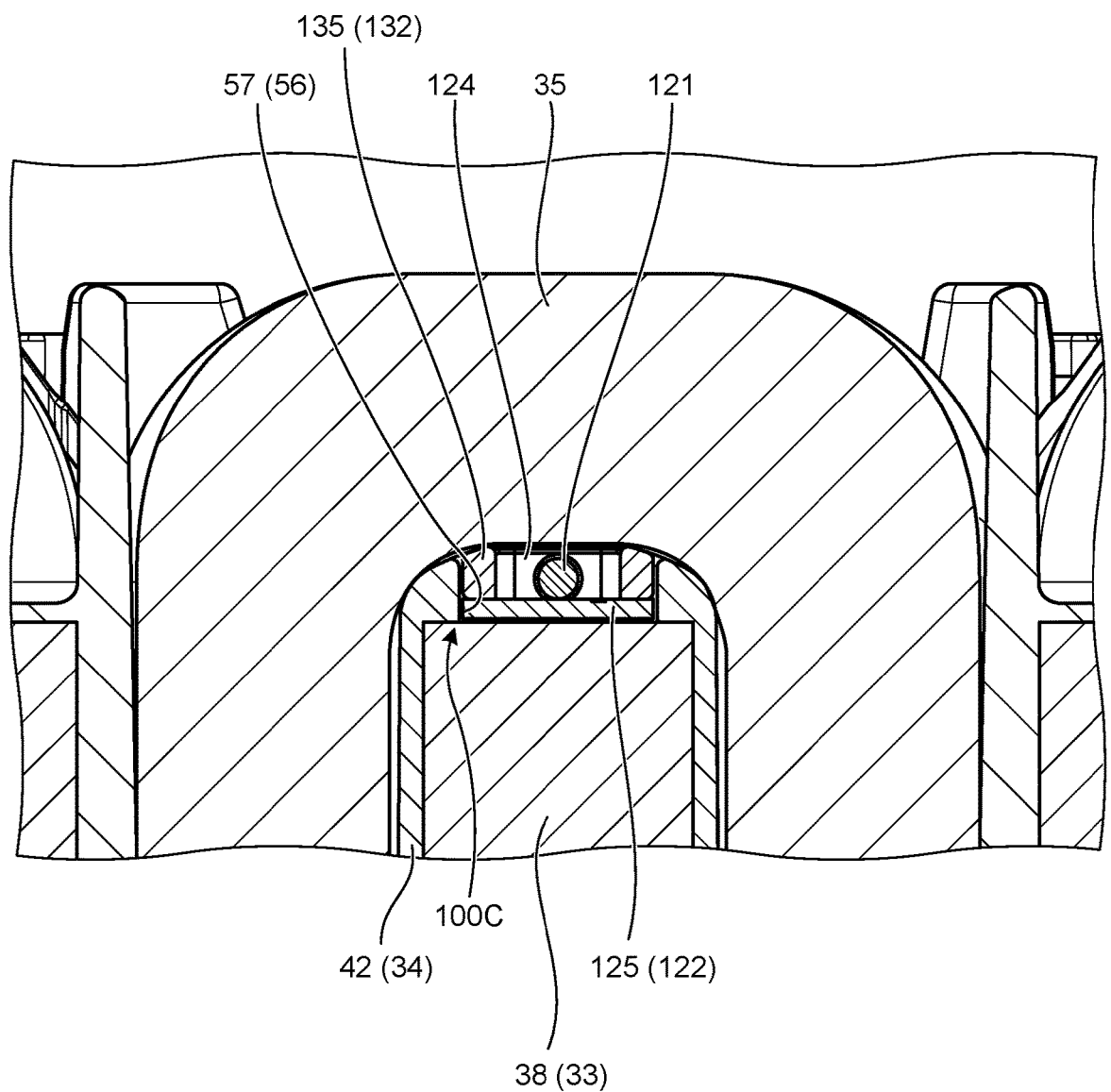
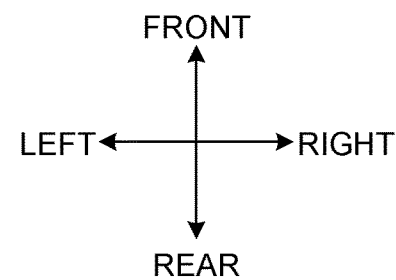

FIG.28
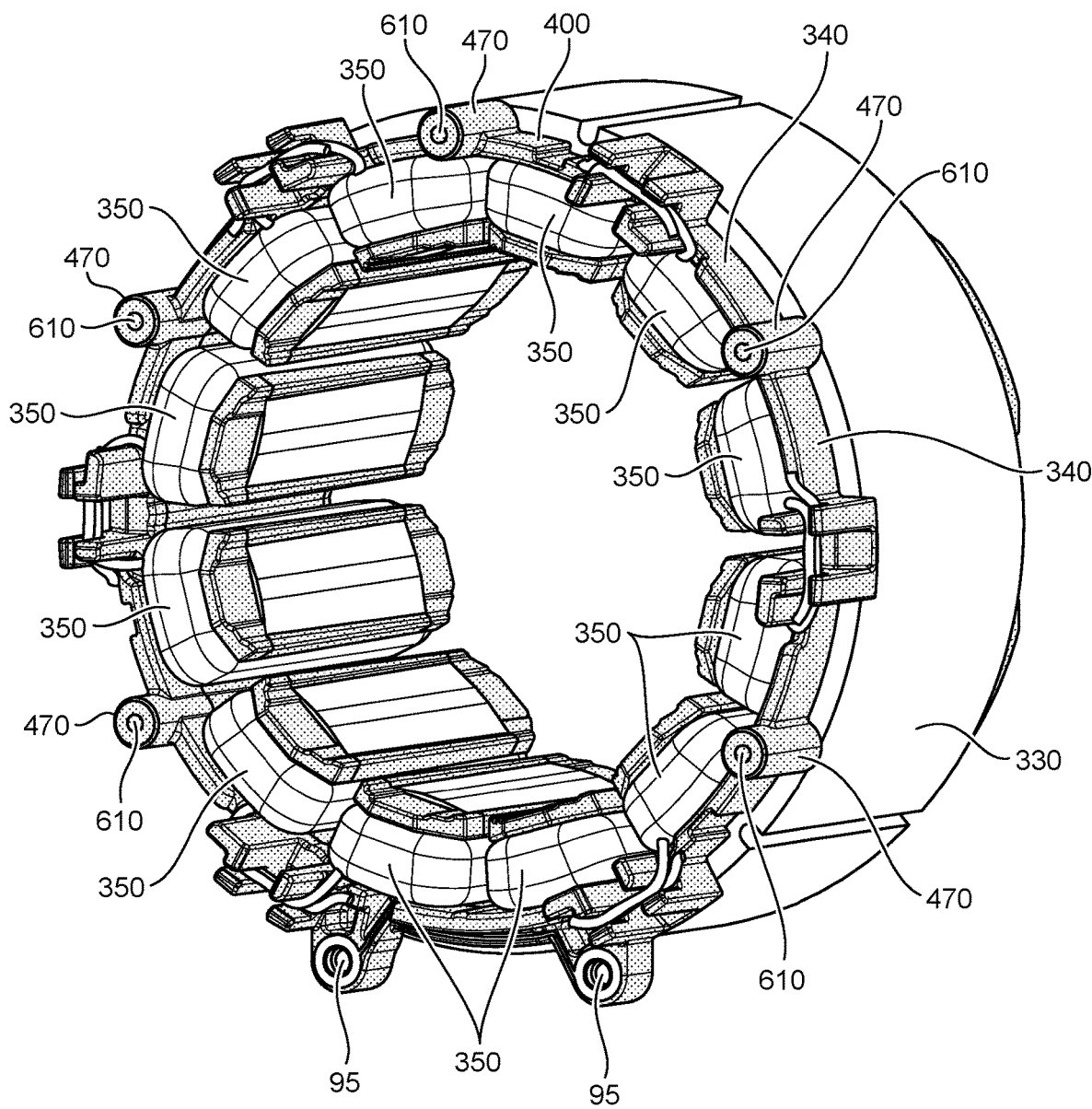
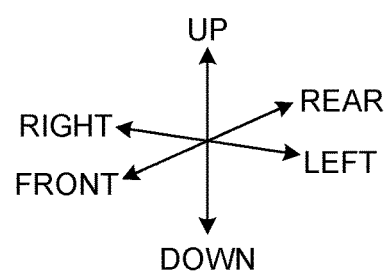

FIG.31
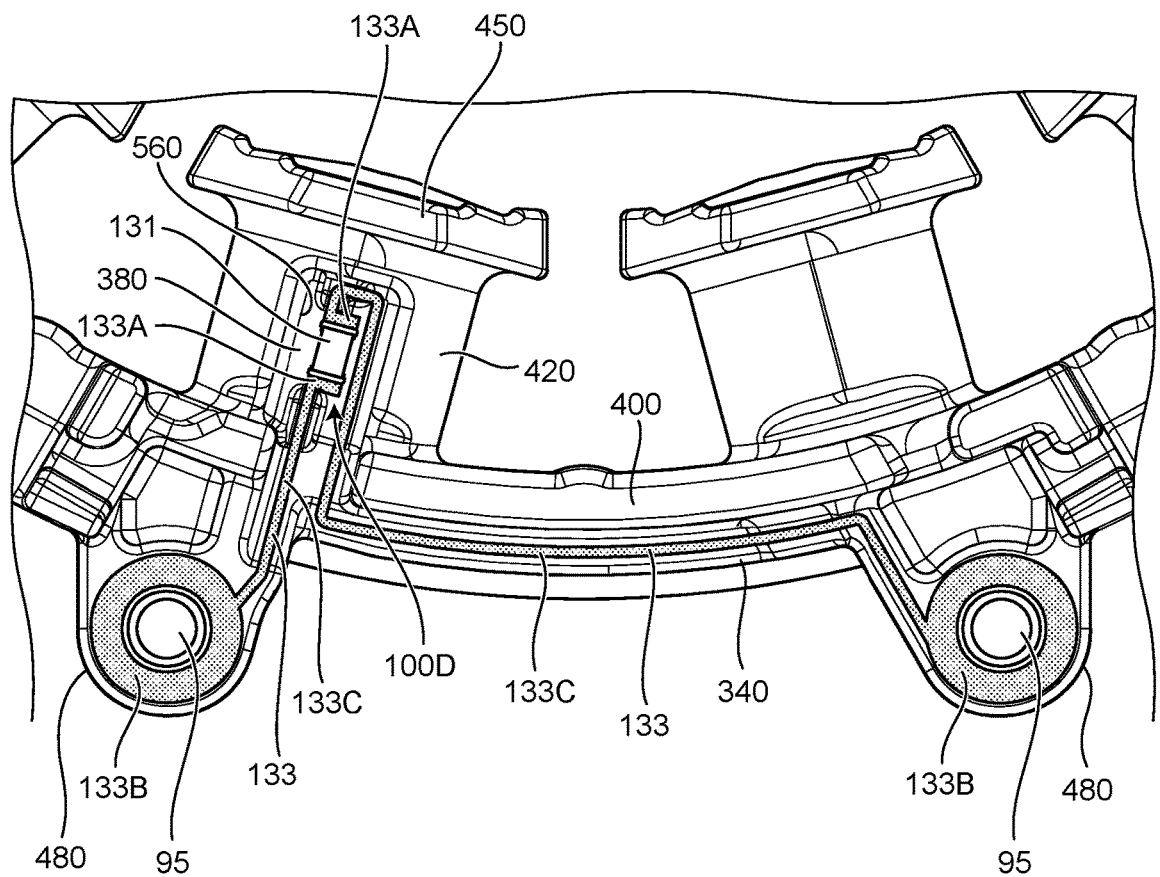
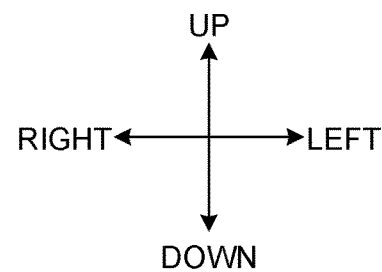

ELECTRIC WORK MACHINE

CROSS-REFERENCE

This application claims priority to Japanese Patent Application No. 2021-170387 filed on Oct. 18, 2021, the contents of which are incorporated herein by reference.

TECHNICAL FIELD

The techniques disclosed in the present specification relate to an electric work machine.

BACKGROUND ART

An electric work machine comprising a brushless motor that has a stator and a rotor is disclosed in Japanese Laid-open Patent Publication 2019-180165.

SUMMARY OF THE INVENTION

To detect the temperature of the stator of an electric motor, it is known to dispose a temperature-detecting device on the stator. However, in embodiments in which a temperature-detecting device is disposed on the stator, there is demand for a technique that can minimize or reduce the cost of the electric work machine.

It is one non-limiting object of the present teachings to disclose techniques for reducing or minimizing the cost of an electric work machine comprising a temperature-detecting device that detects the temperature of a stator.

In one aspect of the present teachings, an electric work machine may comprise a motor, an output part, and a temperature-detecting device. The motor may comprise a stator and a rotor, which rotates about a rotational axis relative to the stator. The output part may be driven, directly or indirectly, by the rotor. The temperature-detecting device may be disposed on or in the stator. The stator may comprise a stator core, an insulator, and coils. The stator core may comprise a yoke and teeth, which radially protrude from the yoke. The insulator may comprise tooth-covering parts that cover at least a portion of surfaces of the teeth and may be fixed to the stator core. The coils may be wound on the teeth via (over, around) the tooth-covering parts. The temperature-detecting device may be disposed in a recessed part (recess), which is provided on (in) the insulator.

In such an aspect of the present teachings, the cost of the electric work machine comprising a temperature-detecting device that detects the temperature of the stator can be reduced or minimized.

BRIEF DESCRIPTION OF THE DRAWINGS

FIG. 5 is an oblique view, viewed from the front, that shows a stator core, an insulator, and coils according to the first embodiment.

FIG. 6 is an oblique view, viewed from the front, that shows the stator core and the insulator according to the first embodiment.

FIG. 12 is an oblique view that shows the temperature-detecting unit, which has been disposed in the insulator, according to the first embodiment.

FIG. 13 is a cross-sectional view that shows the temperature-detecting unit, which has been disposed in the insulator, according to the first embodiment.

FIG. 14 is an oblique view, viewed from the front, that shows the stator core, the insulator, and the temperature-detecting unit according to a second embodiment of the present teachings.

FIG. 18 is an oblique view that shows the temperature-detecting unit, which has been disposed in the insulator, according to the second embodiment.

FIG. 19 is a cross-sectional view that shows the temperature-detecting unit, which has been disposed in the insulator, according to the second embodiment.

FIG. 20 is an oblique view, viewed from the front, that shows the stator core, the insulator, and the temperature-detecting unit according to a third embodiment of the present teachings.

FIG. 24 is an oblique view that shows the temperature-detecting unit, which has been disposed in the insulator, according to the third embodiment.

FIG. 25 is a cross-sectional view that shows the temperature-detecting unit, which has been disposed in the insulator, according to the third embodiment.

FIG. 28 is an oblique view, viewed from the front, that shows the stator core, the insulator, and the coils according to the fourth embodiment.

FIG. 31 shows a temperature-detecting device and wiring patterns according to the fourth embodiment.

DETAILED DESCRIPTION OF THE INVENTION

Figure 1:
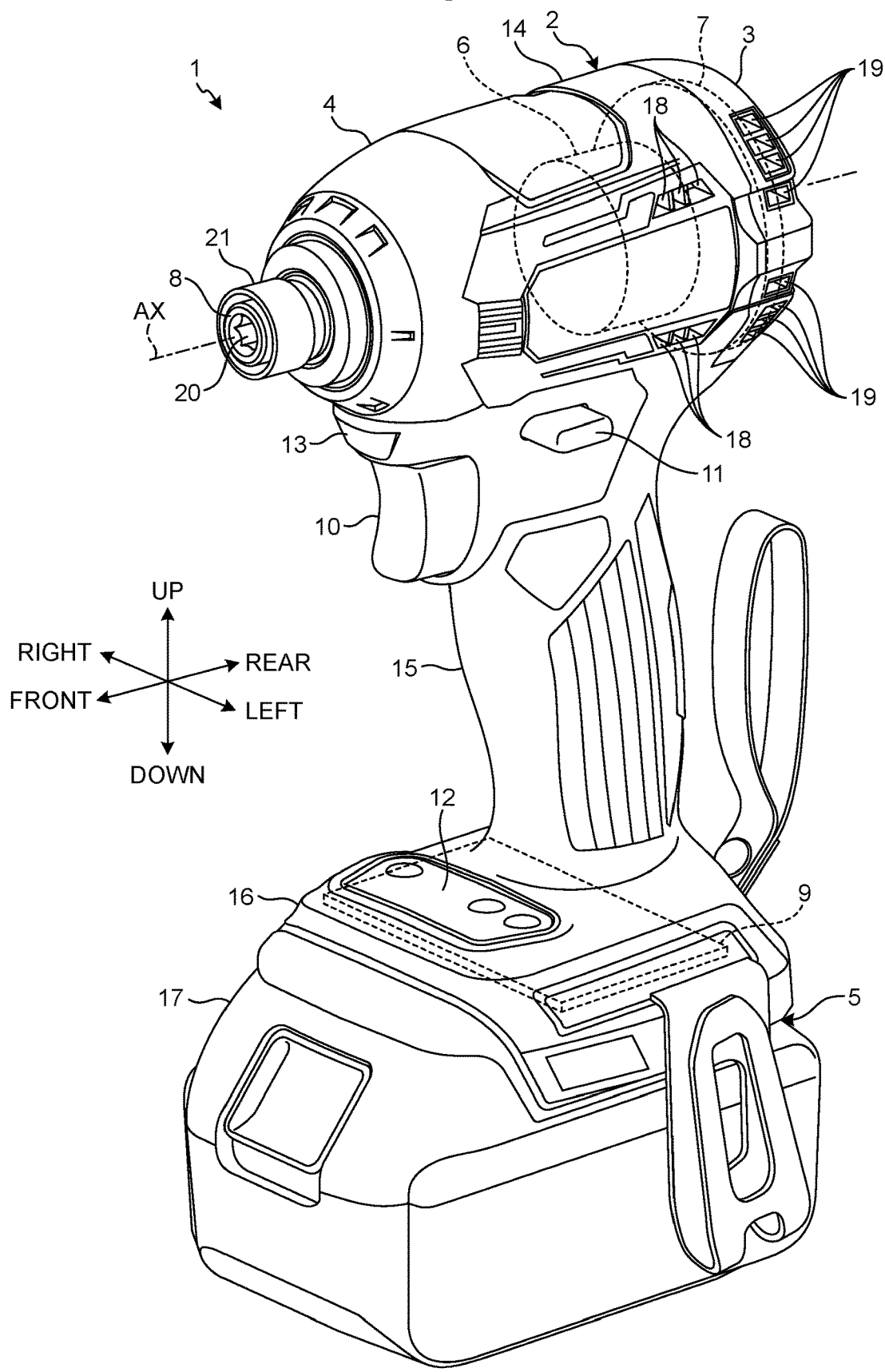
FIG. 1 is an oblique view, viewed from the front, that shows an electric work machine according to a first embodiment of the present teachings.

In one or more embodiments, the electric work machine may comprise a motor, an output part, and a temperature-detecting device. The motor may comprise a stator and a rotor, which rotates about a rotational axis relative to the stator. The output part may be driven by the rotor. The temperature-detecting device may be disposed on or in the stator. The stator may comprise a stator core, an insulator, and coils. The stator core may comprise a yoke and teeth, which radially protrude from the yoke. The insulator may comprise tooth-covering parts that cover at least a portion of surfaces of the teeth and may be fixed to the stator core. The coils may be wound on the teeth via (over, around) the tooth-covering parts. The temperature-detecting device may be disposed in a recessed part (recess), which is provided on (in) the insulator.

According to the above-mentioned configuration, the temperature-detecting device is disposed in a recessed part (recess) of the insulator. Therefore, the stator, in which the temperature-detecting device is disposed, can be configured at a lower cost. In addition, the temperature-detecting device can suitably detect the temperature of the stator.

In one or more embodiments, in an axial direction, the recessed part may be disposed between one of the teeth and the corresponding coil that is wound around that tooth.

According to the above-mentioned configuration, in the axial direction, the temperature-detecting device is disposed between one of the teeth and the corresponding coil. Consequently, the dimension of the stator in the axial direction is held down.

In one or more embodiments, at least a portion of the recessed part (recess) may be provided between the tooth, which is associated with the temperature-detecting device, and the corresponding coil.

According to the above-mentioned configuration, the temperature-detecting device is disposed between the tooth and the coil. Consequently, the temperature of the coil is suitably detected by the temperature-detecting device. The motor is air-cooled by a fan. Therefore, during operation, cooling air is supplied to (blows over) the outer surfaces of the coils. As a result, the temperature of the outside surfaces of the coils will likely fluctuate during operation due to the cooling air. Consequently, if the temperature-detecting device were to be (hypothetically) disposed on the outer surface of the coil, the detection signal of the temperature-detecting device will likely be unstable and/or unreliable owing to the influence of the cooling air flow. On the other hand, the cooling air is not directly supplied between the coil and the tooth. Therefore, by disposing the temperature-detecting device between the coil and the tooth according to the present teachings, the detection signal of the temperature-detecting device stabilizes and becomes more reliable. Consequently, the temperature of the coil can be more suitably detected by the temperature-detecting device than in embodiments in which the temperature-detecting device is disposed on an outer surface of one of the coils (or in another location that is cooled by the cooling airflow during operation).

In one or more embodiments, the electric work machine may comprise a support member, which supports the temperature-detecting device. The support member may be disposed in the recessed part (recess) of the insulator.

According to the above-mentioned configuration, if wiring patterns (conductive traces or conductive tracks, i.e. electrically conductive wires printed on a surface) connected to the temperature-detecting device are to be formed by (using), for example, a molded interconnect device ("MID") manufacturing method, the wiring patterns should be formed on the support member. That is, instead of forming the wiring patterns on the insulator using an MID manufacturing method, the manufacturing cost of the wiring patterns is held down by forming the wiring patterns on the support member, which is detachable from the insulator, using an MID manufacturing method.

In one or more embodiments, the recessed part (recess) may include a first recessed part (first recess), which is provided at (adjacent) an end portion of the tooth in an axial direction. The support member may comprise a first support part, which is disposed in the first recessed part. The temperature-detecting device may be supported by (on) the first support part.

According to the above-mentioned configuration, because the temperature-detecting device is disposed on (adjacent) the tooth, on which the coil is wound, the temperature of the coil can be suitably detected. As was noted above, the motor is air-cooled by a fan and the cooling air is supplied to (flows over) the outer surfaces of the coils. As a result, the temperature of the outer surfaces of the coils will tend to fluctuate due to the cooling air. Consequently, if the temperature-detecting device were to be disposed on the outer surface of one of the coils, the detection signal of the temperature-detecting device might become unstable or unreliable due to the cooling air. On the other hand, cooling air is not directly supplied between the coil and the tooth. Therefore, by disposing the temperature-detecting device between one of the coils and the tooth surrounded by that coil, the detection signal of the temperature-detecting device stabilizes and becomes more reliable. Consequently, the temperature of the coil can be more suitably detected by the temperature-detecting device. In addition, because the first recessed part is disposed at (adjacent) an end portion of the tooth in the axial direction, it is possible to easily mount or place the first support part in the first recessed part during the motor manufacturing process.

In one or more embodiments, the first support part may be disposed between the tooth and the coil; and the temperature-detecting device may be disposed between the first support part and the coil.

According to the above-mentioned configuration, because the temperature-detecting device is disposed at a location that is closer to the coil than the first support part is, the temperature of the coil can be suitably detected.

In one or more embodiments, the first support part may be disposed on (at, adjacent) an end surface of the tooth on a first side in the axial direction; and the temperature-detecting device may be disposed on a surface of the first support part on the first side in the axial direction.

According to the above-mentioned configuration, if the first side in the axial direction is regarded as the front side or forward, the first support part is disposed on a front-end surface of the tooth, and the temperature-detecting device is disposed on a front surface of the first support part. Thereby, the temperature-detecting device and the first support part are suitably disposed relative to the coil.

In one or more embodiments, the first support part may comprise a plate part (plate) and a perimeter-wall part (perimeter wall), which is disposed at (along) a perimeter-edge portion of a surface of the plate part on the first side in the axial direction. The temperature-detecting device may be disposed on the surface of the plate part on the first side in the axial direction.

According to the above-mentioned configuration, if the first side in the axial direction is regarded as the front side or forward, the perimeter-wall part is provided at (along) a perimeter-edge portion of the front surface of the plate part, and the temperature-detecting device is disposed on the front surface of the plate part. Owing to the temperature-detecting device being surrounded by the perimeter-wall part, the coil makes contact with the perimeter-wall part, and therefore, for example, the coil does not directly contact the temperature-detecting device. Consequently, the temperature-detecting device is protected (shielded) from the coil.

In one or more embodiments, wiring patterns (conductive traces) are connected to the temperature-detecting device. The wiring patterns may be disposed on a surface of the support member on the first side in the axial direction.

According to the above-mentioned configuration, if the first side in the axial direction is regarded as the front side or forward, the wiring patterns are disposed on the front surface of the support member. Thereby, the temperature-detecting device, the wiring patterns, and the signal wires are suitably connected on (along) the support member. In addition, by forming the wiring patterns on the support member using an MID manufacturing method, the manufacturing cost of the wiring patterns is held down.

In one or more embodiments, the first support part may be disposed between the tooth and the coil; and the temperature-detecting device may be disposed between the first support part and the tooth.

According to the above-mentioned configuration, because the temperature-detecting device is disposed at a location that is more distant from the coil than the first support part is, the temperature-detecting device is protected (shielded) from the coil by the first support part.

In one or more embodiments, the first support part may be disposed on (at, adjacent) an end surface of the tooth on the first side in the axial direction; and the temperature-detecting device may be disposed on a surface of the first support part on the second side in the axial direction.

According to the above-mentioned configuration, if the first side in the axial direction is regarded as the front side or forward and the second side in the axial direction is regarded as the rear side or rearward, the first support part is disposed on the front-end surface of the tooth, and the temperature-detecting device is disposed on the rear surface of the first support part. Thereby, the temperature-detecting device and the first support part are suitably disposed relative to the coil.

In one or more embodiments, the first support part may comprise a plate part (plate) and a perimeter-wall part (perimeter wall), which is disposed at (along) a perimeter-edge portion of a surface of the plate part on the second side in the axial direction. The temperature-detecting device may be disposed on the surface of the plate part on the second side in the axial direction.

According to the above-mentioned configuration, if the second side in the axial direction is regarded as the rear side or rearward, the perimeter-wall part is provided on a perimeter-edge portion of the rear surface of the plate part, and the temperature-detecting device is disposed on the rear surface of the plate part. Owing to the temperature-detecting device being surrounded by the perimeter-wall part, the tooth makes contact with the perimeter-wall part, and therefore, for example, the tooth does not directly contact the temperature-detecting device. Consequently, the temperature-detecting device is protected (shielded) from the tooth.

In one or more embodiments, wiring patterns are connected to the temperature-detecting device. A portion of the wiring patterns may be disposed on a surface of the support member on the second side in the axial direction; and a portion of the wiring patterns may be disposed on a surface of the support member on the first side in the axial direction.

According to the above-mentioned configuration, if the first side in the axial direction is regarded as the front side or forward and the second side in the axial direction is regarded as the rear side or rearward, a portion of the wiring patterns is disposed on the rear surface of the support member, and a portion of the wiring patterns is disposed on the front surface of the support member. Thereby, the temperature-detecting device, the wiring patterns, and the signal wires are suitably connected at (on, along) the support member. In addition, by forming the wiring patterns on the support member using an MID manufacturing method, the manufacturing cost of the wiring patterns is held down.

In one or more embodiments, the support member may have a through hole that passes through the surface of the support member on the second side in the axial direction and the surface of the support member on the first side in the axial direction. A portion of the wiring patterns disposed on the surface of the support member on the second side in the axial direction and a portion of the wiring patterns disposed on the surface of the support member on the first side in the axial direction may be electrically connected to each other via the through hole.

According to the above-mentioned configuration, by providing the through hole in the support member, if the first side in the axial direction is regarded as the front side or forward and the second side in the axial direction is regarded as the rear side or rearward, the wiring patterns disposed on the rear surface of the support member and the wiring patterns disposed on the front surface of the support member are electrically connected to each other via the through hole.

In one or more embodiments, the recessed part (recess) may include a second recessed part (second recess), which is provided radially outward of the first recessed part (first recess) and is connected to the first recessed part. The support member may comprise a second support part, which is disposed in the second recessed part. In a circumferential direction, the dimension of the second support part may be larger than the dimension of the first support part.

According to the above-mentioned configuration, because the dimension of the second support part is larger than the dimension of the first support part, work efficiency when connecting the wiring patterns and the signal wires during the manufacturing process can be improved owing to the wiring patterns and the signal wires being connected at the second support part. In addition, if a step is formed at the boundary between the first recessed part and the second recessed part and a step is formed at the boundary between the first support part and the second support part, the recessed part and the support member can be positioned in a simple manner. The first support part and the second support part may be a single member or may be constituted from separate (discrete) members.

In one or more embodiments, the second recessed part (second recess) may be provided at an end portion of the yoke in the axial direction.

According to the above-mentioned configuration, because the second support part is disposed on the yoke, work efficiency when disposing the support member in the recessed part during the manufacturing process can be improved.

In one or more embodiments, a cover, which covers the temperature-detecting device supported by the support member, may be provided.

According to the above-mentioned configuration, the temperature-detecting device is protected (shielded) by the cover. For example, in an embodiment in which the temperature-detecting device opposes (is adjacent to) the coil, the temperature-detecting device is protected from the coil by the cover. For example, in an embodiment in which the temperature-detecting device opposes (is adjacent to) the tooth, the temperature-detecting device is protected from the tooth by the cover.

In one or more embodiments, the electric work machine may comprise a motor, an output part, a temperature-detecting device, and a cover. The motor may comprise a stator and a rotor, which rotates about a rotational axis relative to the stator. The output part may be driven by the rotor. The temperature-detecting device may be disposed on or in the stator. The cover may cover the temperature-detecting device. The stator may comprise a stator core, an insulator, and coils. The stator core may comprise a yoke and teeth, which radially protrude from the yoke. The insulator may comprise tooth-covering parts that cover at least a portion of surfaces of the teeth and may be fixed to the stator core. The coils may be wound on the teeth via (over, around) the cover and the tooth-covering parts.

According to the above-mentioned configuration, because each of the coils is wound on the respective tooth via (over, around) the cover and the respective tooth-covering part, which covers the temperature-detecting device, it is possible to configure the stator, in which the temperature-detecting device is disposed, at a lower cost.

In one or more embodiments, an electric work machine may comprise: a motor, an output part, a temperature-detecting device, wiring patterns (conductive traces), power-supply lines, a power-supply-line holder, and one or more screws. The motor may comprise: a stator and a rotor, which rotates about a rotational axis relative to the stator. The output part may be driven, directly or indirectly, by the rotor. The stator may comprise: a stator core, which comprises teeth; an insulator, which is fixed to the stator core; and coils that are respectively wound on the teeth via (over, around) the insulator. The temperature-detecting device may be disposed on or in the stator. The wiring patterns may be connected to the temperature-detecting device. The power-supply lines may supply drive currents to the coils. The power-supply-line holder may hold the power-supply lines and the signal wires. The screw(s) may fix the signal wires and the insulator to each other. At least a portion of the wiring patterns may be disposed on the insulator. The screw(s) may fix the signal wires and the insulator to each other in the state in which the signal wires have been brought into contact with the wiring patterns.

According to the above-mentioned configuration, because the signal wires and the wiring patterns are connected to each other by one or more screws, it is possible to configure the stator, in which the temperature-detecting device is disposed, at a lower cost.

Embodiments according to the present disclosure are explained below, with reference to the drawings, but the present disclosure is not limited to the embodiments. Structural elements of the embodiments explained below can be combined where appropriate. In addition, there are also situations in which some of the structural elements are not used.

In the embodiments, positional relationships among parts are explained using the terms "left," "right," "front," "rear," "up," and "down." These terms indicate relative positions or directions, with the center of an electric work machine 1 as the reference.

The electric work machine 1 comprises a motor 6. A rotor 23 of the motor 6 rotates about rotational axis AX. In the embodiment, a radial direction of rotational axis AX is called the radial direction where appropriate. A direction that goes around rotational axis AX is called the circumferential direction or the rotational direction where appropriate. A direction parallel to rotational axis AX is called the axial direction where appropriate.

In the radial direction, a location that is proximate to or a direction that approaches rotational axis AX is called radially inward where appropriate, and a location that is distant from or a direction that leads away from rotational axis AX is called radially outward where appropriate. A location on one (a first) side or a direction on one (a first) side of the circumferential direction is called the one (first) side in the circumferential direction where appropriate, and a location on the other (second) side or a direction on the other (second) side of the circumferential direction is called the other (second) side in the circumferential direction where appropriate. A location on one (a first) side or a direction on one (a first) side of the axial direction is called the one (first) side in the axial direction where appropriate, and a location on the other (second) side or a direction on the other (second) side of the axial direction is called the other (second) side in the axial direction where appropriate.

In the embodiment, rotational axis AX extends in a front-rear direction. The axial direction and the front-rear direction are parallel to each other. One (first) side in the axial direction is the front side or forward. The other (second) side in the axial direction is the rear side or rearward.

First Embodiment

Electric Work Machine

FIG. 1 is an oblique view, viewed from the front, that shows the electric work machine 1 according to the present embodiment. In the present embodiment, the electric work machine 1 is an impact driver, which is one type of power tool according to the present teachings. As shown in FIG. 1, the electric work machine 1 comprises a housing 2, a rear case 3, a hammer case 4, a battery-mounting part 5, the motor 6, a fan 7, an anvil 8, a controller 9, a trigger switch 10, a forward/reverse change lever 11, an operation panel 12, and a light 13.

The housing 2 comprises a motor-housing part 14, a grip part 15, and a battery-connection part 16. The housing 2 is made of a synthetic resin (polymer).

The motor-housing part 14 houses the motor 6. The motor-housing part 14 has a tube shape.

The grip part 15 is configured to be gripped by a user who uses the electric work machine 1. The grip part 15 protrudes downward from a lower portion of the motor-housing part 14.

The battery-connection part 16 houses the controller 9. The battery-connection part 16 is connected to a lower-end portion of the grip part 15. In both the front-rear direction and a left-right direction, the dimensions of the outer shape of the battery-connection part 16 are larger than the dimensions of the outer shape of the grip part 15.

The rear case 3 is connected to a rear portion of the motor-housing part 14 so as to cover an opening at a rear portion of the motor-housing part 14. The rear case 3 is made of a synthetic resin (polymer).

The hammer case 4 is connected to a front portion of the motor-housing part 14 so as to cover an opening of a front portion of the motor-housing part 14. The hammer case 4 is made of a metal.

A battery pack 17 is mounted on the battery-mounting part 5. The battery pack 17 functions as the electric power supply of the electric work machine 1. The battery-mounting part 5 is provided at a lower portion of the battery-connection part 16. The battery pack 17 is detachable from the battery-mounting part 5. The battery pack 17 comprises secondary batteries. In the present embodiment, the battery pack 17 comprises rechargeable lithium-ion battery cells. Upon being mounted on the battery-mounting part 5, the battery pack 17 is capable of supplying electric power (current) to the electric work machine 1. The motor 6 operates (is energized or driven) using electric power supplied from the battery pack 17. The controller 9 also operates (is energized or powered) using electric power supplied from the battery pack 17.

The motor 6 is the motive power source of the electric work machine 1. The motor 6 generates a rotational force for rotating the anvil 8. The motor 6 is a brushless motor. Rotational axis AX of the motor 6 extends in the front-rear direction. The axial direction and the front-rear direction are parallel to each other.

The fan 7 generates an airflow for cooling the motor 6. The fan 7 rotates owing to the rotational force generated by the motor 6.

The motor-housing part 14 has air-intake ports 18. The rear case 3 has air-exhaust ports 19. The air-exhaust ports 19 are provided rearward of the air-intake ports 18. The air-intake ports 18 fluidly connect the interior space and the exterior space of the housing 2. The air-exhaust ports 19 fluidly connect the interior space and the exterior space of the housing 2. The air-intake ports 18 are provided on (in) both a left portion and a right portion of the motor-housing part 14. The air-exhaust ports 19 are provided on (in) both a left portion and a right portion of the rear case 3. When the fan 7 rotates, air in the exterior space of the housing 2 flows into the interior space of the housing 2 via the air-intake ports 18. The air that flowed into the interior space of the housing 2 cools the motor 6. The air in the interior space of the housing 2 flows out to the exterior space of the housing 2 via the air-exhaust ports 19.

A speed-reducing mechanism, a spindle, and an impact mechanism are housed in the hammer case 4. The speed-reducing mechanism is disposed forward of the motor 6. At least a portion of the spindle is disposed forward of the speed-reducing mechanism. The speed-reducing mechanism transmits, to the spindle, the rotational force generated by the motor 6. Owing to the rotational force of the motor 6 being transmitted via the speed-reducing mechanism, the spindle rotates about rotational axis AX. The rotational speed of the spindle is reduced, by the speed-reducing mechanism, to a rotational speed that is lower than the rotational speed of the motor 6. The impact mechanism impacts the anvil 8 in the rotational direction owing to the rotation of the spindle.

The anvil 8 rotates about rotational axis AX owing to the rotational force of the motor 6. The anvil 8 is the output part of the electric work machine 1, which is driven by the rotor 23 of the motor 6. The anvil 8 has an insertion hole 20 into which a tool accessory is inserted. A chuck mechanism 21, which holds the tool accessory, is provided at least partly around the anvil 8. When the tool accessory has been inserted into the insertion hole 20, the tool accessory is held by the chuck mechanism 21.

The controller 9 controls the motor 6. The controller 9 controls the drive currents supplied from the battery pack 17 to the motor 6. The controller 9 is housed in the battery-connection part 16. The controller 9 comprises a circuit board on which a plurality of electronic parts is mounted. Illustrative examples of the electronic parts mounted on the circuit board include: a processor, such as a CPU (central processing unit); nonvolatile memory, such as ROM (read-only memory) and storage; volatile memory, such as RAM (random-access memory); field-effect transistors (FETs: field-effect transistors); and resistors.

The trigger switch 10 is manipulated (pressed) by the user to operate (energize) the motor 6. The trigger switch 10 is provided at an upper portion of the grip part 15. The trigger switch 10 protrudes forward from an upper portion of a front portion of the grip part 15. The trigger switch 10 is manipulated by the user such that the trigger switch 10 moves rearward. In response to the trigger switch 10 being manipulated such that it moves rearward, the motor 6 operates (is energized). By releasing the manipulation of the trigger switch 10, the energization of the motor 6 stops.

The forward/reverse change lever 11 is manipulated (pressed) by the user to change the rotational direction of the motor 6 to a forward-rotational direction or to a reverse-rotational direction. The forward/reverse change lever 11 is provided at the boundary between a lower-end portion of the motor-housing part 14 and an upper-end portion of the grip part 15. The forward/reverse change lever 11 is manipulated by the user such that the forward/reverse change lever 11 moves in the left direction or the right direction. By changing the rotational direction of the motor 6, the rotational direction of the anvil 8 is changed.

The operation panel 12 is disposed on the battery-connection part 16. The operation panel 12 has a plate shape. A plurality of manipulatable (pressable) switches is disposed on the operation panel 12. In response to manipulation of one or more of the switches by the user, the operation panel 12 outputs an appropriate operation signal. The controller 9 changes the control mode (action mode) of the motor 6 based on the operation signal output from the operation panel 12. The control mode of the motor 6 refers to the control method or the control pattern (motor speed sequence/program) of the motor 6.

The light 13 emits illumination light, which illuminates forward of the electric work machine 1. The light 13 comprises a light-emitting diode (LED). The light 13 is provided at an upper portion of a front portion of the grip part 15.

Motor

Figure 2:
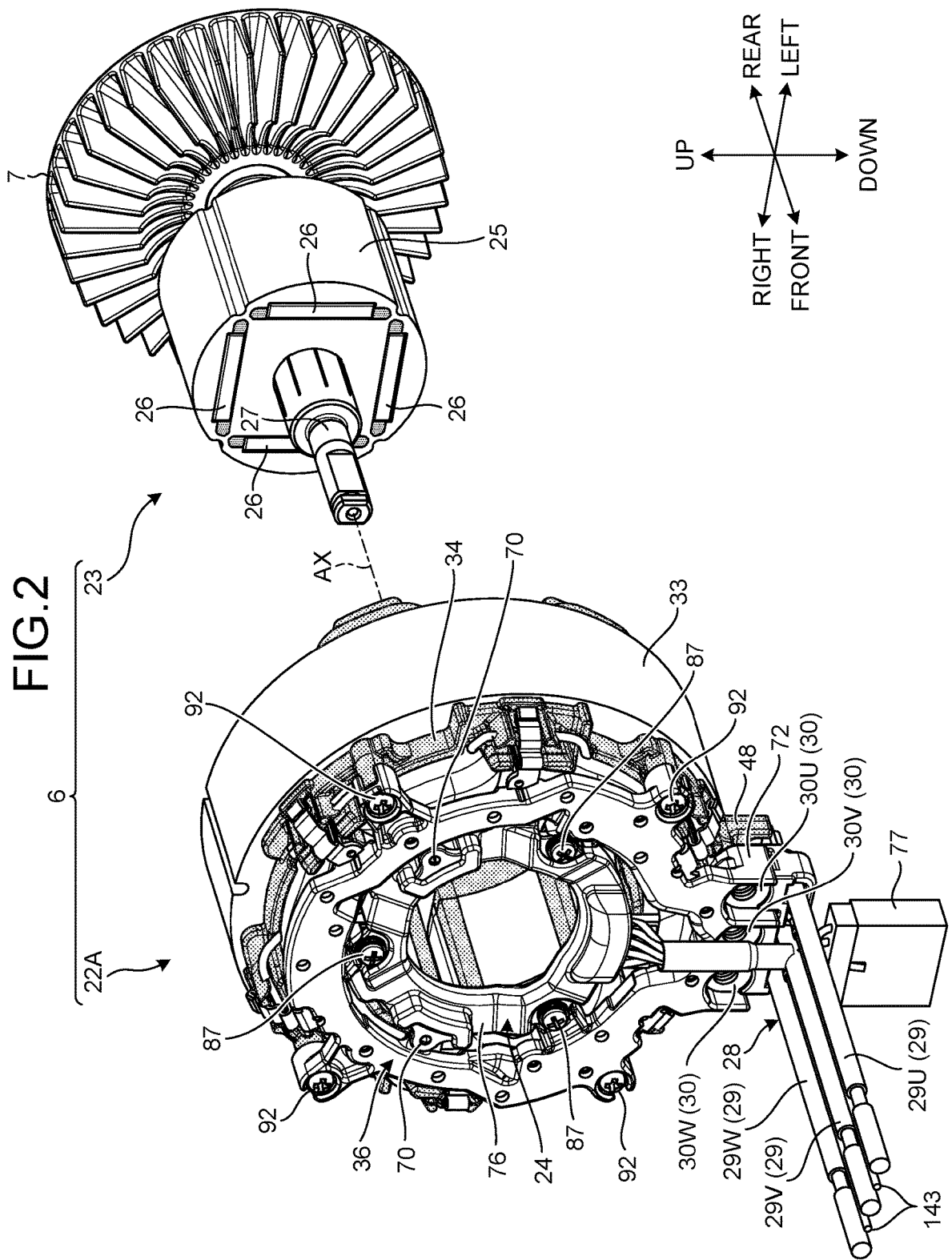
FIG. 2 is an exploded, oblique view, viewed from the front, that shows a motor according to the first embodiment.

FIG. 2 is an exploded, oblique view, viewed from the front, that shows the motor 6 according to the present first embodiment. In the present embodiment, the motor 6 is an inner-rotor-type brushless motor. As shown in FIG. 2, the motor 6 comprises: a stator 22A; the rotor 23, which rotates about rotational axis AX relative to the stator 22A; a power-supply-line unit 28, which is connected to the stator 22A; and a sensor unit 24, which detects rotation of the rotor 23. The stator 22A is disposed around the rotor 23.

Rotor

The rotor 23 comprises a rotor core 25, permanent magnets 26, and a rotor shaft 27. The rotor 23 rotates about rotational axis AX. In response to rotation of the rotor 23, the anvil 8, which is the output part of the electric work machine 1, is driven.

The rotor core 25 comprises a plurality of laminated steel sheets. Each of the steel sheets is a sheet that is made of a metal, the main component of which is iron. The rotor core 25 is disposed so as to encircle rotational axis AX.

The permanent magnets 26 are supported by (in, on) the rotor core 25. In the present first embodiment, the permanent magnets 26 are disposed in the interior of the rotor core 25. The motor 6 is thus an interior permanent magnet-type (IPM) motor. In the present embodiment, four of the permanent magnets 26 are disposed around rotational axis AX. The rotor core 25 and the permanent magnets 26 are fixed to each other.

The rotor shaft 27 extends in the front-rear direction (axial direction). The rotor shaft 27 is disposed in the interior of the rotor core 25. The rotor core 25 and the rotor shaft 27 are fixed to each other. A front portion of the rotor shaft 27 protrudes forward from a front-end portion of the rotor core 25. A rear portion of the rotor shaft 27 protrudes rearward from a rear-end portion of the rotor core 25. A front portion of the rotor shaft 27 is supported in a rotatable manner by a front bearing, which is not shown. A rear portion of the rotor shaft 27 is supported in a rotatable manner by a rear bearing, which is not shown. A front-end portion of the rotor shaft 27 is coupled to the speed-reducing mechanism described above.

The fan 7 is disposed rearward of the rotor core 25. The fan 7 is fixed to a rear portion of the rotor shaft 27. At least a portion of the fan 7 is disposed at a location opposing a rear-end portion of the rotor core 25. When the rotor shaft 27 rotates, the fan 7 rotates together with the rotor shaft 27 and supplies a cooling airflow into the motor 6 to cool, e.g., coils 35.

Stator

Figure 3:
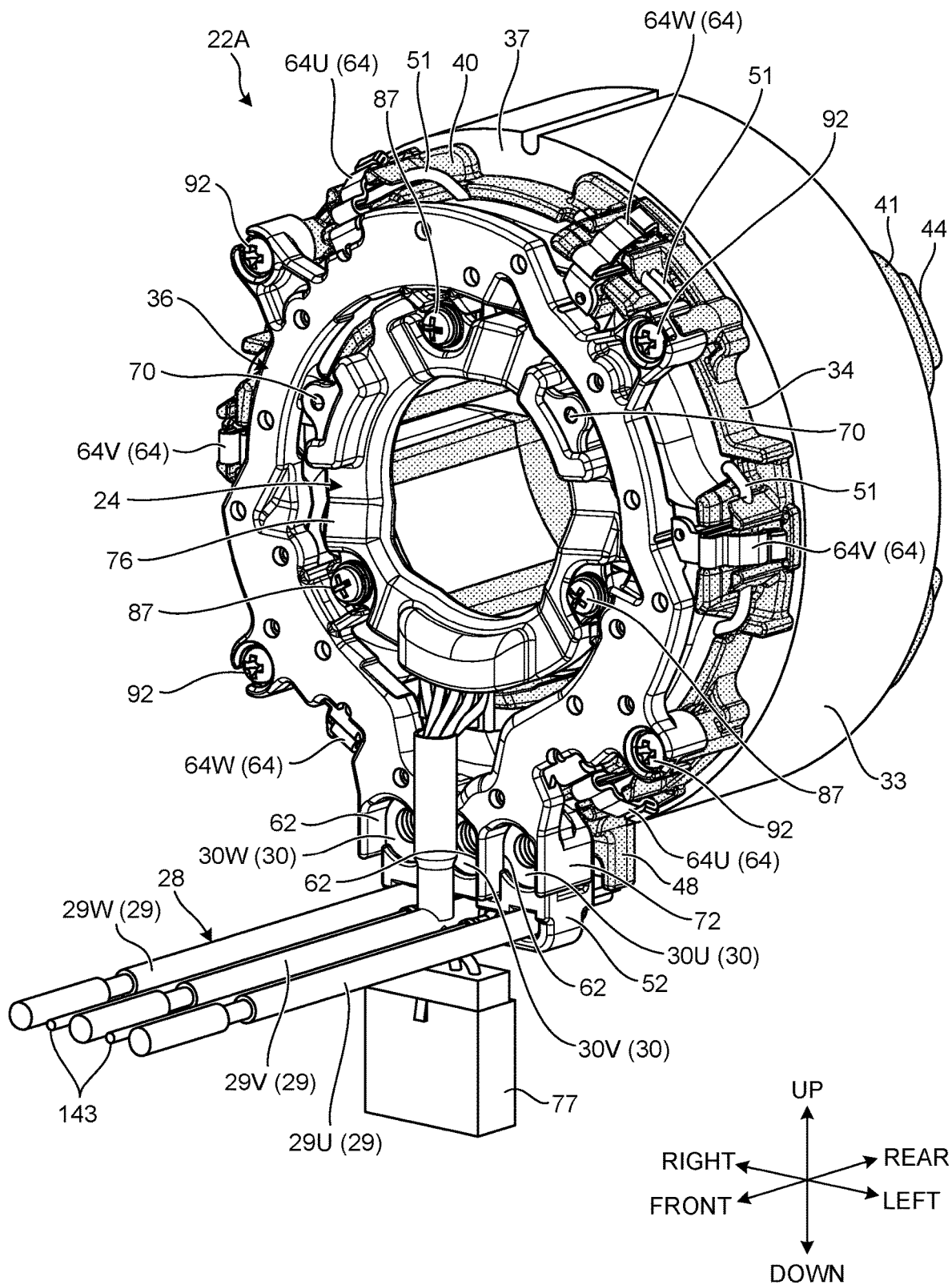
FIG. 3 is an oblique view, viewed from the front, that shows a stator and a sensor unit according to the first embodiment.
Figure 4:
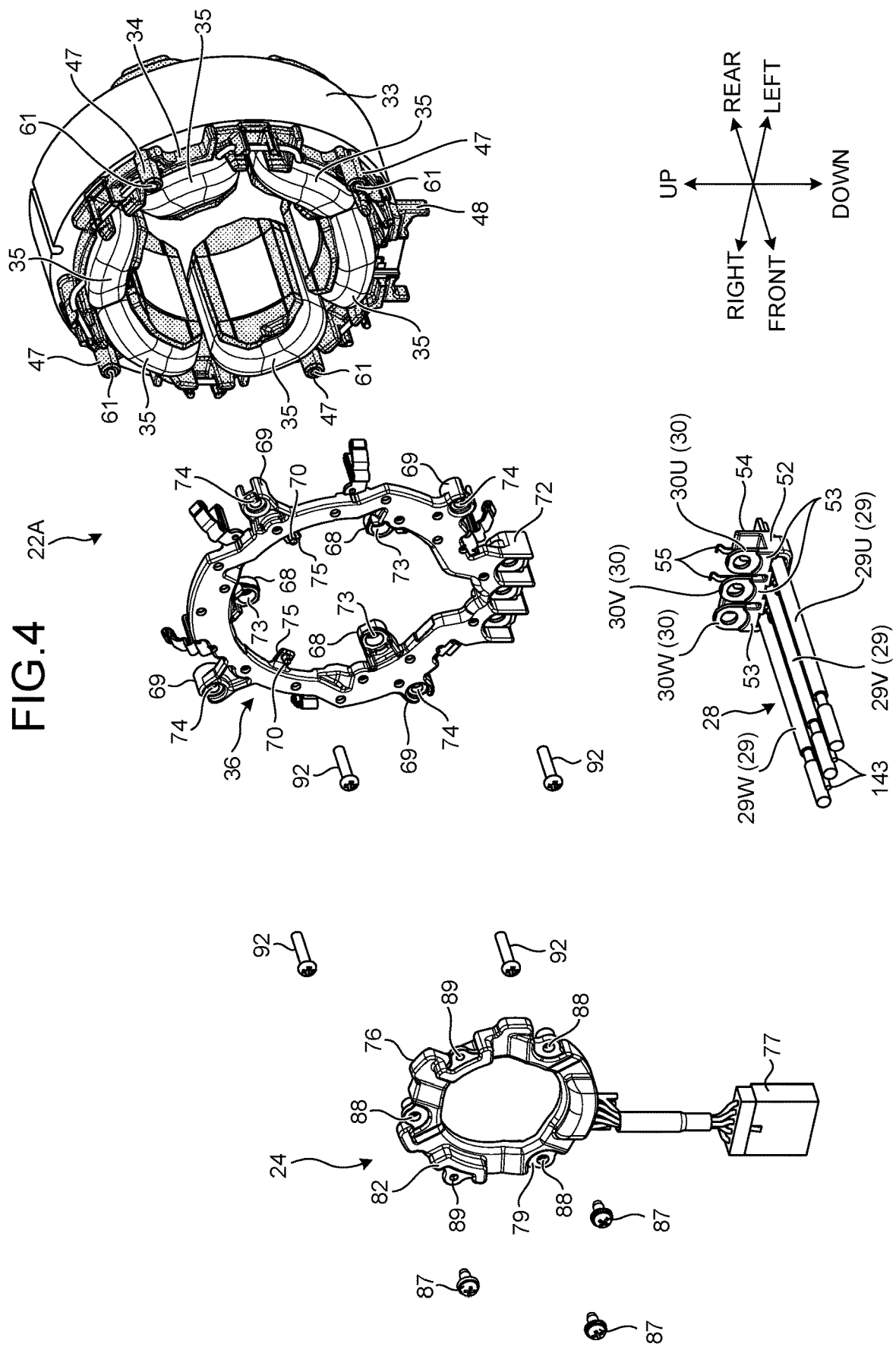
FIG. 4 is an exploded, oblique view, viewed from the front, that shows the stator and the sensor unit according to the first embodiment.

FIG. 3 is an oblique view, viewed from the front, that shows the stator 22A and the sensor unit 24 according to the present embodiment. FIG. 4 is an exploded, oblique view, viewed from the front, that shows the stator 22A and the sensor unit 24 according to the present embodiment.

The stator 22A comprises a stator core 33, an insulator 34, the coils 35, and a busbar unit 36.

The stator core 33 comprises a plurality of laminated steel sheets. Each of the steel sheets is a sheet that is made of a metal, in which the main component is iron. The stator core 33 is disposed around the rotor core 25. The insulator 34 is an electrically insulating member made of a synthetic resin (polymer). The insulator 34 is fixed to the stator core 33. The insulator 34 is, e.g., integrally molded with the stator core 33. That is, the insulator 34 may be fixed to the stator core 33 by, for example, insert molding (injection molding). A plurality of the coils 35 is provided. In the present embodiment, six of the coils are provided. The coils 35 are fixed to (on) the insulator 34. The busbar unit 36 is fixed to (on) the insulator 34.

FIG. 5 is an oblique view, viewed from the front, that shows the stator core 33, the insulator 34, and the coils 35 according to the present embodiment. FIG. 6 is an oblique view, viewed from the front, that shows the stator core 33 and the insulator 34 according to the present embodiment and corresponds to the drawing in FIG. 5, except that the coils 35 are omitted.

The stator core 33 comprises a yoke 37, teeth 38, and inner-wall parts 39. The yoke 37 has a tube shape. The yoke 37 substantially has a circular-tube shape. The yoke 37 is disposed so as to encircle rotational axis AX. It is noted that the yoke 37 does not have to have a tube shape and may be formed by combining a plurality of segmented cores. Each of the teeth 38 protrudes radially inward from an inner surface of the yoke 37. A plurality of the teeth 38 is provided in the circumferential direction. In the present embodiment, six of the teeth 38 are provided. The teeth 38 are disposed equispaced apart in the circumferential direction. Each of the inner-wall parts 39 is connected to an end portion that is radially inward of the corresponding tooth 38. In the circumferential direction, the dimension of the inner-wall parts 39 is larger than the dimension of the teeth 38. In the circumferential direction, the locations of the centers of the teeth 38 and the locations of the centers of the inner-wall parts 39 coincide. Each of the inner-wall parts 39 comprises projection portions that protrude from an inner-end portion of the corresponding tooth 38 toward a first (one) side in the circumferential direction and toward a second side in the circumferential direction.

The insulator 34 is disposed so as to cover at least a portion of the surface of the stator core 33. The insulator 34 comprises a front-insulator part 40, a rear-insulator part 41, tooth-covering parts 42, coil-stop parts 43, coil-stop parts 44, coil-stop parts 45, wire-support parts 46, screw-boss parts 47, and a coupling part 48.

The front-insulator part 40 is disposed so as to cover at least a portion of a front-end surface of the yoke 37.

The rear-insulator part 41 is disposed so as to cover at least a portion of a rear-end surface of the yoke 37.

Each of the tooth-covering parts 42 is disposed so as to cover at least a portion of the surface of the corresponding tooth 38. The coils 35 are respectively wound on the teeth 38 via (over, around) the tooth-covering parts 42. Thus, the tooth-covering parts 42 are respectively disposed between the coils 35 and the teeth 38.

The coil-stop parts 43 are disposed such that they protrude forward from the front-insulator part 40. The coil-stop parts 43 are connected to radially-outward-end portions outward of the tooth-covering parts 42.

The coil-stop parts 44 are disposed such that they protrude rearward from the rear-insulator part 41. The coil-stop parts 44 are respectively connected to radially-outward-end portions of the tooth-covering parts 42.

The coil-stop parts 45 are disposed such that they respectively surround the inner-wall parts 39. The coil-stop parts 45 are respectively connected to radially-inward-end portions of the tooth-covering parts 42.

In the state in which the coils 35 have been wound on the tooth-covering parts 42, the coil-stop parts 43 and the coil-stop parts 44 are disposed radially outward of the coils 35, and the coil-stop parts 45 are disposed radially inward of the coils 35.

The wire-support parts 46 support connection wires 51, which connect pairs of the coils 35 adjacent to each other in the circumferential direction. The wire-support parts 46 are provided on the front-insulator part 40. The number of the wire-support parts 46 provided is the same as the number of the coils 35. The wire-support parts 46 are disposed radially outward of the coils 35. Each of the wire-support parts 46 comprises: a pair of protruding parts 49, which protrudes forward from the front-insulator part 40; and a pair of protruding parts 50, which protrudes forward from the front-insulator part 40. The pair of protruding parts 49 is disposed in the circumferential direction. The pair of protruding parts 50 is disposed in the circumferential direction. The protruding parts 50 are disposed radially outward of the protruding parts 49. The connection wires 51 are disposed between the protruding parts 49 and the protruding parts 50 in the radial direction.

The screw-boss parts 47 are fixed to the busbar unit 36. The screw-boss parts 47 are provided on the front-insulator part 40. The screw-boss parts 47 protrude forward from the front-insulator part 40. A plurality of the screw-boss parts 47 is disposed around rotational axis AX. In the present embodiment, four of the screw-boss parts 47 are provided spaced apart in the circumferential direction. A screw hole 61 is formed in each of the screw-boss parts 47. By inserting screws 92 through the busbar unit 36 and into the respective screw holes 61, the front-insulator part 40 and the busbar unit 36 are fixed to each other.

The coupling part 48 is coupled to the power-supply-line unit 28. The coupling part 48 protrudes radially outward from a lower portion of the front-insulator part 40.

By supplying the drive currents from the battery pack 17 via the controller 9 and the power-supply-line unit 28, the coils 35 generate rotating magnetic fields between the coils 35 and the rotor 23. Each of the coils 35 is wound on the corresponding tooth 38 via (over, around) the corresponding tooth-covering part 42. A plurality of the coils 35 is provided. In the present embodiment, six of the coils 35 are provided.

The coils 35 are fixed to the insulator 34. The coils 35 and the stator core 33 are insulated from each other by the insulator 34. In the state in which the coils 35 have been respectively wound on the teeth 38 via (over, around) the tooth-covering parts 42, the coil-stop parts 43 and the coil-stop parts 44 are disposed radially outward of the coils 35. In the state in which the coils 35 have been respectively wound on the teeth 38 via (over, around) the tooth-covering parts 42, the coil-stop parts 45 are disposed radially inward of the coils 35.

The plurality of coils 35 is formed by the winding of a single continuous (unbroken) wire. Each of the connection wires 51 is thus a portion of the single continuous wire between a pair of the coils 35 adjacent to each other in the circumferential direction. As described above, the connection wires 51 are supported by the wire-support parts 46. The connection wires 51 are disposed between the protruding parts 49 and the protruding parts 50 in the radial direction. It is noted that the plurality of coils 35 may be formed by the winding of two wires. By winding the coils 35 using two wires, the motor 6 can be made higher powered and can be made to carry larger currents.

Figure 7:
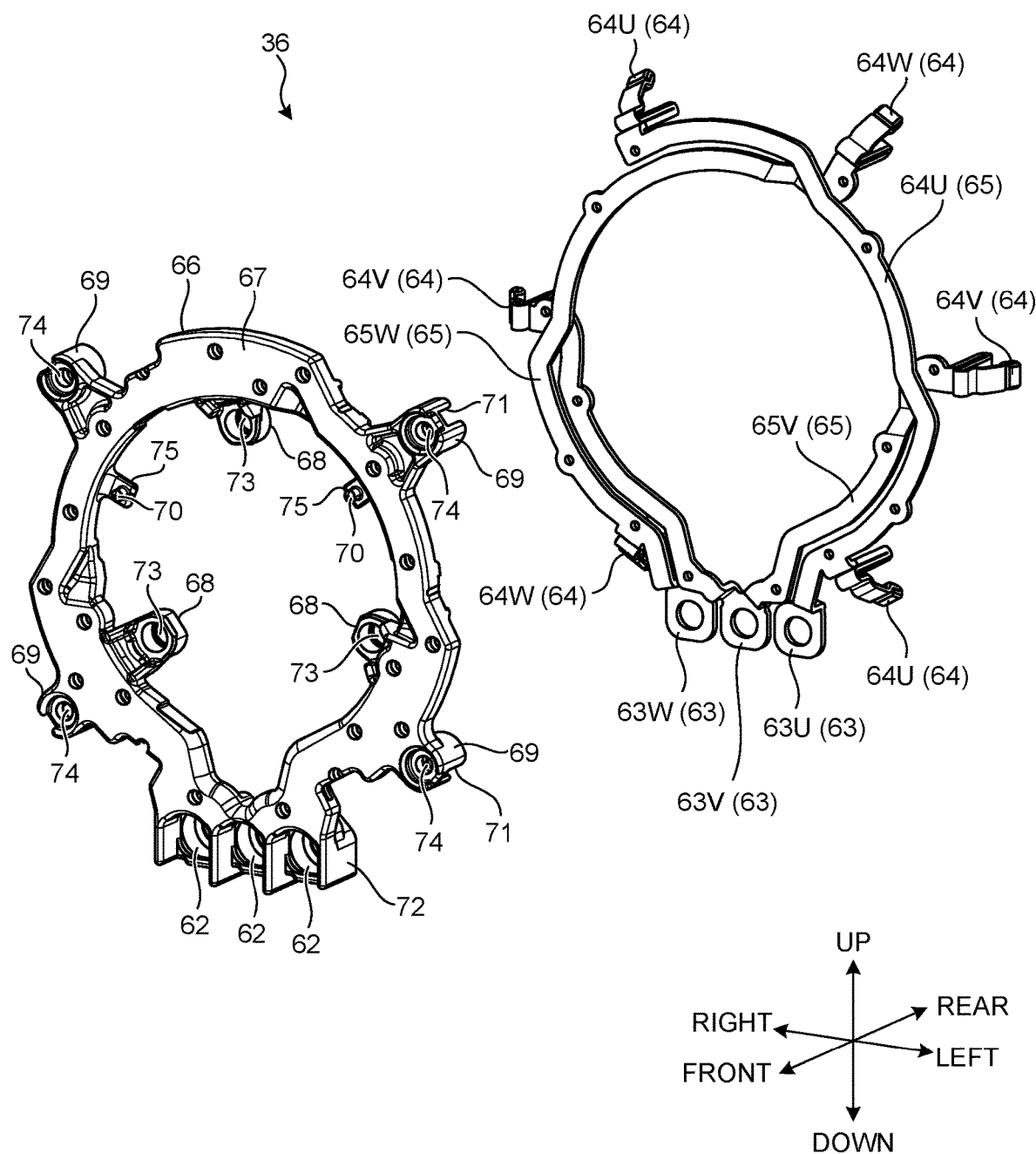
FIG. 7 is an exploded, oblique view, viewed from the front, that shows a busbar unit according to the first embodiment.

FIG. 7 is an exploded, oblique view, viewed from the front, that shows the busbar unit 36 according to the present embodiment.

With regard to the busbar unit 36, the drive currents supplied from the battery pack 17 via the controller 9 and the power-supply-line unit 28 are respectively supplied to the coils 35. The drive currents supplied from the battery pack 17 are supplied to the busbar unit 36 via the controller 9 and the power-supply-line unit 28. The drive currents supplied to the busbar unit 36 are controlled by the controller 9.

The busbar unit 36 is disposed forward of the stator 22A. At least a portion of the busbar unit 36 is disposed such that it opposes (faces) the front-insulator part 40.

The busbar unit 36 comprises external terminals 63, fusing terminals 64, short-circuiting members 65, and an insulating member 66.

The external terminals 63 are connected to the battery pack 17 via the power-supply-line unit 28 and the controller 9. The drive currents from the battery pack 17 are supplied to the external terminals 63 via the controller 9 and the power-supply-line unit 28. In the present embodiment, three of the external terminals 63 are provided.

The fusing terminals 64 are respectively connected to the coils 35 via the respective connection wires 51. The fusing terminals 64 are electrically conductive members. In the state in which the connection wires 51 are supported by the wire-support parts 46, the connection wires 51 are connected to the fusing terminals 64. Each of the connection wires 51 is disposed in the interior of a bent portion of the corresponding fusing terminal 64. The fusing terminals 64 and the connection wires 51 are welded to each other. By welding the fusing terminals 64 and the connection wires 51 together, the fusing terminals 64 are physically and electrically connected to the coils 35 via the connection wires 51.

A plurality of the fusing terminals 64 is disposed around rotational axis AX. In the axial direction, the locations of the fusing terminals 64 are the same. The number of the fusing terminals 64 provided is the same as the number of the coils 35. In the present embodiment, six of the fusing terminals 64 are provided. It is noted that the number of the fusing terminals 64 and the number of the coils 35 may be different. The number of the fusing terminals 64 may be, for example, half the number of the coils 35.

Each of the short-circuiting members 65 electrically connects (short circuits) a pair of connection wires 51 opposite of each other in the radial direction; i.e. diametrically opposite pairs of connection wires 51 are electrically connected. In each pair of the connection wires 51 opposing each other in the radial direction, the connection wires 51 are spaced apart by 180° in the circumferential direction. The short-circuiting members 65 connect the external terminals 63 and the fusing terminals 64. The short-circuiting members 65 are electrically conductive members. Within a plane orthogonal to rotational axis AX, the short-circuiting members 65 are curved. A plurality of the short-circuiting members 65 is provided. In the present embodiment, three of the short-circuiting members 65 are provided. Each of the short-circuiting members 65 electrically connects (short circuits) one of the external terminals 63 with two of the fusing terminals 64.

The insulating member 66 is made of a synthetic resin (polymer). The insulating member 66 is provided so as to encircle rotational axis AX. The insulating member 66 supports both the external terminals 63 and the short-circuiting members 65. The fusing terminals 64 are supported by the insulating member 66 via the short-circuiting members 65. The insulating member 66 comprises a base part 67, first screw-boss parts 68, second screw-boss parts 69, positioning pins 70, positioning, recessed parts 71, and a coupling part 72.

The base part 67 has a ring shape. At least a portion of each of the short-circuiting members 65 is disposed in the interior of the base part 67. The base part 67 is integrally molded with the short-circuiting members 65. The short-circuiting members 65 are molded of the synthetic resin (polymer) that forms the base part 67. It is noted that the base part 67 may be fixed to the short-circuiting members 65 by, for example, insert molding (injection molding). The three short-circuiting members 65 are insulated from each other by the base part 67.

The first screw-boss parts 68 protrude radially inward from inner-edge portions of the base part 67. A plurality of the first screw-boss parts 68 is provided in the circumferential direction. In the present embodiment, three of the first screw-boss parts 68 are provided. The three first screw-boss parts 68 are disposed equispaced in the circumferential direction. Screw holes 73 are formed in the first screw-boss parts 68.

The second screw-boss parts 69 protrude radially outward from outer-edge portions of the base part 67. A plurality of the second screw-boss parts 69 is provided in the circumferential direction. In the present embodiment, four of the second screw-boss parts 69 are provided. Openings 74 are respectively formed in the second screw-boss parts 69.

The positioning pins 70 are disposed radially inward of the base part 67. The insulating member 66 comprises support parts 75, which protrude radially inward from inner-edge portions of the base part 67. The positioning pins 70 protrude forward from the support parts 75. A plurality of the support parts 75 and a plurality of the positioning pins 70 are provided in the circumferential direction. In the embodiment, two of the support parts 75 are provided. One of the positioning pins 70 is provided for each of the support parts 75.

The positioning, recessed parts 71 are disposed radially outward of the base part 67. The positioning, recessed parts 71 are provided on the second screw-boss parts 69. Each of the positioning, recessed parts 71 is provided such that it recesses forward from a rear-end surface of the corresponding second screw-boss part 69.

The coupling part 72 is coupled to the power-supply-line unit 28. The coupling part 72 protrudes downward from a lower portion of the base part 67. The coupling part 72 opposes the coupling part 48 of the insulator 34. The coupling part 72 is disposed forward of the coupling part 48. The coupling part 72 has recessed parts 62 in which the external terminals 63 are disposed. Three of the recessed parts 62 are provided. The external terminals 63 are respectively disposed in the three recessed parts 62.

Power-Supply-Line Unit

The power-supply-line unit 28 supplies drive currents, which are supplied from the battery pack 17 via the controller 9, to the busbar unit 36. As shown in FIGS. 2-4, the power-supply-line unit 28 comprises power-supply lines 29, connection terminals 30, signal wires 143, and a power-supply-line holder 52.

The power-supply lines 29 supply the drive currents to the respective coils 35 via the busbar unit 36. In the present embodiment, three of the power-supply lines 29 are provided.

The connection terminals 30 are electrically connected to the power-supply lines 29. In the recessed parts 62 of the coupling part 72, the connection terminals 30 are electrically connected with the external terminals 63 of the busbar unit 36. That is, the connection terminals 30 electrically connect the power-supply lines 29 and the short-circuiting members 65. In the present embodiment, three of the connection terminals 30 are provided.

The signal wires 143 are electrically connected to a temperature-detecting device 101 of a temperature-detecting unit 100A, which is described below. The detection signal of the temperature-detecting device 101 is supplied to the controller 9 via the signal wires 143. In the present embodiment, two of the signal wires 143 are provided.

The power-supply-line holder 52 holds the power-supply lines 29, the connection terminals 30, and the signal wires 143. The power-supply-line holder 52 is coupled to the coupling part 48 of the front-insulator part 40 and the coupling part 72 of the busbar unit 36.

The power-supply-line holder 52 comprises retaining parts 53, a plate part 54, and hook parts 55.

The retaining parts 53 hold the connection terminals 30. Each of the retaining parts 53 has a plate shape. The plate part 54 is disposed rearward of the retaining parts 53. The hook parts 55 are provided on the plate part 54.

The power-supply-line holder 52 is coupled to the coupling part 48 and the coupling part 72. The plate part 54 is disposed between the coupling part 48 and the coupling part 72. The coupling part 48 gets caught by at least a portion of the power-supply-line holder 52. The hook parts 55 make contact with at least a portion of the coupling part 48. The connection terminals 30, which are held by the retaining parts 53, are disposed in the recessed parts 62 of the coupling part 72. In the recessed parts 62 of the coupling part 72, the connection terminals 30 are disposed forward of the external terminals 63 of the busbar unit 36. In the recessed parts 62, the connection terminals 30 and the external terminals 63 are electrically connected to each other.

The drive currents supplied from the battery pack 17 are supplied to the respective external terminals 63 of the busbar unit 36 via the controller 9, the power-supply lines 29, and the connection terminals 30. The drive currents supplied to the external terminals 63 are supplied to the respective coils 35 via the short-circuiting members 65, the fusing terminals 64, and the connection wires 51.

In the present embodiment, the drive currents supplied from the controller 9 to the motor 6 include a U-phase drive current, a V-phase drive current, and a W-phase drive current.

The power-supply lines 29 include a power-supply line 29U, to which the U-phase drive current is supplied, a power-supply line 29V, to which the V-phase drive current is supplied, and a power-supply line 29W, to which the W-phase drive current is supplied.

The connection terminals 30 include a connection terminal 30U, which is connected to the power-supply line 29U, a connection terminal 30V, which is connected to the power-supply line 29V, and a connection terminal 30W, which is connected to the power-supply line 29W.

As shown in FIG. 7, the external terminals 63 include an external terminal 63U, which is electrically connected to the connection terminal 30U, an external terminal 63V, which is electrically connected to the connection terminal 30V, and an external terminal 63W, which is electrically connected to the connection terminal 30W. The U-phase drive current is supplied to the external terminal 63U. The V-phase drive current is supplied to the external terminal 63V. The W-phase drive current is supplied to the external terminal 63W.

The short-circuiting members 65 include a short-circuiting member 65U, which is electrically connected to the power-supply line 29U via the external terminal 63U, a short-circuiting member 65V, which is electrically connected to the power-supply line 29V via the external terminal 63V, and a short-circuiting member 65W, which is electrically connected to the power-supply line 29W via the external terminal 63W.

The fusing terminals 64 include a pair of fusing terminals 64U, which is electrically connected to the short-circuiting member 65U, a pair of fusing terminals 64V, which is electrically connected to the short-circuiting member 65V, and a pair of fusing terminals 64W, which is electrically connected to the short-circuiting member 65W.

The short-circuiting member 65U electrically connects the external terminal 63U and the pair of fusing terminals 64U to each other. The short-circuiting member 65V electrically connects the external terminal 63V and the pair of fusing terminals 64V to each other. The short-circuiting member 65W electrically connects the external terminal 63W and the pair of fusing terminals 64W to each other. The external terminal 63U, the fusing terminals 64U, and the short-circuiting member 65U are a single member (integrated unit). The external terminal 63V, the fusing terminals 64V, and the short-circuiting member 65V are a single member (integrated unit). The external terminals 63W, the fusing terminals 64W, and the short-circuiting member 65W are a single member (integrated unit).

If the position of an upper-end portion in the circumferential direction is defined as the 0° position, the position of a left-end portion in the circumferential direction is defined as the 90° position, the position of a lower-end portion in the circumferential direction is defined as the 180° position, and the position of a right-end portion in the circumferential direction is defined as the 270° position, then the external terminal 63U is disposed at the 180° position. One of the fusing terminals 64U is disposed at the 150° position. The other fusing terminal 64U is disposed at the 330° position.

The external terminal 63V is disposed at the 180° position. One of the fusing terminals 64V is disposed at the 90° position. The other fusing terminal 64V is disposed at the 270° position.

The external terminal 63W is disposed at the 180° position. One of the fusing terminals 64W is disposed at the 30° position. The other fusing terminal 64W is disposed at the 210° position.

Each of the six coils 35 is allocated to one phase, namely: a U (U-V) phase, a V (V-W) phase, or a W (W-U) phase. Of the six coils 35, two of the coils 35 are allocated to the U phase, two of the coils 35 are allocated to the V phase, and two of the coils 35 are allocated to the W phase. The two coils 35 allocated to the U phase are disposed opposing each other in the radial direction (diametrically opposing). The two coils 35 allocated to the V phase are disposed opposing each other in the radial direction (diametrically opposing). The two coils 35 allocated to the W phase are disposed opposing each other in the radial direction (diametrically opposing).

Sensor Unit

Figure 8:
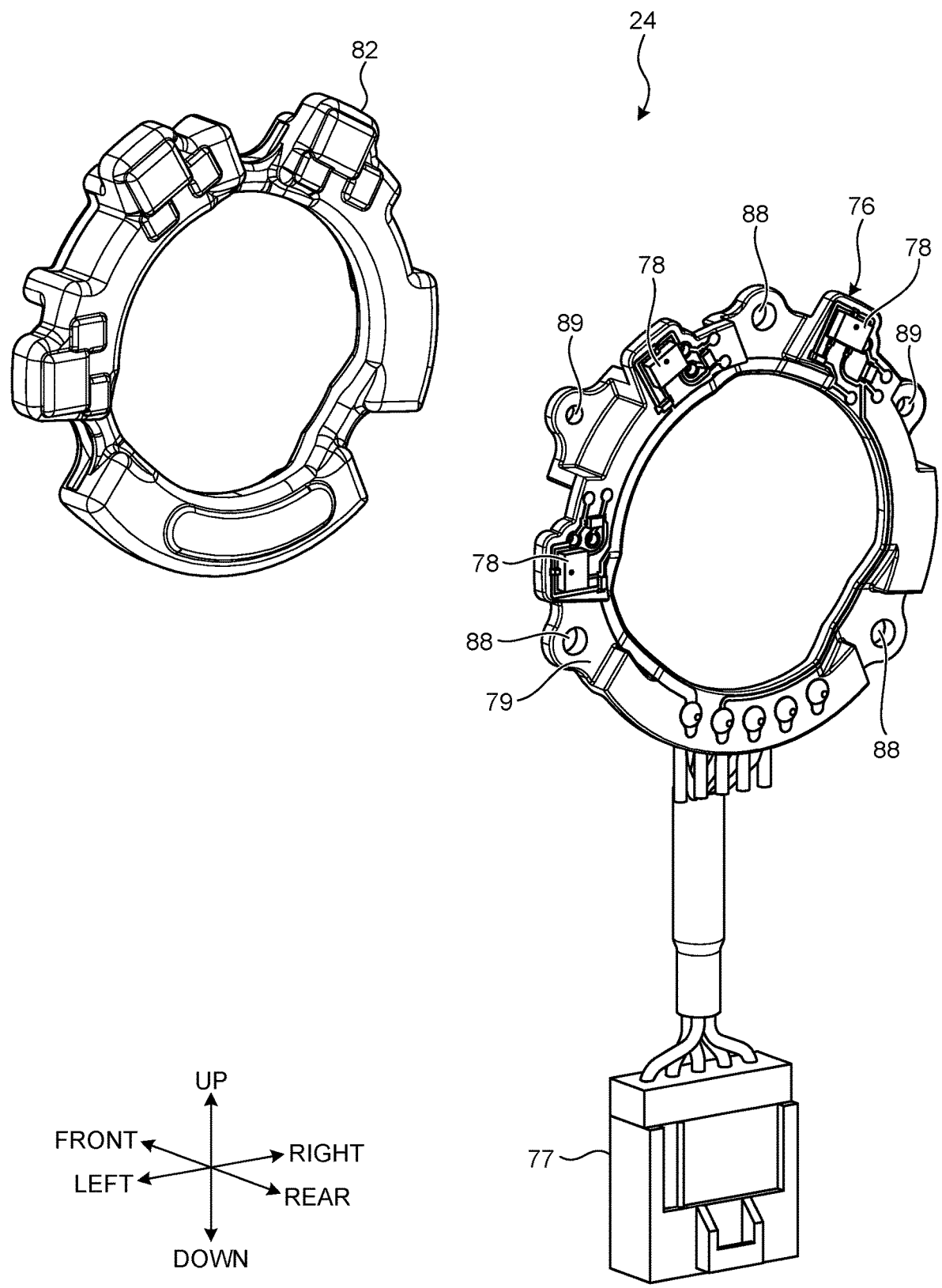
FIG. 8 is an exploded, oblique view, viewed from the rear, that shows the sensor unit according to the first embodiment.

FIG. 8 is an exploded, oblique view, viewed from the rear, that shows the sensor unit 24 according to the present embodiment. The sensor unit 24 comprises a sensor board 76 and a connector 77. The sensor board 76 is disposed forward of the stator core 33. The sensor board 76 comprises rotation sensors 78, a plate part 79, and an insulating member 82.

The rotation sensors 78 detect rotation of the rotor 23. The rotation sensors 78 detect the position of the rotor 23 in the rotational direction by detecting the position of the permanent magnets 26, which are supported by the rotor core 25. Each of the rotation sensors 78 is a magnetic sensor that comprises a Hall-effect device. Three of the rotation sensors 78 are provided. The rotation sensors 78 are disposed radially inward of the coils 35. The rotation sensors 78 are disposed such that they oppose a front-end surface of the rotor core 25.

The plate part 79 supports the rotation sensors 78. The plate part 79 has a ring shape. The plate part 79 is disposed so as to encircle rotational axis AX. The plate part 79 has openings 88, in which screws 87 are disposed. A plurality of the openings 88 are provided in the plate part 79. In the present embodiment, three of the openings 88 are provided.

The plate part 79 has positioning holes 89, in which the positioning pins 70 are disposed. The plurality of the positioning holes 89 are provided on the plate part 79. In the present embodiment, two of the positioning holes 89 are provided.

The detection signals of the rotation sensors 78 are output to the controller 9 via the connector 77. The controller 9 supplies drive currents to the coils 35 in accordance with the detection signals of the rotation sensors 78.

The insulating member 82 covers at least a portion of the surfaces of the rotation sensors 78 and the plate part 79. The insulating member 82 is made of a synthetic resin. In the embodiment, the sensor board 76 comprises a molded interconnect device (MID).

Method of Assembling Motor and Sensor Unit

To assemble the motor 6 and the sensor unit 24, the insulator 34 is first fixed to the stator core 33, and then the coils 35 are respectively wound on the teeth 38 via (over, around) the tooth-covering parts 42 of the insulator 34. Thereafter, the busbar unit 36 is fixed to the front-insulator part 40 of the insulator 34. Then, the sensor unit 24 is connected to the busbar unit 36.

When the insulating member 66 of the busbar unit 36 and the insulator 34 are to be connected, the screw-boss parts 47 of the insulator 34 are respectively disposed in the positioning, recessed parts 71 of the busbar unit 36. The screw-boss parts 47 function as positioning, protruding parts that are disposed in the positioning, recessed parts 71. Thereby, the insulating member 66 of the busbar unit 36 and the insulator 34 are accurately positioned relative to each other.

The insulating member 66 of the busbar unit 36 is fixed to the insulator 34. The insulating member 66 of the busbar unit 36 and the insulator 34 are fixed to each other by the screws 92. The screws 92 are coupled to the screw holes 61 of the screw-boss parts 47 of the insulator 34 through the openings 74 of the second screw-boss parts 69 of the insulating member 66. That is, the screws 92 fix the insulating member 66 of the busbar unit 36 to the insulator 34. At least a portion of the busbar unit 36 is disposed forward of the insulator 34.

As described above, the connection wires 51 and the fusing terminals 64 are electrically connected to each other. In the fusing terminals 64, the connection wires 51 are disposed in the interiors of the bent portions of the fusing terminals 64. The connection wires 51 are fixed by being fused to the fusing terminals 64.

When the sensor unit 24 and the busbar unit 36 are to be connected, the positioning pins 70 of the busbar unit 36 are disposed in the positioning holes 89 of the sensor unit 24. Thereby, the plate part 79 of the sensor unit 24 and the insulating member 66 of the busbar unit 36 are positioned.

The sensor board 76 of the sensor unit 24 is fixed to the insulating member 66 of the busbar unit 36. The sensor board 76 and the insulating member 66 are fixed to each other by the screws 87. The screws 87 are coupled to the screw holes 73 of the first screw-boss parts 68 of the insulating member 66 through the openings 88 of the plate part 79. The sensor board 76 and the insulating member 66 of the busbar unit 36 are fixed to each other by the screws 87. At least a portion of the sensor board 76 is disposed radially inward of the insulating member 66 of the busbar unit 36.

The sensor board 76 is disposed forward of the rotor core 25. The rotation sensors 78 are disposed at locations opposing front-end portions of the rotor core 25. In the state in which the rotation sensors 78 are disposed at locations opposing front-end portions of the rotor core 25, the rotation sensors 78 detect rotation of the rotor 23. By detecting the magnetic fluxes of the permanent magnets 26, the rotation sensors 78 detect the position of the rotor 23 in the rotational direction.

Temperature-Detecting Unit

As shown in FIG. 5, the motor 6 comprises the temperature-detecting unit 100A. The temperature-detecting unit 100A is disposed on or in the stator 22A. One temperature-detecting unit 100A is disposed on or in the stator 22A. The temperature-detecting unit 100A is disposed at (on) a lower portion of the stator core 33. In the circumferential direction, the location of the temperature-detecting unit 100A and the location of at least a portion of the coupling part 48 are the same.

Figure 9:
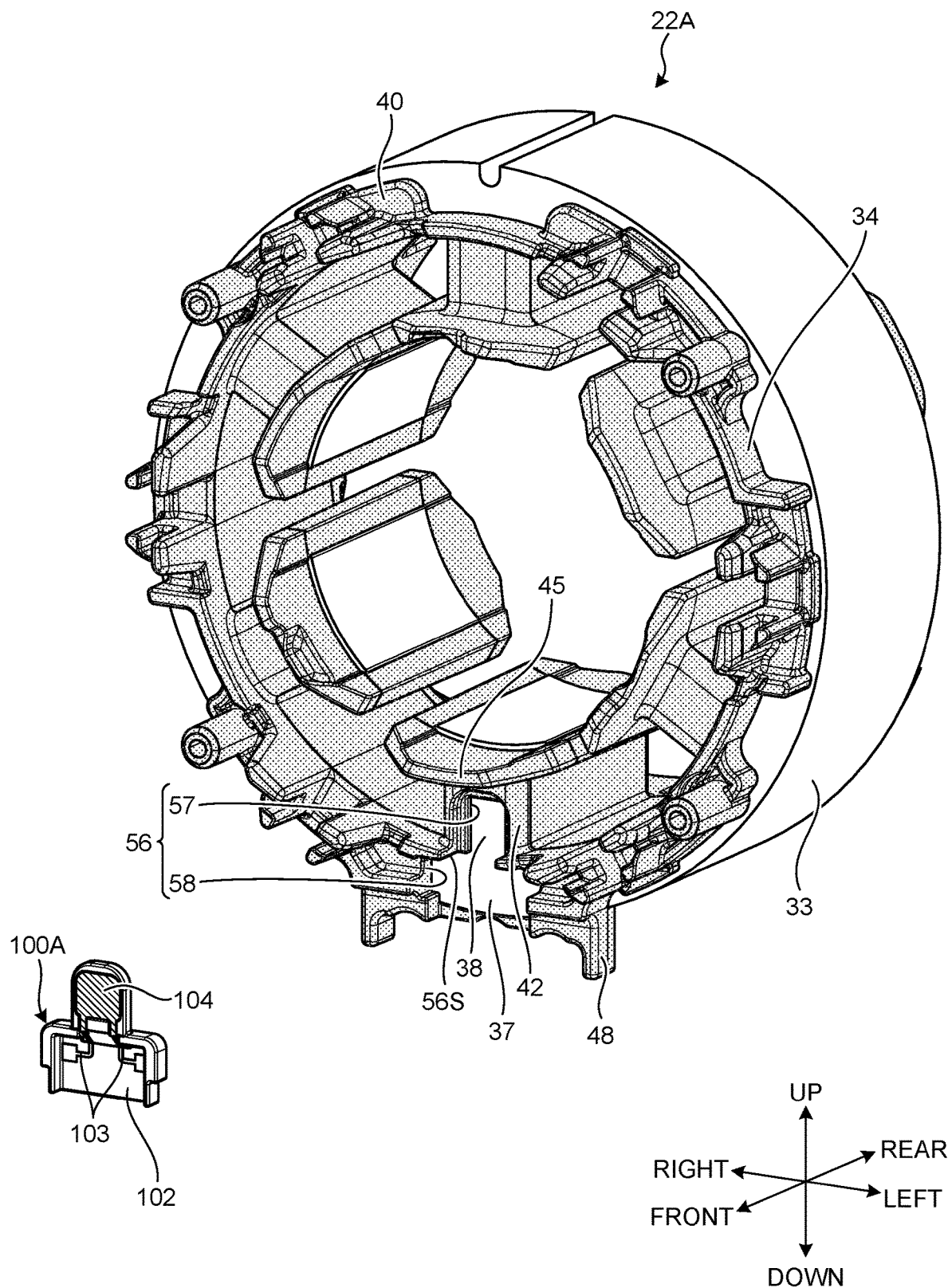
FIG. 9 is an exploded, oblique view, viewed from the front, that shows the stator core, the insulator, and a temperature-detecting unit according to the first embodiment.
Figure 10:
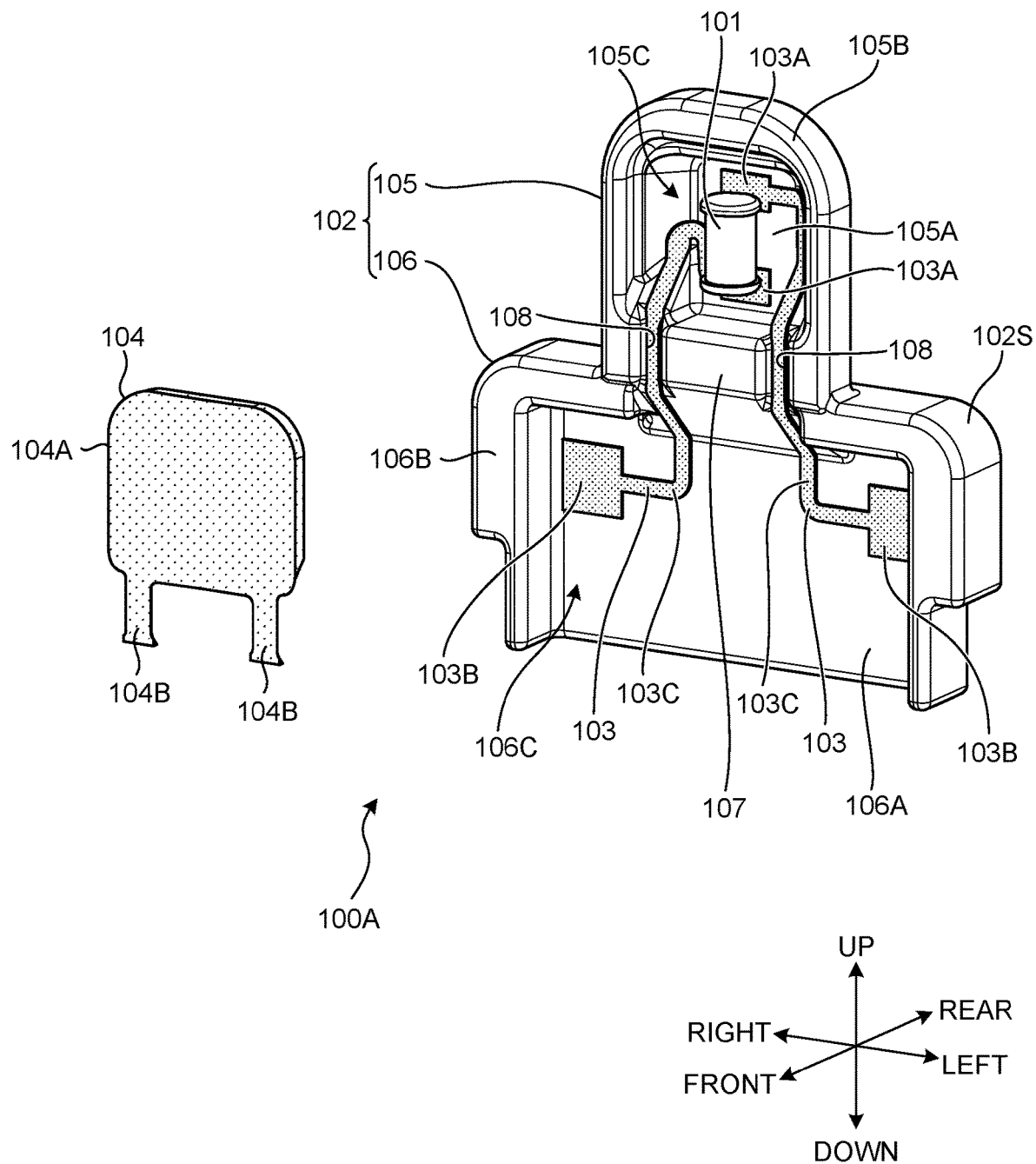
FIG. 10 is an exploded, oblique view, viewed from the front, that shows the temperature-detecting unit according to the first embodiment.
Figure 11:
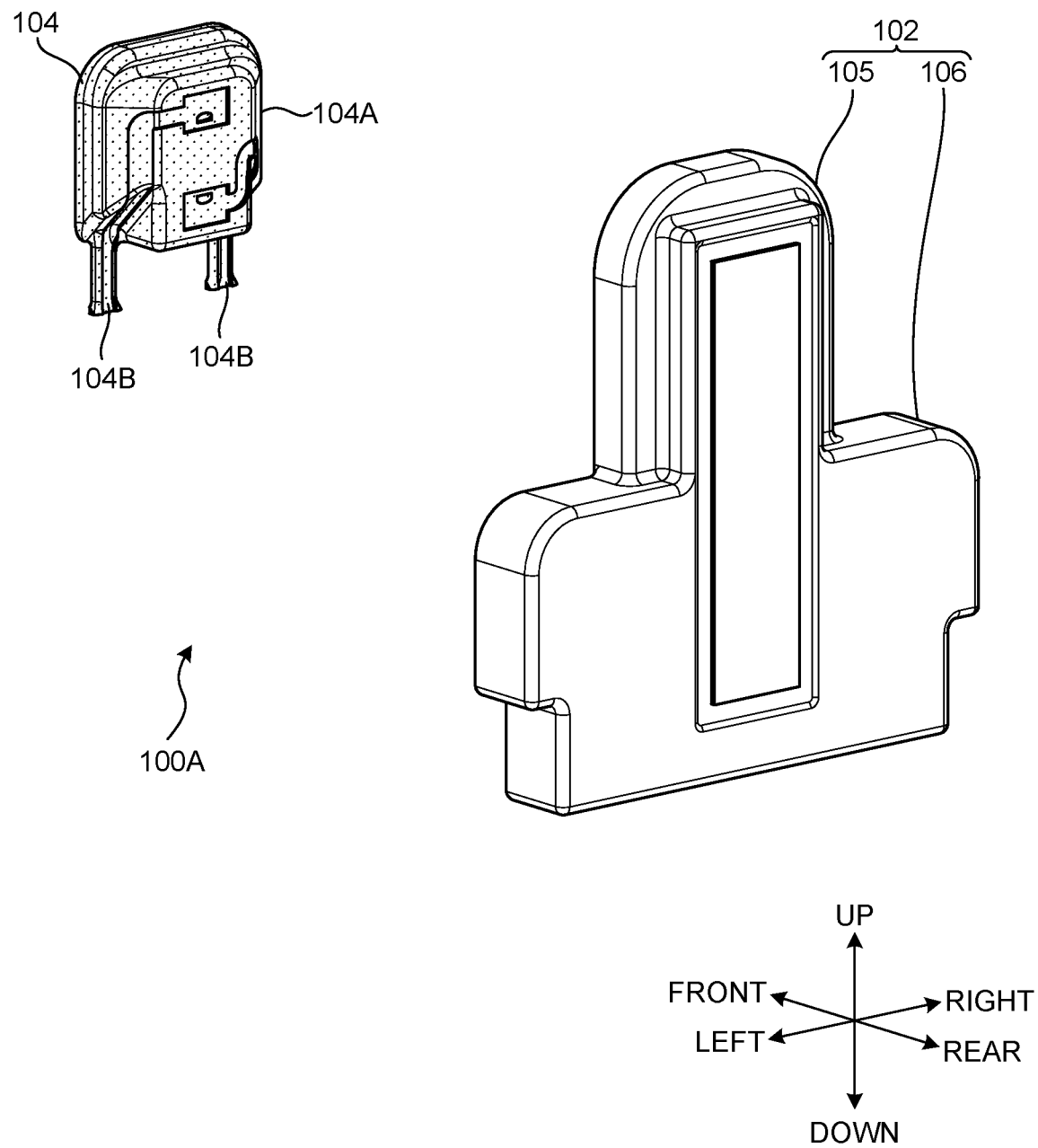
FIG. 11 is an exploded, oblique view, viewed from the rear, that shows the temperature-detecting unit according to the first embodiment.

FIG. 9 is an exploded, oblique view, viewed from the front, that shows the stator core 33, the insulator 34, and the temperature-detecting unit 100A according to the present (first) embodiment. FIG. 10 is an exploded, oblique view, viewed from the front, that shows the temperature-detecting unit 100A according to the present embodiment. FIG. 11 is an exploded, oblique view, viewed from the front, that shows the temperature-detecting unit 100A according to the present embodiment. FIG. 12 is an oblique view that shows the temperature-detecting unit 100A, which has been disposed in the insulator 34, according to the present embodiment. FIG. 13 is a cross-sectional view that shows the temperature-detecting unit 100A, which has been disposed in the insulator 34, according to the present embodiment and corresponds to a cross-sectional auxiliary view taken along line A-A in FIG. 5.

The temperature-detecting unit 100A comprises the temperature-detecting device 101, a support member 102, wiring patterns (conductive traces or tracks, i.e. electrically conductive wires) 103, and a cover 104.

The temperature-detecting device 101 detects the temperature of at least a portion of the stator 22A. In the present embodiment, the temperature-detecting device 101 detects the temperature of one of the coils 35. In the present embodiment, the temperature-detecting device 101 comprises a thermistor.

The support member 102 supports the temperature-detecting device 101. The support member 102 comprises a first support part 105 and a second support part 106. The second support part 106 is disposed radially outward of the first support part 105. In the circumferential direction (left-right direction), the dimension of the second support part 106 is larger than the dimension of the first support part 105.

The first support part 105 comprises a plate part (plate) 105A and a perimeter-wall part (perimeter or peripheral wall) 105B. The plate part 105A has a front surface, which faces forward, and a rear surface, which faces rearward. The front surface of the plate part 105A is the surface of the plate part 105A on a first (one) side in the axial direction. The rear surface of the plate part 105A is the surface of the plate part 105A on the second (other) side in the axial direction. The perimeter-wall part 105B is disposed at (along) a perimeter-edge portion of the front surface of the plate part 105A. The perimeter-wall part 105B protrudes forward from the front surface of the plate part 105A.

The second support part 106 comprises a plate part 106A and a perimeter-wall part 106B. The plate part 106A has a front surface, which faces forward, and a rear surface, which faces rearward. The front surface of the plate part 106A is the surface of the plate part 106A on the first side in the axial direction. The rear surface of the plate part 106A is the surface of the plate part 106A on the second side in the axial direction. The perimeter-wall part 106B is disposed at (along) a perimeter-edge portion of the front surface of the plate part 106A. The perimeter-wall part 106B protrudes forward from the front surface of the plate part 106A. It is noted that the perimeter-wall part 106B is not provided in the region radially outward of the front surface of the plate part 106A.

A partition wall 107 is disposed between the first support part 105 and the second support part 106. The partition wall 107 is connected to a radially-outer-end portion of the perimeter-wall part 105B and to a radially-inner-end portion of the perimeter-wall part 106B.

A recessed part (recess) 105C of the first support part 105, which is defined by the perimeter-wall part 105B, the partition wall 107, and the front surface of the plate part 105A, is provided in the interior of the perimeter-wall part 105B.

A recessed part (recess) 106C of the second support part 106, which is defined by the perimeter-wall part 106B, the partition wall 107, and the front surface of the plate part 106A, is provided in the interior of the perimeter-wall part 106B.

The temperature-detecting device 101 is supported by (on) the first support part 105. In the present embodiment, the temperature-detecting device 101 is disposed on a front surface of the first support part 105. The front surface of the first support part 105 is the surface of the first support part 105 on the first side in the axial direction. The temperature-detecting device 101 is disposed on a front surface of the plate part 105A. The front surface of the plate part 105A is the surface of the plate part 105A on the first side in the axial direction. The temperature-detecting device 101 is disposed in the interior of the recessed part 105C.

The wiring patterns (conductive traces) 103 are connected to the temperature-detecting device 101. Two of the wiring patterns 103 are connected to the temperature-detecting device 101. The detection signal of the temperature-detecting device 101 is supplied to the controller 9 via the wiring patterns 103.

The wiring patterns 103 are provided on the support member 102. The wiring patterns 103 are disposed on a front surface of the support member 102. The front surface of the support member 102 is the surface of the support member 102 on the first side in the axial direction.

In the present embodiment, the support member 102 comprises a molded interconnect device (MID). The wiring patterns 103 are formed on the support member 102 using an MID manufacturing method. The support member 102 is made of a synthetic resin (polymer) that is applicable in (appropriate for) the MID manufacturing method. Liquid-crystal polymers are an illustrative example of a synthetic resin that is applicable in an MID manufacturing method. In an MID manufacturing method, at least a portion of the surface of the support member 102 is irradiated with laser light and, after at least a portion of the surface of the support member 102 has been modified (e.g., etched) by the laser light, the support member 102 undergoes a plating process, and thereby the wiring patterns 103 are formed on the surface of the support member 102.

The wiring patterns 103 comprise terminal parts (pads) 103A, terminal parts (pads) 103B, and connection-line parts (traces) 103C.

The terminal parts 103A are disposed on the front surface of the plate part 105A. The terminal parts 103A are electrically connected to the temperature-detecting device 101.

The terminal parts 103B are disposed on the front surface of the plate part 106A. The terminal parts 103B are electrically connected to the signal wires 143. The terminal parts 103B are electrically connected to the controller 9 via the signal wires 143.

The connection-line parts 103C electrically connect the terminal parts 103A and the terminal parts 103B to each other. A portion of each of the connection-line parts 103C is disposed on the front surface of the plate part 105A. A portion of each of the connection-line parts 103C is disposed on the front surface of the partition wall 107. In the present embodiment, grooves 108 are provided on (in) the front surface of the partition wall 107. A portion of each of the connection-line parts 103C is disposed in the interior of the corresponding groove 108. A portion of each of the connection-line parts 103C is disposed on the front surface of the plate part 105A.

The cover 104 covers the temperature-detecting device 101. The cover 104 covers the temperature-detecting device 101, which is supported by the support member 102. The cover 104 covers at least a portion of the wiring patterns 103, which are disposed on the support member 102. The cover 104 protects the temperature-detecting device 101. The cover 104 protects at least a portion of the wiring patterns 103. It is noted that FIG. 12 shows the temperature-detecting unit 100A in the state in which the cover 104 is omitted.

In the present embodiment, the cover 104 comprises a first cover part 104A and second cover parts 104B. The first cover part 104A is disposed in the recessed part 105C of the first support part 105. The first cover part 104A covers the wiring patterns 103, which are disposed at the temperature-detecting device 101 and on the first support part 105. The second cover parts 104B are disposed in the grooves 108 of the partition wall 107. The second cover parts 104B cover the wiring patterns 103, which are disposed in the grooves 108.

As shown in FIGS. 9 and 12, the temperature-detecting unit 100A, which comprises the temperature-detecting device 101, is disposed in a recessed part (recess) 56, which is provided on (in) the insulator 34. One recessed part 56 is provided on (in) the insulator 34. The recessed part 56 is disposed at a lower portion of the insulator 34. In the circumferential direction, the location of the recessed part 56 and the location of at least a portion of the coupling part 48 are the same.

At least a portion of the recessed part 56 is provided at (in) a front-end portion of the corresponding tooth-covering part 42. At least a portion of the recessed part 56 is provided at (in) the front-insulator part 40.

The recessed part 56 includes a first recessed part (first recess) 57 and a second recessed part (second recess) 58.

The first recessed part 57 is provided at (on) an end portion of the corresponding tooth 38 in the axial direction. In the present embodiment, the first recessed part 57 is provided at (on) a front-end portion of the corresponding tooth 38.

The second recessed part 58 is provided radially outward of the first recessed part 57. The second recessed part 58 is connected to the first recessed part 57. In the circumferential direction (left-right direction), the dimension of the second recessed part 58 is larger than the dimension of the first recessed part 57.

The second recessed part 58 is provided at (on) an end portion of the yoke 37 in the axial direction. In the present embodiment, the second recessed part 58 is provided at (on) a front-end portion of the yoke 37.

The support member 102 is disposed in the recessed part 56. More specifically, the first support part 105 of the support member 102 is disposed in the first recessed part 57 and the second support part 106 of the support member 102 is disposed in the second recessed part 58.

The first support part 105 is disposed on (at) a front-end surface of the corresponding tooth 38. The front-end surface of the corresponding tooth 38 is the end surface of the corresponding tooth 38 on the first side in the axial direction. The second support part 106 is disposed on a front-end surface of the yoke 37. The front-end surface of the yoke 37 is the end surface of the yoke 37 on the first side in the axial direction.

As shown in FIG. 9, when the temperature-detecting unit 100A has been removed from the stator 22A, the portion of the front-end surface of the stator core 33 that is located in the interior of the recessed part 56 is exposed. When the temperature-detecting unit 100A has been removed from the stator 22A, the portion of the front-end surface of the corresponding tooth 38 that is located in the interior of the first recessed part 57 is exposed, and the portion of the front-end surface of the yoke 37 that is located in the interior of the second recessed part 58 is exposed.

After the support member 102 has been disposed in the recessed part 56, a rear surface of the support member 102 opposes (faces) the front-end surface of the corresponding tooth 38. The rear surface of the support member 102 is the surface of the support member 102 on the second side in the axial direction. In the present embodiment, the rear surface of the support member 102 makes contact with the front-end surface of the corresponding tooth 38. In the state in which the support member 102 has been disposed in the recessed part 56, a rear surface of the first support part 105 makes contact with the front-end surface of the corresponding tooth 38, and a rear surface of the second support part 106 makes contact with the front-end surface of the yoke 37.

As shown in FIG. 13, in the axial direction (front-rear direction), the recessed part 56 is disposed between the tooth 38 and the coil 35. At least a portion of the recessed part 56 is provided between the tooth 38 and the coil 35. In the present embodiment, at least the first recessed part (first recess) 57 is provided between the tooth 38 and the coil 35.

When the temperature-detecting unit 100A has been disposed in the recessed part 56, the first support part 105 is disposed between the tooth 38 and the coil 35, the temperature-detecting device 101 is disposed between the first support part 105 and the coil 35, and at least a portion of the cover 104 is disposed between the temperature-detecting device 101 and the coil 35. Owing to the cover 104, the coil 35 and the temperature-detecting device 101 do not contact each other. Therefore, the cover 104 protects (shield) the temperature-detecting device 101 from the coil 35. Owing to the first support part 105, the temperature-detecting device 101 and the tooth 38 do not contact each other. Therefore, heat from the coil 35 is transmitted to the temperature-detecting device 101 via (through) the cover 104. Consequently, the temperature-detecting device 101 detects the temperature of the coil 35 through the cover 104.

Next, an exemplary method for manufacturing the stator 22A will be explained. After the insulator 34 has been fixed to the stator core 33, the temperature-detecting unit 100A is disposed in the recessed part (recess) 56 of the insulator 34. The temperature-detecting unit 100A is disposed in the recessed part 56 such that the rear surface of the support member 102 opposes (faces, directly contacts) the front-end surface of the stator core 33. After the temperature-detecting unit 100A has been disposed in the recessed part 56, the coils 35 are respectively wound on the teeth 38 over (around) the tooth-covering parts 42. For the tooth 38 having the temperature-detecting unit 100A in direct contact therewith, the corresponding coil 35 is also wound over (around) the cover 104. Thereafter, as described above, the busbar unit 36 is fixed to the front-insulator part 40, and then the sensor unit 24 is connected to the busbar unit 36.

Next, the operation of the electric work machine 1 will be explained. When the trigger switch 10 is manipulated (pressed) by the user such that the trigger switch 10 moves rearward, the controller 9 operates (controls, drives) the motor 6 in accordance with the operation signal supplied from the trigger switch 10. When the motor 6 is operating (driven, energized), the anvil 8, on which the tool accessory has been mounted, rotates.

During operation of the electric work machine 1, the temperature-detecting device 101 of the temperature-detecting unit 100A, which is disposed on (in) the stator 22A (more specifically, on the stator core 33 and in a recess 56 of the insulator 34), detects the temperature of one of the coils 35. The detection signal of the temperature-detecting device 101 is supplied to the controller 9 via the wiring patterns 103 and the signal wires 143. When it has been determined, based on the detection signal from the temperature-detecting device 101, that the temperature of the coil 35 has exceeded a preset threshold, the motor 6 is caused to stop, even if the trigger switch 10 is still being manipulated (pressed). Thereby, because the drive currents are no longer being supplied to the coils 35, a further rise in the temperature of the coils 35 is curtailed. If the temperature of the coils 35 were to rise excessively, there is a possibility that the coils 35 will burn out. However, according to the present embodiment, the temperature of one of the coils 35 is detected by the temperature-detecting device 101, and therefore, when it has been determined by the controller 9 that the temperature of one of the coils 35 has exceeded the preset threshold, the supply of the drive currents to the coils 35 is stopped. Thereby, because a further rise in the temperature of the coils 35 is curtailed, the coils 35 are protected from burnout.

Effects

According to the present embodiment as explained above, the electric work machine 1 comprises the motor 6, the anvil 8, which is the output part, and the temperature-detecting device 101. The motor 6 comprises the stator 22A and the rotor 23, which rotates about rotational axis AX relative to the stator 22A. The anvil 8 is driven by the rotor 23. The temperature-detecting device 101 is disposed on (in) the stator 22A. The stator 22A comprises the stator core 33, the insulator 34, and the coils 35. The stator core 33 comprises the tube-shaped yoke 37 and the teeth 38, which protrude from the yoke 37 in the radial direction. The insulator 34 comprises the tooth-covering parts 42 that cover at least a portion of surfaces of the teeth 38. The insulator 34 is fixed to the stator core 33. The coils 35 are respectively wound on the teeth 38 via (over, around) the tooth-covering parts 42. The temperature-detecting device 101 is disposed in the recessed part (recess) 56, which is provided on (in) the insulator 34.

According to the above-mentioned configuration, because the temperature-detecting device 101 is disposed in a recessed part (recess) 56 of the insulator 34, it is possible to configure the stator 22A, in which the temperature-detecting device 101 is disposed, at a lower cost. In addition, the temperature-detecting device 101 can more suitably detect the temperature of the stator 22A and one of the coils 35.

In the present embodiment, in an axial direction (front-rear direction), the recessed part (recess) 56 is disposed between one of the teeth 38 and the coil 35 wound around that tooth 38.

According to the above-mentioned configuration, the temperature-detecting device 101 is disposed between one of the teeth 38 and the corresponding coil 35 in the axial direction. Consequently, the dimension of the stator 22A in the axial direction is held down.

In the present embodiment, at least a portion of the recessed part (recess) 56 is provided between the tooth 38, on (at) which the temperature-detecting device 101 is provided, and the coil 35.

According to the above-mentioned configuration, the temperature-detecting device 101 is disposed between one of the teeth 38 and the corresponding coil 35. Consequently, the temperature of the coil 35 can be suitably detected by the temperature-detecting device 101. As was explained above, the motor 6 is air-cooled by a fan 7 and some of the cooling airflow is supplied to (flows over) the outer surfaces of the coils 35. Therefore, the temperature of the outer surfaces of the coils 35 may significantly fluctuate during operation due to the cooling air and/or may be significantly different from, e.g., the teeth 38 or the yoke 37 of the stator 22A. Consequently, if a temperature-detecting device were to be (hypothetically) disposed on the outer surface of the coil 35, there is a possibility that the detection signal of the temperature-detecting device 101 will become unstable or unreliable. However, because the cooling air is not directly supplied between the coil 35 and the tooth 38, by disposing the temperature-detecting device 101 between the coil 35 and the tooth 38, the detection signal of the temperature-detecting device 101 stabilizes and becomes more reliable. Consequently, the temperature of the coil 35 can be more suitably detected by the temperature-detecting device 101.

In the present embodiment, the electric work machine 1 comprises the support member 102, which supports the temperature-detecting device 101. The support member 102 is disposed in the recessed part (recess) 56.

According to the above-mentioned configuration, if the wiring patterns 103 electrically connected to the temperature-detecting device 101 are to be formed by, for example, an MID manufacturing method, the wiring patterns 103 are preferably formed on the support member 102. That is, instead of forming wiring patterns on the insulator 34 using an MID manufacturing method, by forming the wiring patterns 103 on the support member 102, which is detachable from the insulator 34, using an MID manufacturing method, the manufacturing cost of the wiring patterns 103 can be held down.

In the present embodiment, the recessed part (recess) 56 includes the first recessed part (first recess) 57, which is provided at (adjacent) an end portion of the tooth 38 in the axial direction. The support member 102 comprises the first support part (first support portion) 105, which is disposed in the first recessed part (first recess) 57. The temperature-detecting device 101 is supported by (on, in) the first support part 105.

According to the above-mentioned configuration, because the temperature-detecting device 101 is disposed on (adjacent) the tooth 38, on which the coil 35 is wound, the temperature of the coil 35 can be more suitably detected than if the temperature-detecting device 101 were to be placed, e.g., on an outer surface of a coil that is cooled by a cooling airflow during operation. That is, as has been repeatedly stated above, the motor 6 is air-cooled by the fan 7 and thus cooling air is supplied to the outer surfaces of the coils 35. Thus, there is a strong possibility that the temperature of the surfaces of the coils 35 will fluctuate due to the air for cooling. Consequently, if the temperature-detecting device 101 were to be (hypothetically) disposed on the outer surface of one of the coils 35, there is a possibility that the detection signal of the temperature-detecting device 101 will become unstable. However, because the cooling air is not directly supplied between the coil 35 and the tooth 38, by disposing the temperature-detecting device 101 between the coil 35 and the tooth 38, the detection signal of the temperature-detecting device 101 stabilizes. Consequently, the temperature of the coil 35 can be suitably detected by the temperature-detecting device 101. In addition, because the first recessed part 57 is disposed at (adjacent, in contact with) an end portion of the tooth 38 in the axial direction, work efficiency during assembly when the first support part 105 is being disposed in the first recessed part 57 can be improved.

In the present embodiment, the first support part (first support) 105 is disposed between one of the teeth 38 and the coil 35 surrounding that tooth 38; and the temperature-detecting device 101 is disposed between the first support part 105 and the coil 35.

According to the above-mentioned configuration, because the temperature-detecting device 101 is disposed at a location that is closer to the coil 35 than the first support part 105 is, the temperature of the coil 35 can be suitably detected.

In the present embodiment, the first support part 105 is disposed on (at, in contact with) a front-end surface of the tooth 38; and the temperature-detecting device 101 is disposed on (at, in thermal contact with) a front surface of the first support part 105.

According to the above-mentioned configuration, the first support part 105 is disposed on (at, in contact with) the front-end surface of the tooth 38, and the temperature-detecting device 101 is disposed on (at, in thermal contact with) the front surface of the first support part 105. Thereby, the temperature-detecting device 101 and the first support part 105 are suitably disposed relative to the coil 35.

In the present embodiment, the first support part 105 comprises the plate part (plate) 105A and the perimeter-wall part (perimeter wall) 105B, which is disposed at (along) a perimeter-edge portion of a front surface of the plate part 105A. The temperature-detecting device 101 is disposed on (at, in thermal contact with) the front surface of the plate part 105A.

According to the above-mentioned configuration, the perimeter-wall part 105B is provided at (along) the perimeter-edge portion of the front surface of the plate part 105A, and the temperature-detecting device 101 is disposed on (at, in thermal contact with) the front surface of the plate part 105A. Because the temperature-detecting device 101 is surrounded by the perimeter-wall part 105B, the coil 35 makes contact with the perimeter-wall part 105B rather than the temperature-detecting device 101. Therefore, for example, the coil 35 does not directly contact the temperature-detecting device 101. Consequently, the temperature-detecting device 101 is protected (shielded) from the coil 35.

In the present embodiment, the wiring patterns (conductive traces) 103, which are electrically connected to the temperature-detecting device 101, are provided. The wiring patterns 103 are disposed on a front surface of the support member 102.

According to the above-mentioned configuration, the wiring patterns 103 are disposed on the front surface of the support member 102. Thereby, the temperature-detecting device 101, the wiring patterns 103, and the signal wires 143 are suitably connected on the support member 102. In addition, by forming the wiring patterns 103 on the support member 102 using an MID manufacturing method, the manufacturing cost of the wiring patterns 103 can be held down.

In the present embodiment, the recessed part (recess) 56 includes the second recessed part (second recess) 58, which is provided radially outward of the first recessed part 57 and is connected to the first recessed part 57. The support member 102 comprises the second support part (second support) 106, which is disposed in the second recessed part 58. In the circumferential direction, the dimension (e.g., length) of the second support part 106 is larger than the dimension (e.g., length) of the first support part 105.

According to the above-mentioned configuration, because the dimension of the second support part 106 is larger than the dimension of the first support part 105, work efficiency during assembly when connecting the wiring patterns 103 and the signal wires 143 can be improved owing to the connection of the wiring patterns 103 and the signal wires 143 on the second support part 106. In addition, because a step is (e.g., two shoulders 56S (see FIG. 9) are) formed at the boundary between the first recessed part 57 and the second recessed part 58 and a step is (e.g., two corresponding shoulders 102S (see FIG. 10) are) formed at the boundary between the first support part 105 and the second support part 106, the recessed part 56 and the support member 102 can be positioned relative to each other in a simple manner.

In the present embodiment, the second recessed part (second recess) 58 is provided at (on) an end (edge) portion of the yoke 37 in the axial direction.

According to the above-mentioned configuration, because the second support part 106 is disposed on the yoke 37, work efficiency during assembly when disposing the support member 102 in the recessed part 56 can be improved.

In the present embodiment, the cover 104, which covers the temperature-detecting device 101 supported by the support member 102, is provided.

According to the above-mentioned configuration, the temperature-detecting device 101 is protected by the cover 104. That is, when the temperature-detecting device 101 opposes (is surrounded by) the coil 35, the temperature-detecting device 101 is protected (shielded) from the coil 35 by the cover 104.

Second Embodiment

A second embodiment will now be explained. In the explanation below, structural elements that are identical or equivalent to those in the first embodiment described above are assigned identical symbols, and explanations of those structural elements are abbreviated or omitted.

Temperature-Detecting Unit

Figure 15:
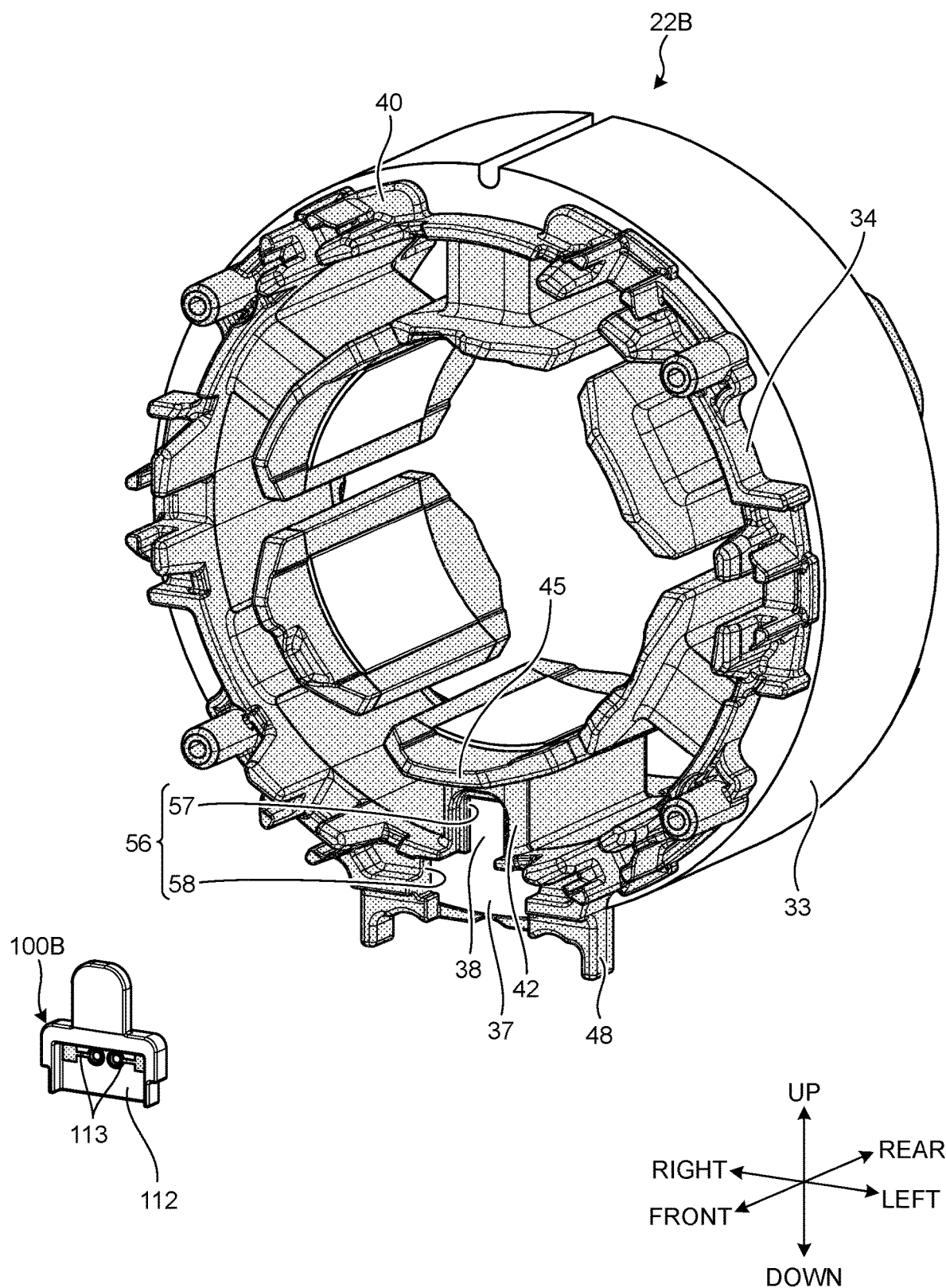
FIG. 15 is an exploded, oblique view, viewed from the front, that shows the stator core, the insulator, and the temperature-detecting unit according to the second embodiment.
Figure 16:
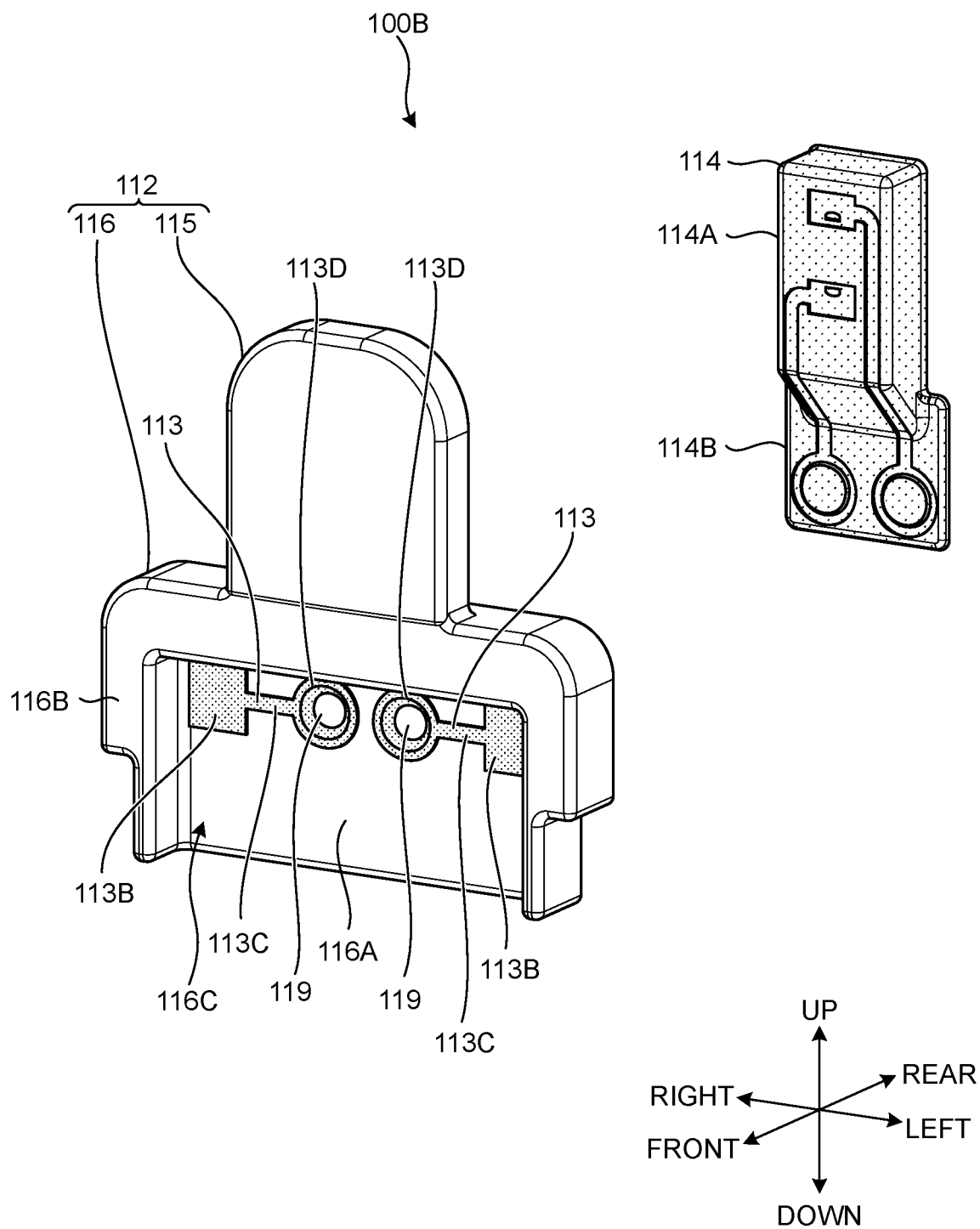
FIG. 16 is an exploded, oblique view, viewed from the front, that shows the temperature-detecting unit according to the second embodiment.
Figure 17:
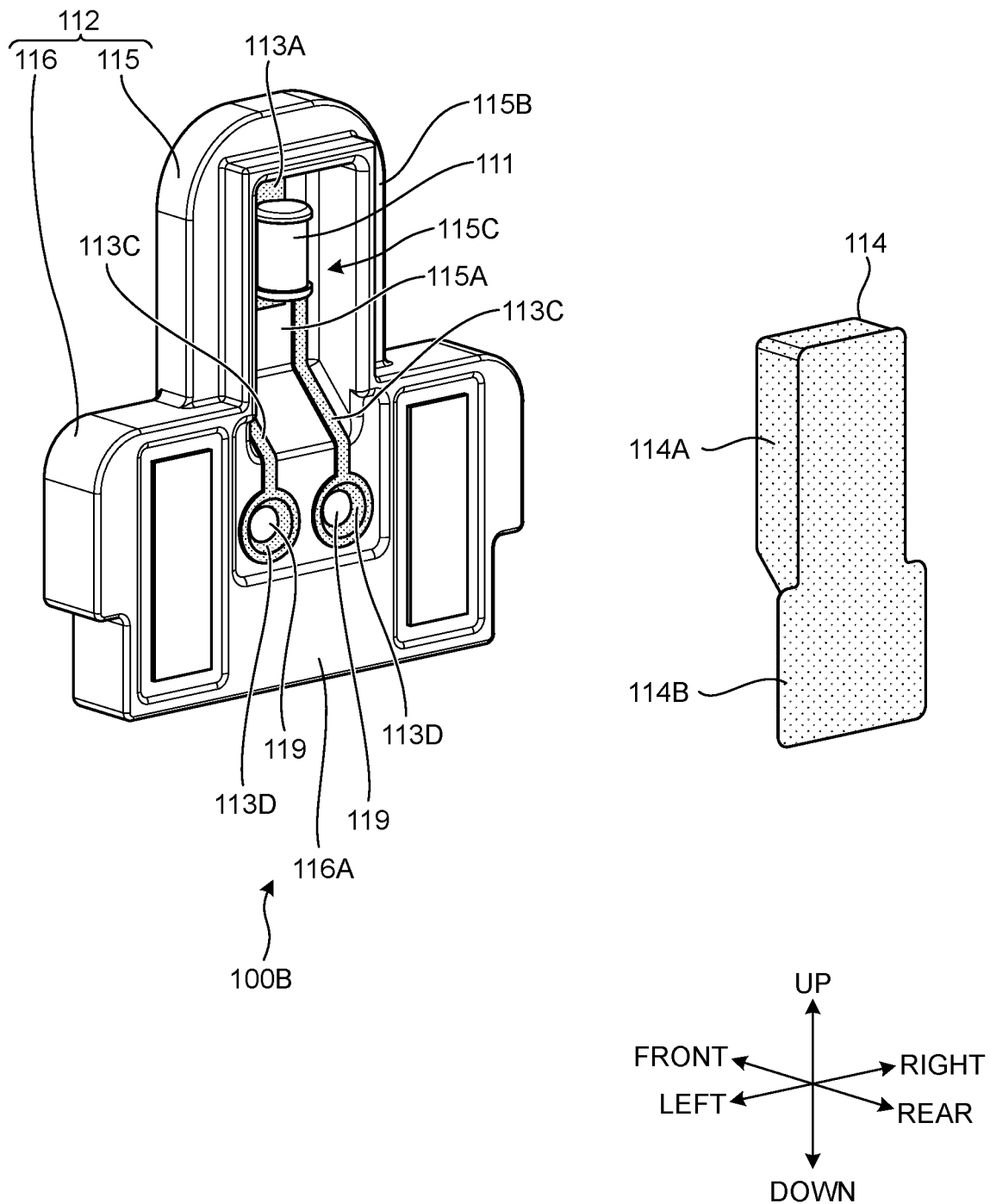
FIG. 17 is an exploded, oblique view, viewed from the rear, that shows the temperature-detecting unit according to the second embodiment.

FIG. 14 is an oblique view, viewed from the front, that shows the stator core 33, the insulator 34, and a temperature-detecting unit 100B according to the present embodiment. FIG. 15 is an exploded, oblique view, viewed from the front, that shows the stator core 33, the insulator 34, and the temperature-detecting unit 100B according to the present embodiment. FIG. 16 is an exploded, oblique view, viewed from the front, that shows the temperature-detecting unit 100B according to the present embodiment. FIG. 17 is an exploded, oblique view, viewed from the rear, that shows the temperature-detecting unit 100B according to the present embodiment. FIG. 18 is an oblique view that shows the temperature-detecting unit 100B, which has been disposed in the insulator 34, according to the present embodiment. FIG. 19 is a cross-sectional view that shows the temperature-detecting unit 100B, which has been disposed in the insulator 34, according to the present embodiment.

Stator 22B comprises the stator core 33 and the insulator 34. The temperature-detecting unit 100B is disposed on (in) the stator 22B. More specifically, one temperature-detecting unit 100B is disposed on (in) the stator 22B. The temperature-detecting unit 100B is disposed at (on) a lower portion of the stator core 33. In the circumferential direction, the location of the temperature-detecting unit 100B and the location of at least a portion of the coupling part 48 are the same.

The temperature-detecting unit 100B comprises a temperature-detecting device 111, a support member 112, wiring patterns 113, and a cover 114.

The temperature-detecting device 111 detects the temperature of at least a portion of the stator 22B. The temperature-detecting device 111 detects the temperature of one of the coils 35. The temperature-detecting device 111 comprises a thermistor.

The support member 112 supports the temperature-detecting device 111. The support member 112 comprises a first support part 115 and a second support part 116. The second support part 116 is disposed radially outward of the first support part 115. In the circumferential direction (left-right direction), the dimension (e.g., length) of the second support part 116 is larger than the dimension (e.g., length) of the first support part 115.

As shown in FIG. 17, the first support part 105 comprises a plate part (plate) 115A and a perimeter-wall part (perimeter wall) 115B. The plate part 115A has a front surface, which faces forward, and a rear surface, which faces rearward. The front surface of the plate part 115A is the surface of the plate part 115A on the first side in the axial direction. The rear surface of the plate part 115A is the surface of the plate part 115A on the second side in the axial direction. The perimeter-wall part 115B is disposed at (along) a perimeter-edge portion of the rear surface of the plate part 115A. The perimeter-wall part 115B protrudes rearward from the rear surface of the plate part 115A. A recessed part (recess) 115C of the first support part 115, which is defined by the perimeter-wall part 115B and the rear surface of the plate part 115A, is provided in the interior of the perimeter-wall part 115B.

As shown in FIG. 16, the second support part 106 comprises a plate part (plate) 116A and a perimeter-wall part (perimeter wall) 116B. The plate part 116A has a front surface, which faces forward, and a rear surface, which faces rearward. The front surface of the plate part 116A is the surface of the plate part 116A on the first side in the axial direction. The rear surface of the plate part 116A is the surface of the plate part 116A on the second side in the axial direction. The perimeter-wall part 116B is disposed at (along) a perimeter-edge portion of the front surface of the plate part 116A. The perimeter-wall part 116B protrudes forward from the front surface of the plate part 116A. It is noted that the perimeter-wall part 116B is not provided in the region radially outward of the front surface of the plate part 116A. A recessed part (recess) 116C of the second support part 116, which is defined by the perimeter-wall part 116B and the front surface of the plate part 116A, is provided in the interior of the perimeter-wall part 116B.

The temperature-detecting device 111 is supported by (on) the first support part 115. In the present embodiment, the temperature-detecting device 111 is disposed on a rear surface of the first support part 115. The rear surface of the first support part 115 is the surface of the first support part 115 on the second side in the axial direction. The temperature-detecting device 111 is disposed on a rear surface of the plate part 115A. The rear surface of the plate part 115A is the surface of the plate part 115A on the second side in the axial direction. The temperature-detecting device 111 is disposed in the interior of the recessed part 115C.

The wiring patterns (conductive traces) 113 are electrically connected to the temperature-detecting device 111. Two of the wiring patterns 113 are electrically connected to the temperature-detecting device 111. The detection signal of the temperature-detecting device 111 is supplied to the controller 9 via the wiring patterns 113.

The wiring patterns 113 are provided on the support member 112. A portion of each of the wiring patterns 113 is disposed on a rear surface of the support member 112. The rear surface of the support member 112 is the surface of the support member 112 on the second side in the axial direction. A portion of the wiring patterns 113 is disposed on a front surface of the support member 112. The front surface of the support member 112 is the surface of the support member 112 on the first side in the axial direction.

In the present embodiment, like the support member 102 explained in the first embodiment described above, the support member 112 comprises a molded interconnect device (MID). The wiring patterns 113 are formed on the support member 112 using an MID manufacturing method.

The wiring patterns 113 comprise terminal parts (pads) 113A, terminal parts (pads) 113B, connection-line parts (line traces) 113C, and connection ring parts (circle traces) 113D.

The terminal parts 113A are disposed on the rear surface of the plate part 115A. The terminal parts 113A are electrically connected to the temperature-detecting device 111.

The terminal parts 113B are disposed on the front surface of the plate part 116A. The terminal parts 113B are electrically connected to the signal wires 143. The terminal parts 113B are electrically connected to the controller 9 via the signal wires 143.

The connection-line parts 113C and the connection-ring parts 113D electrically connect the terminal parts 113A and the terminal parts 113B to each other. A portion of each of the connection-line parts 113C is disposed on a rear surface of the plate part 115A and a rear surface of the plate part 116A. A portion of each of the connection-line parts 113C is disposed on a front surface of the plate part 116A.

In the present embodiment, the support member 112 has through holes 119, which pass through the front surface of the support member 112 and the rear surface of the support member 112. The through holes 119 are provided such that they pass through the front surface of the plate part 116A and the rear surface of the plate part 116A. The number of through holes 119 provided is the same as the number of wiring patterns 113. In the present embodiment, two of the through holes 119 are provided in the plate part 116A spaced apart in the circumferential direction (left-right direction).

The connection-ring parts 113D are disposed so as to surround the through holes 119. A portion of each of the connection-ring parts 113D is disposed so as to surround the corresponding through hole 119 on (at) the rear surface of the plate part 116A. A portion of each of the connection-ring parts 113D is disposed so as to surround the corresponding through hole 119 on (at) the front surface of the plate part 116A. The connection-ring parts 113D disposed on the rear surface of the plate part 116A and the connection-ring parts 113D disposed on the front surface of the plate part 116A are electrically connected (in an electrically-conductive state).

The connection-line parts 113C, which are disposed on the rear surface of the plate part 115A and the rear surface of the plate part 116A, electrically connect the terminal parts 113A and the connection-ring parts 113D, which are disposed on the rear surface of the plate part 116A, to each other. The connection-line parts 113C, which are disposed on the front surface of the plate part 116A, electrically connect the connection-ring parts 113D, which are disposed on the front surface of the plate part 116A, and the terminal parts 113B to each other. A portion of the wiring patterns 113 disposed on the rear surface of the support member 112 and a portion of the corresponding wiring pattern 113 disposed on the front surface of the support member 112 are electrically connected via the corresponding through hole 119, in which the corresponding connection-ring part 113D is disposed.

The cover 114 covers the temperature-detecting device 111. More specifically, the cover 114 covers the temperature-detecting device 111, which is supported by (on) the support member 112. In addition, the cover 114 covers at least a portion of the wiring patterns 113, which are disposed on the support member 112. The cover 114 protects the temperature-detecting device 111. The cover 114 protects at least a portion of the wiring patterns 113.

In the present embodiment, the cover 114 comprises a first cover part 114A and a second cover part 114B. The first cover part 114A is disposed in the recessed part 115C of the first support part 115. The first cover part 114A covers the temperature-detecting device 111 and the wiring patterns 113, which are disposed on the rear surface of the first support part 115. The second cover part 114B is disposed so as to cover a portion of the rear surface of the second support part 116. The second cover part 114B covers the connection-line parts 113C and the connection-ring parts 113D, which are disposed on the rear surface of the second support part 116.

As shown in FIGS. 15 and 18, the temperature-detecting unit 100B, which comprises the temperature-detecting device 111, is disposed in the recessed part (recess) 56, which is provided in (on) the insulator 34. One recessed part 56 is provided in (on) the insulator 34. The recessed part 56 is disposed at a lower portion of the insulator 34. In the circumferential direction, the location of the recessed part 56 and the location of at least a portion of the coupling part 48 are the same.

At least a portion of the recessed part 56 is provided at (on) a front-end portion of the corresponding tooth-covering part 42. At least a portion of the recessed part 56 is provided at (on) the front-insulator part 40.

The same as in the embodiment described above, the recessed part 56 includes the first recessed part (first recess) 57 and the second recessed part (second recess) 58. The first recessed part 57 is provided at a front-end portion of the tooth 38. The second recessed part 58 is provided at a front-end portion of the yoke 37.

The support member 112 is disposed in the recessed part 56. The first support part 115 of the support member 112 is disposed in the first recessed part 57. The second support part 116 of the support member 112 is disposed in the second recessed part 58.

The first support part 115 is disposed on (at, in thermal contact with) a front-end surface of the corresponding tooth 38. The second support part 116 is disposed on (at, adjacent) a front-end surface of the yoke 37.

As shown in FIG. 15, when the temperature-detecting unit 100B has been removed from the stator 22B, the front-end surface of the stator core 33 in the interior of the recessed part 56 is exposed, the front-end surface of the corresponding tooth 38 in the interior of the first recessed part 57 is exposed, and the front-end surface of the yoke 37 in the interior of the second recessed part 58 is exposed.

When the support member 112 has been disposed in the recessed part 56, a rear surface of the support member 112 opposes (faces, directly contacts) the front-end surface of the corresponding tooth 38. More specifically, at least a portion of a rear surface of the first support part 115 makes contact with the front-end surface of the corresponding tooth 38, and at least a portion of a rear surface of the second support part 116 makes contact with the front-end surface of the yoke 37.

As shown in FIG. 19, in the axial direction (front-rear direction), the recessed part (recess) 56 is disposed between the tooth 38 and the coil 35 surrounding that tooth 38. At least a portion of the recessed part 56 is provided between the tooth 38 and the coil 35. At least the first recessed part 57 is provided between the tooth 38 and the coil 35.

When the temperature-detecting unit 100B has been disposed in the recessed part 56, the first support part 115 is disposed between the tooth 38 and the coil 35. More specifically, the temperature-detecting device 111 is disposed between the first support part (first support) 115 and the tooth 38, and at least a portion of the cover 114 is disposed between the temperature-detecting device 111 and the tooth 38. Owing to the cover 114, the temperature-detecting device 111 and the tooth 38 do not contact each other. Owing to the first support part 115, the coil 35 and the temperature-detecting device 111 do not contact each other. Heat from the coil 35 is transmitted to the temperature-detecting device 111 via (through) the first support part 115. Thus, the temperature-detecting device 111 detects the temperature of the coil 35 through the cover 114.

Next, an exemplary method for manufacturing the stator 22B will be explained. After the insulator 34 has been fixed to the stator core 33, the temperature-detecting unit 100B is disposed in the recessed part 56 of the insulator 34. More specifically, the temperature-detecting unit 100B is disposed in the recessed part 56 such that the rear surface of the support member 112 and the cover 114 opposes the front-end surface of the stator core 33. After the temperature-detecting unit 100B has been disposed in the recessed part 56, the coils 35 are wound on the teeth 38 via (over, around) the first support part 115 and the tooth-covering parts 42. More specifically, the coils 35 are respectively wound on the teeth 38 via (over, around) the tooth-covering parts 42; for the coil 35 surrounding the tooth 38 having the temperature-detecting unit 100B associated therewith, the coil 35 is also wound over (around) the first support part 115. Thereafter, as described above, the busbar unit 36 is fixed to the front-insulator part 40, and then the sensor unit 24 is connected to the busbar unit 36.

Effects

According to the present embodiment as explained above, the first support part (first support) 115 is disposed between one of the teeth 38 and the coil 35 surrounding that tooth 38, and the temperature-detecting device 111 is disposed between the first support part 115 and the tooth 38.

According to the above-mentioned configuration, because the temperature-detecting device 111 is disposed at a location that is more distant from the coil 35 than the first support part 115 is, the temperature-detecting device 111 is protected (shielded) from the coil 35.

In the present embodiment, the first support part 115 is disposed on (at, in thermal contact with) a front-end surface of the tooth 38; and the temperature-detecting device 111 is disposed on (at, adjacent) a rear surface of the first support part 115.

According to the above-mentioned configuration, the first support part 115 is disposed on the front-end surface of the tooth 38, and the temperature-detecting device 111 is disposed on the rear surface of the first support part 115. Thereby, the temperature-detecting device 111 and the first support part 115 are suitably disposed relative to the coil 35.

In the present embodiment, the first support part 115 comprises the plate part (plate) 115A and the perimeter-wall part (perimeter wall) 115B, which is disposed at a perimeter-edge portion of the rear surface of the plate part 115A. The temperature-detecting device 111 is disposed on the rear surface of the plate part 115A.

According to the above-mentioned configuration, the perimeter-wall part 115B is provided on a perimeter-edge portion of the rear surface of the plate part 115A, and the temperature-detecting device 111 is disposed on the rear surface of the plate part 115A. Owing to the temperature-detecting device 111 being surrounded by the perimeter-wall part 115B, the tooth 38 makes contact with the perimeter-wall part 115B, and therefore, for example, the tooth 38 does not directly contact the temperature-detecting device 111. Consequently, the temperature-detecting device 111 is protected (shielded) from the tooth 38 by the perimeter-wall part 115B.

In the present embodiment, the wiring patterns 113, which are electrically connected to the temperature-detecting device 111, are provided. A portion of the wiring patterns 113 is disposed on a rear surface of the support member 112; and a portion of the wiring patterns 113 is disposed on a front surface of the support member 112.

According to the above-mentioned configuration, a portion of the wiring patterns 113 is disposed on the rear surface of the support member 112, and a portion of the wiring patterns 113 is disposed on the front surface of the support member 112. Thereby, the temperature-detecting device 111, the wiring patterns 113, and the signal wires 143 are suitably connected on the support member 112. In addition, if the wiring patterns 113 are formed on the support member 112, e.g., using an MID manufacturing method, the manufacturing cost of the wiring patterns 113 can be held down.

In the present embodiment, the support member 112 has the through holes 119 that pass through the rear surface of the support member 112 and the front surface of the support member 112. A portion of the wiring patterns 113 disposed on the rear surface of the support member 112 is electrically connected to a portion of the wiring patterns 113 disposed on the front surface of the support member 112 via the corresponding through holes 119.

According to the above-mentioned configuration, by providing the through holes 119 in the support member 112, the wiring patterns 113 disposed on the rear surface of the support member 112 and the wiring patterns 113 disposed on the front surface of the support member 112 can be electrically connected to each other via the through holes 119.

In the present embodiment, the cover 114, which covers the temperature-detecting device 111 supported by the support member 112, is provided.

According to the above-mentioned configuration, the temperature-detecting device 111 is protected (shielded) by the cover 114. That is, when the temperature-detecting device 111 opposes the tooth 38, the temperature-detecting device 111 is protected from the tooth 38 by the cover 114.

Third Embodiment

A third embodiment will now be explained. In the explanation below, structural elements that are identical or equivalent to those in the first and second embodiments described above are assigned identical symbols, and explanations of those structural elements are abbreviated or omitted.

Temperature-Detecting Unit

Figure 21:
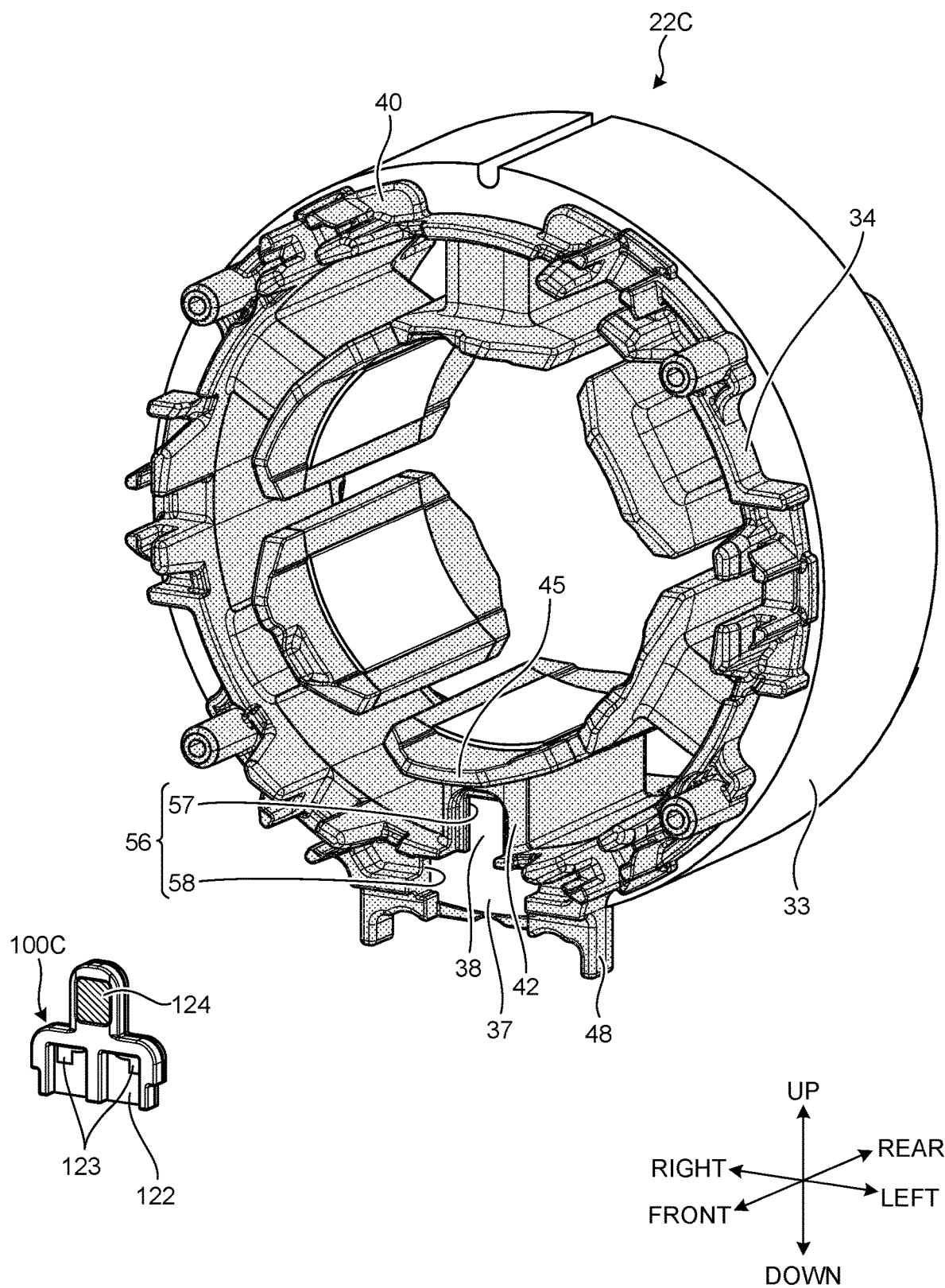
FIG. 21 is an exploded, oblique view, viewed from the front, that shows the stator core, the insulator, and the temperature-detecting unit according to the third embodiment.
Figure 22:
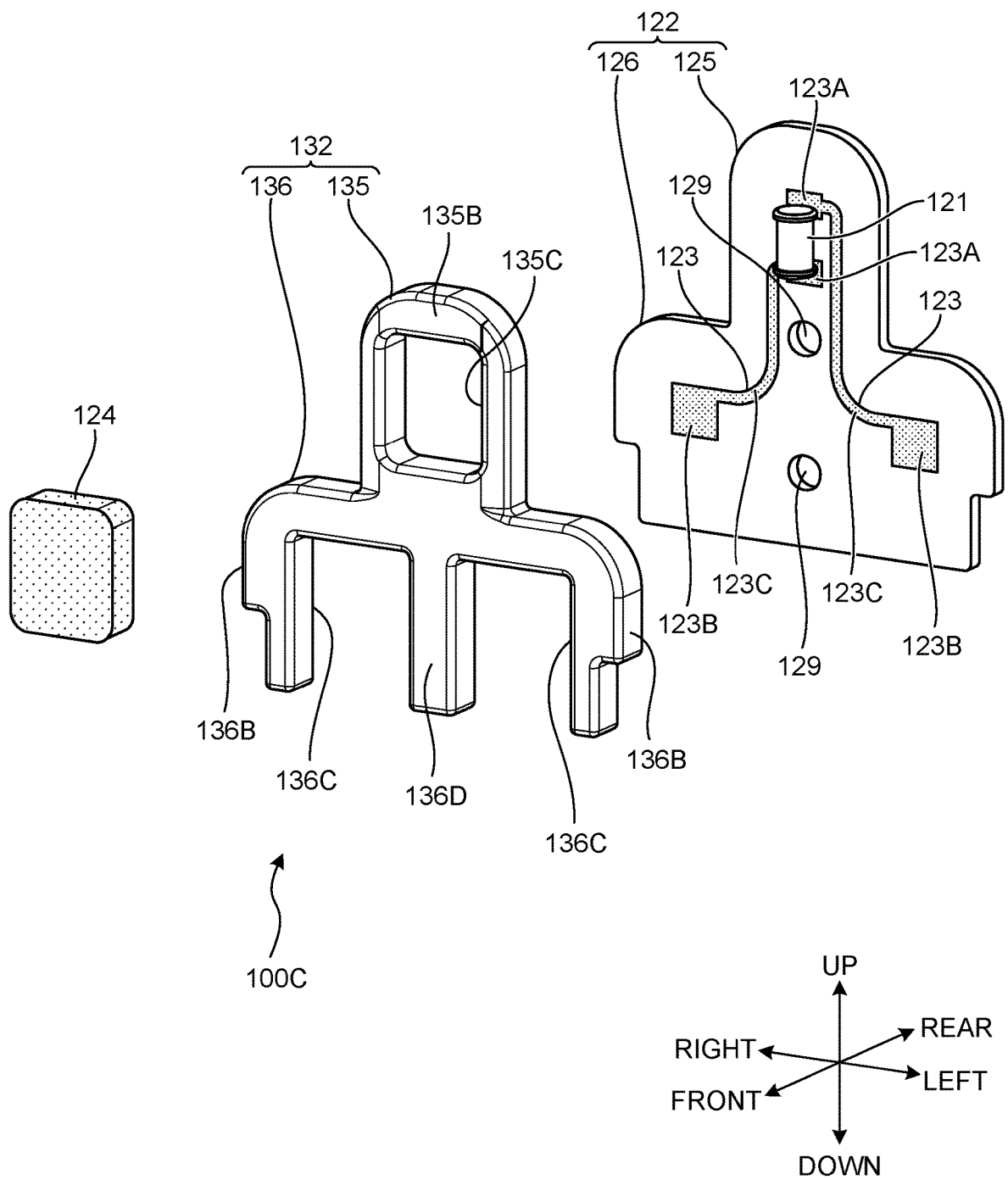
FIG. 22 is an exploded, oblique view, viewed from the front, that shows the temperature-detecting unit according to the third embodiment.
Figure 23:
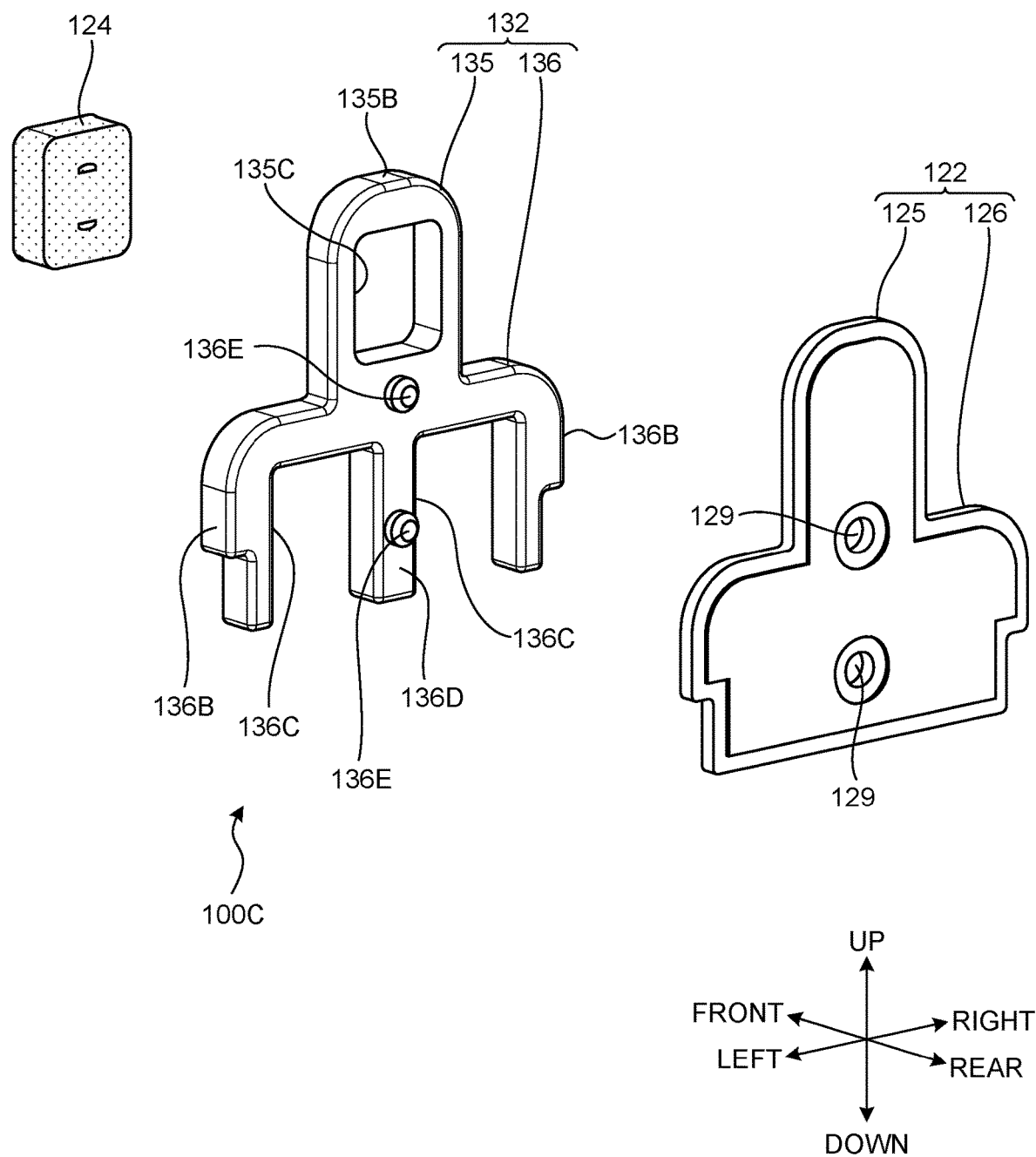
FIG. 23 is an exploded, oblique view, viewed from the rear, that shows the temperature-detecting unit according to the third embodiment.

FIG. 20 is an oblique view, viewed from the front, that shows the stator core 33, the insulator 34, and a temperature-detecting unit 100C according to the present embodiment. FIG. 21 is an exploded, oblique view, viewed from the front, that shows the stator core 33, the insulator 34, and the temperature-detecting unit 100C according to the present embodiment. FIG. 22 is an exploded, oblique view, viewed from the front, that shows the temperature-detecting unit 100C according to the present embodiment. FIG. 23 is an exploded, oblique view, viewed from the rear, that shows the temperature-detecting unit 100C according to the present embodiment. FIG. 24 is an oblique view that shows the temperature-detecting unit 100C, which has been disposed in the insulator 34, according to the present embodiment. FIG. 25 is a cross-sectional view that shows the temperature-detecting unit 100C, which has been disposed in the insulator 34, according to the present embodiment.

Stator 22C comprises the stator core 33 and the insulator 34. The temperature-detecting unit 100C is disposed on (in) the stator 22C. One temperature-detecting unit 100C is disposed on (in) the stator 22C. The temperature-detecting unit 100C is disposed at (on) a lower portion of the stator core 33. In the circumferential direction, the location of the temperature-detecting unit 100C and the location of at least a portion of the coupling part 48 are the same.

The temperature-detecting unit 100C comprises a temperature-detecting device 121, a support member 122, wiring patterns (conductive traces) 123, a connecting member 132, and a cover 124.

The temperature-detecting device 121 detects the temperature of at least a portion of the stator 22C. The temperature-detecting device 121 detects the temperature of one of the coils 35. The temperature-detecting device 121 comprises a thermistor.

The support member 122 supports the temperature-detecting device 121. The support member 122 has a plate shape. The support member 122 comprises a first support part (first support) 125 and a second support part (second support) 126. The second support part 126 is disposed radially outward of the first support part 125. In the circumferential direction (left-right direction), the dimension (e.g., length) of the second support part 126 is larger (e.g., length) than the dimension of the first support part 125.

The temperature-detecting device 121 is supported by (on) the first support part 125. In the present embodiment, the temperature-detecting device 121 is disposed on a front surface of the first support part 125. The front surface of the first support part 125 is the surface of the first support part 125 on the first side in the axial direction.

The wiring patterns 123 are electrically connected to the temperature-detecting device 121. More specifically, two of the wiring patterns 123 are electrically connected to the temperature-detecting device 121. The detection signal of the temperature-detecting device 121 is supplied to the controller 9 via the wiring patterns 123.

The wiring patterns 123 are provided on the support member 122. The wiring patterns 123 are disposed on a front surface of the support member 122. The front surface of the support member 122 is the surface of the support member 122 on the first side in the axial direction.

In the present embodiment, the support member 122 comprises a printed wiring board (PWB), which is also known as a printed circuit board (PCB). The support member 122 comprises an insulative board. The wiring patterns 123 are disposed (arrayed) on the front surface of the support member 122. The temperature-detecting device 121 is installed on the front surface of the support member 122.

The wiring patterns 123 comprise terminal parts (pads) 123A, terminal parts (pads) 123B, and connection-line parts (conductive traces) 123C.

The terminal parts 123A are disposed on the front surface of the first support part 125. The terminal parts 123A are connected to the temperature-detecting device 121.

The terminal parts 123B are disposed on the front surface of the second support part 126. The second support part 126 comprises a printed wiring board (PWB) or printed circuit board (PCB). The terminal parts 123B are electrically connected to the signal wires 143. The terminal parts 123B are electrically connected to the controller 9 via the signal wires 143.

The connection-line parts 123C electrically connect the terminal parts 123A and the terminal parts 123B to each other.

The connecting member 132 is connected to the front surface of the support member 122. The connecting member 132 has protruding parts 136E, which protrude rearward from the rear surface of the connecting member 132. More specifically, two of the protruding parts 136E are provided spaced apart in the up-down direction. The support member 122 has support holes 129, into which the protruding parts 136E are inserted. More specifically, two of the support holes 129 are provided spaced apart in the up-down direction. By inserting the two protruding parts 136E into the respective support holes 129, the connecting member 132 and the support member 122 are connected to each other. The rear surface of the connecting member 132 and the front surface of the support member 122 make contact with each other.

The connecting member 132 comprises a first connecting part 135 and a second connecting part 136. The first connecting part 135 is connected to the front surface of the first support part 125. The second connecting part 136 is connected to the front surface of the second support part 126.

The first connecting part 135 comprises a frame part (frame) 135B. An opening 135C is formed in the interior of the frame part 135B. By connecting the first connecting part 135 to the front surface of the first support part 125, the frame part 135B functions as a perimeter-wall part that is disposed on (along, around) a perimeter-edge portion of the front surface of the first support part 125.

The second connecting part 136 comprises frame parts (legs) 136B and a partition part (center leg) 136D. The frame parts 136B are disposed on a left-end portion and a right-end portion of the second connecting part 136. In the left-right direction, the partition part 136D is disposed between the pair of frame parts 136B. Openings 136C are provided between the frame parts 136B and the partition part 136D. By connecting the second connecting part 136 to the front surface of the second support part 126, the frame parts 136B function as perimeter-wall parts that are disposed at (along) portions of perimeter-edge portions of the front surface of the second support part 126.

The cover 124 covers the temperature-detecting device 121. More specifically, the cover 124 covers the temperature-detecting device 121, which is supported by the first support part 125. In addition, the cover 124 covers at least a portion of the wiring patterns 123, which are disposed on the first support part 125. The cover 124 protects the temperature-detecting device 121. The cover 124 protects at least a portion of the wiring patterns 123. It is noted that FIG. 24 shows the temperature-detecting unit 100C in the state in which the cover 124 is omitted.

By connecting the first connecting part 135 to the front surface of the first support part 125, a recessed part (recess), which is defined by the frame part 135B and the front surface of the first support part 125, is provided in the interior of the frame part 135B. The cover 124 is disposed in the recessed part defined by the frame part 135B and the front surface of the first support part 125.

As shown in FIGS. 21 and 24, the temperature-detecting unit 100C, which comprises the temperature-detecting device 111, is disposed in the recessed part (recess) 56, which is provided in the insulator 34. One recessed part 56 is provided in the insulator 34. The recessed part 56 is disposed at a lower portion of the insulator 34. In the circumferential direction, the location of the recessed part 56 and the location of at least a portion of the coupling part 48 are the same.

At least a portion of the recessed part 56 is provided at (in) a front-end portion of the corresponding tooth-covering part 42. At least a portion of the recessed part 56 is provided on (in) the front-insulator part 40.

The same as in the embodiment described above, the recessed part 56 includes the first recessed part (first recess) 57 and the second recessed part (second recess) 58. The first recessed part 57 is provided at (on) a front-end portion of the tooth 38. The second recessed part 58 is provided at (on) a front-end portion of the yoke 37.

The support member 122 is disposed in the recessed part 56. More specifically, the first support part 125 of the support member 122 is disposed in the first recessed part 57 and the second support part 126 of the support member 122 is disposed in the second recessed part 58.

The first support part 125 is disposed on (at, in thermal contact with) a front-end surface of the corresponding tooth 38. The second support part 126 is disposed on (at, adjacent) a front-end surface of the yoke 37.

As shown in FIG. 21, when the temperature-detecting unit 100C has been removed from the stator 22C, the front-end surface of the stator core 33 in the interior of the recessed part 56 is exposed, the front-end surface of the corresponding tooth 38 in the interior of the first recessed part 57 is exposed, and the front-end surface of the yoke 37 in the interior of the second recessed part 58 is exposed.

When the support member 122 has been disposed in the recessed part 56, a rear surface of the support member 122 opposes (faces, directly contacts) the front-end surface of the stator core 33. More specifically, at least a portion of a rear surface of the first support part 125 makes contact with the front-end surface of the corresponding tooth 38, and at least a portion of a rear surface of the second support part 126 makes contact with the front-end surface of the yoke 37.

As shown in FIG. 25, in the axial direction (front-rear direction), the recessed part 56 is disposed between one of the teeth 38 and the coil 35 surrounding that tooth 38. At least a portion of the recessed part 56 is provided between the tooth 38 and the coil 35. At least the first recessed part 57 is provided between the tooth 38 and the coil 35.

When the temperature-detecting unit 100C has been disposed in the recessed part 56, the first support part 125 is disposed between the tooth 38 and the coil 35, the temperature-detecting device 121 is disposed between the first support part 125 and the coil 35, and at least a portion of the cover 124 is disposed between the temperature-detecting device 121 and the coil 35. Owing to the cover 124, the temperature-detecting device 121 and the coil 35 do not contact each other. Owing to the first support part 125, the temperature-detecting device 121 and the tooth 38 do not contact each other. Heat from the coil 35 is transmitted (thermally conducted) to the temperature-detecting device 121 via the cover 124. Thus, the temperature-detecting device 121 detects the temperature of the coil 35 through the cover 124.

Next, an exemplary method of manufacturing the stator 22B will be explained. After the insulator 34 has been fixed to the stator core 33, the temperature-detecting unit 100B is disposed in the recessed part 56 of the insulator 34. More specifically, the temperature-detecting unit 100B is disposed in the recessed part 56 such that the rear surface of the support member 112 and the cover 114 opposes the front-end surface of the stator core 33. After the temperature-detecting unit 100B has been disposed in the recessed part 56, the coils 35 are respectively wound on the teeth 38 via (over, around) the tooth-covering parts 42 and in case of the coil 35 having the temperature-detecting unit 100B associated therewith, also via (over, around) the first support part 115. Thereafter, as described above, the busbar unit 36 is fixed to the front-insulator part 40, and then the sensor unit 24 is connected to the busbar unit 36.

Effects

According to the present second embodiment as explained above, because the support member 122 comprises the printed wiring board, the stator 22C, in which the temperature-detecting device 121 is disposed, can be manufactured at a lower cost. In addition, the temperature-detecting device 121 can suitably detect the temperature of the stator 22C.

Fourth Embodiment

A fourth embodiment will now be explained. In the explanation below, structural elements that are identical or equivalent to those in the first-to-third embodiments described above are assigned identical symbols, and explanations of those structural elements are abbreviated or omitted.

Temperature-Detecting Unit

Figure 26:
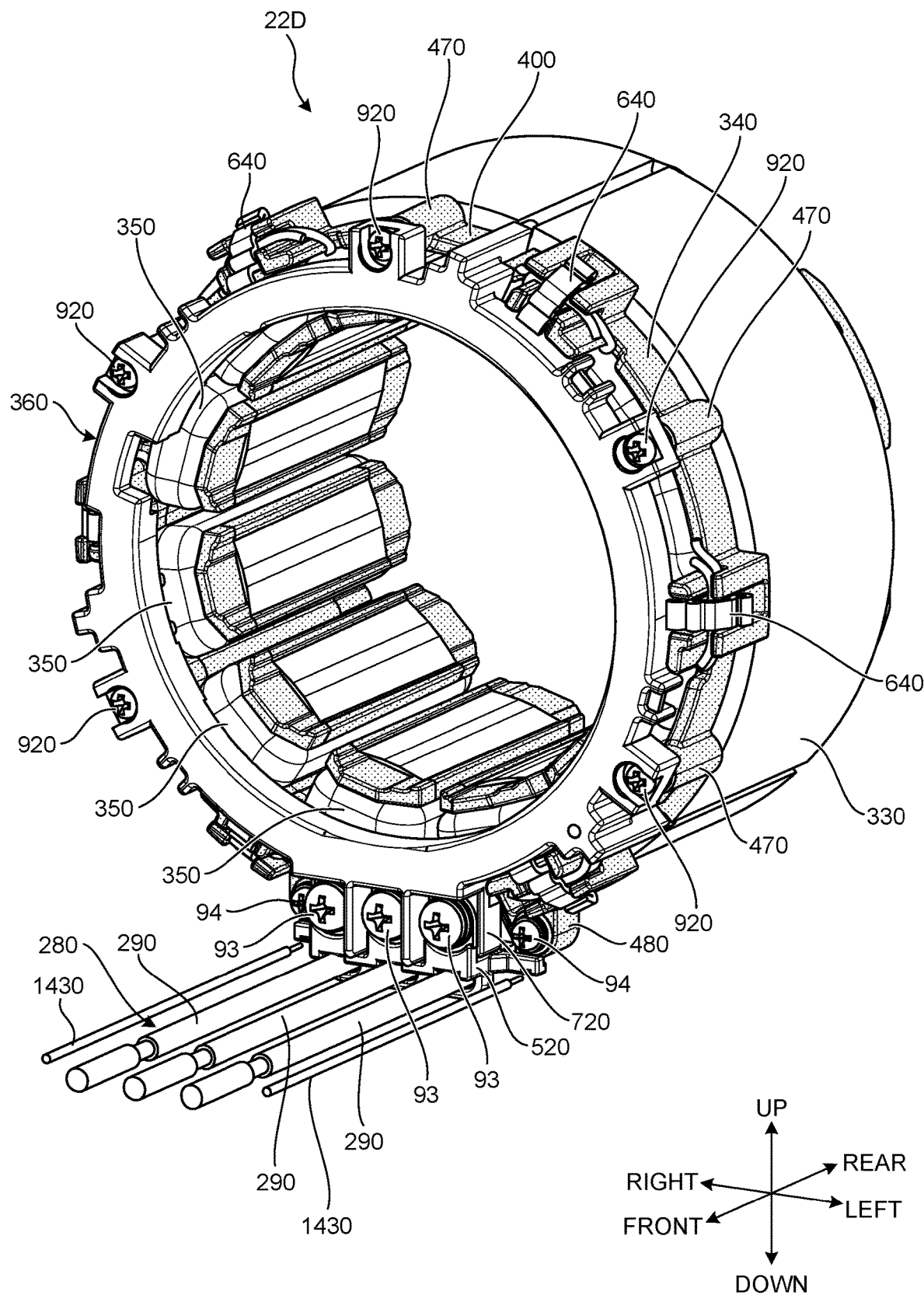
FIG. 26 is an oblique view, viewed from the front, that shows the stator according to a fourth embodiment of the present teachings.
Figure 27:
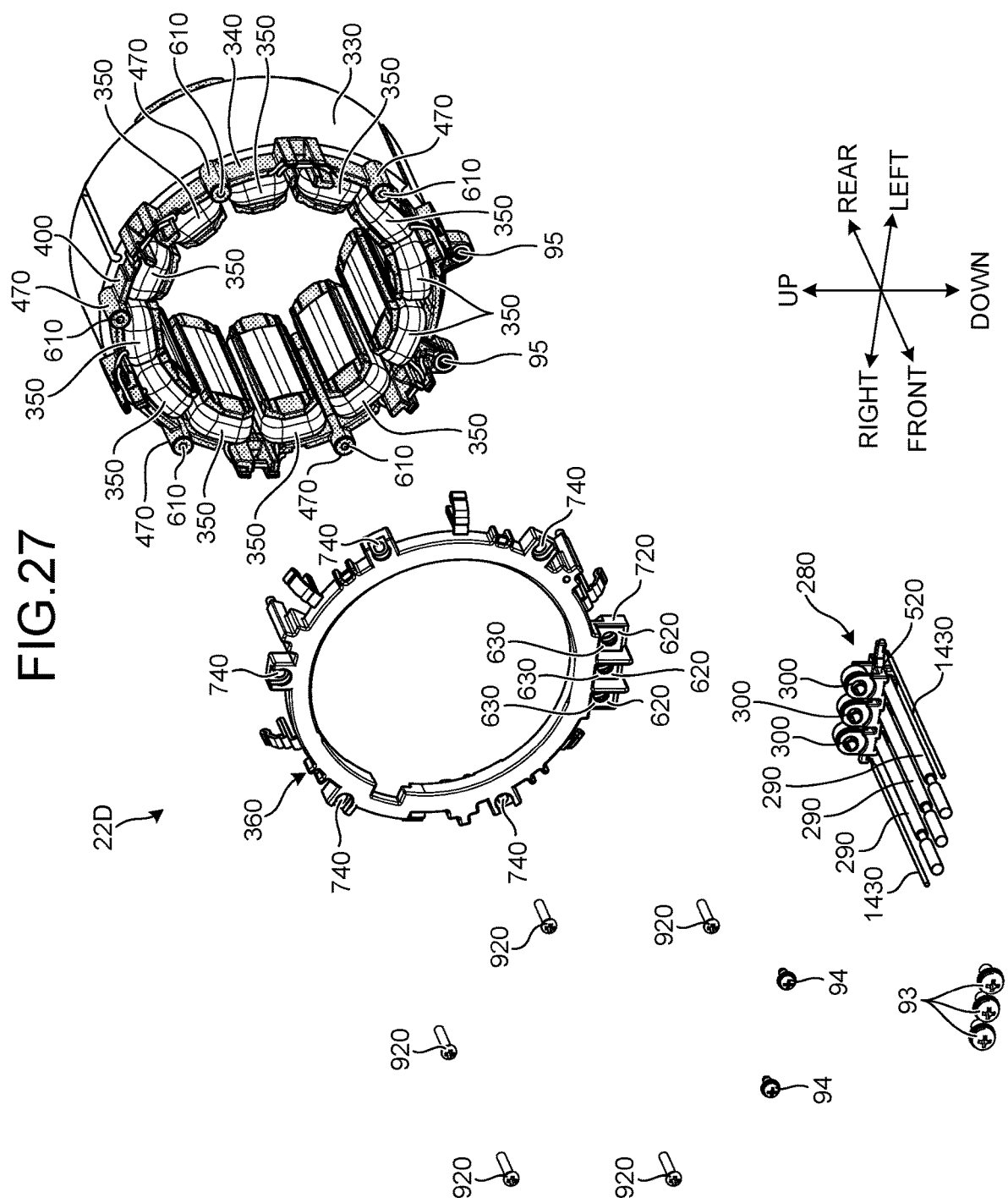
FIG. 27 is an exploded, oblique view, viewed from the front, that shows the stator according to the fourth embodiment.
Figure 29:
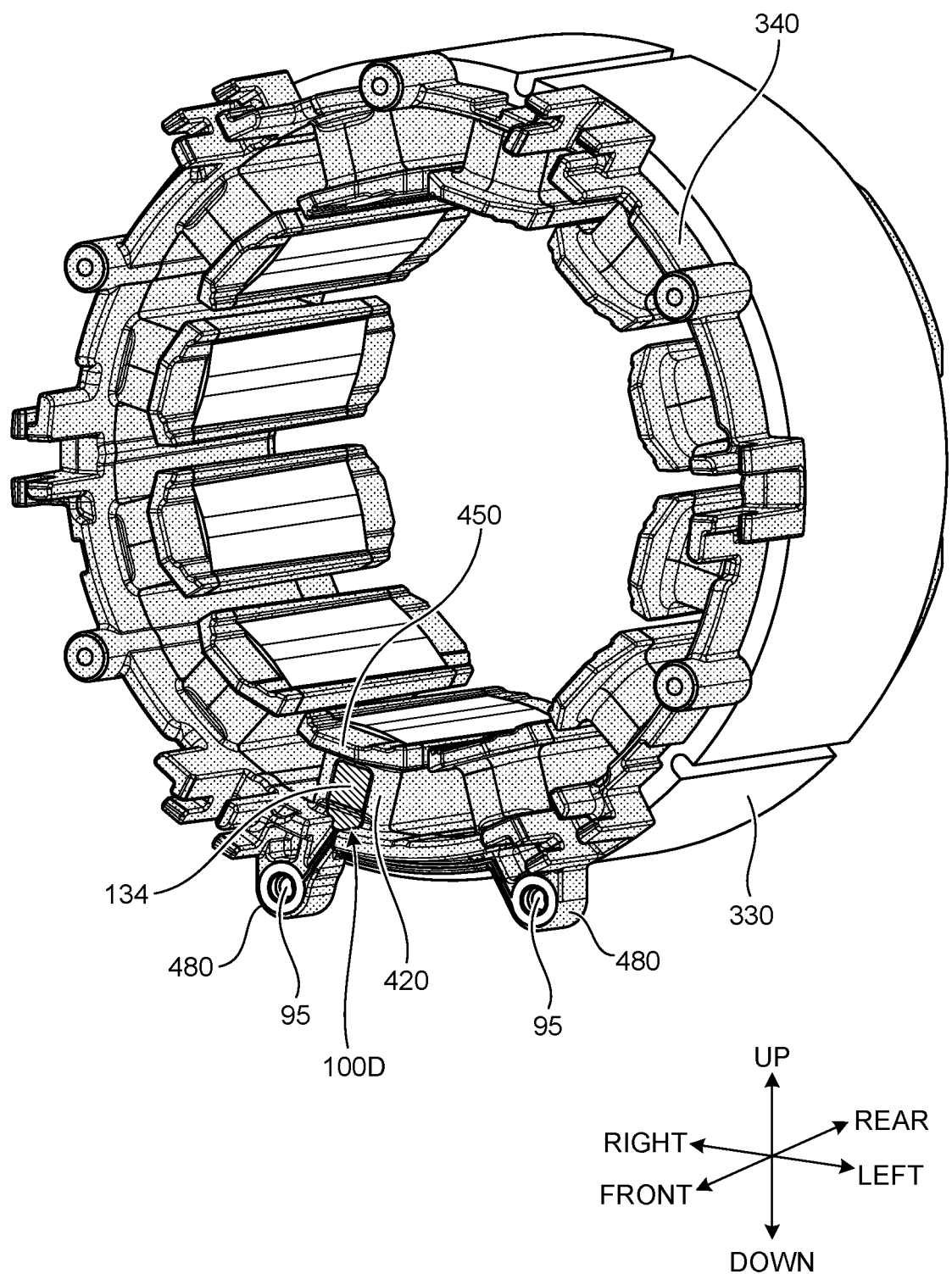
FIG. 29 is an oblique view, viewed from the front, that shows the stator core and the insulator according to the fourth embodiment.
Figure 30:
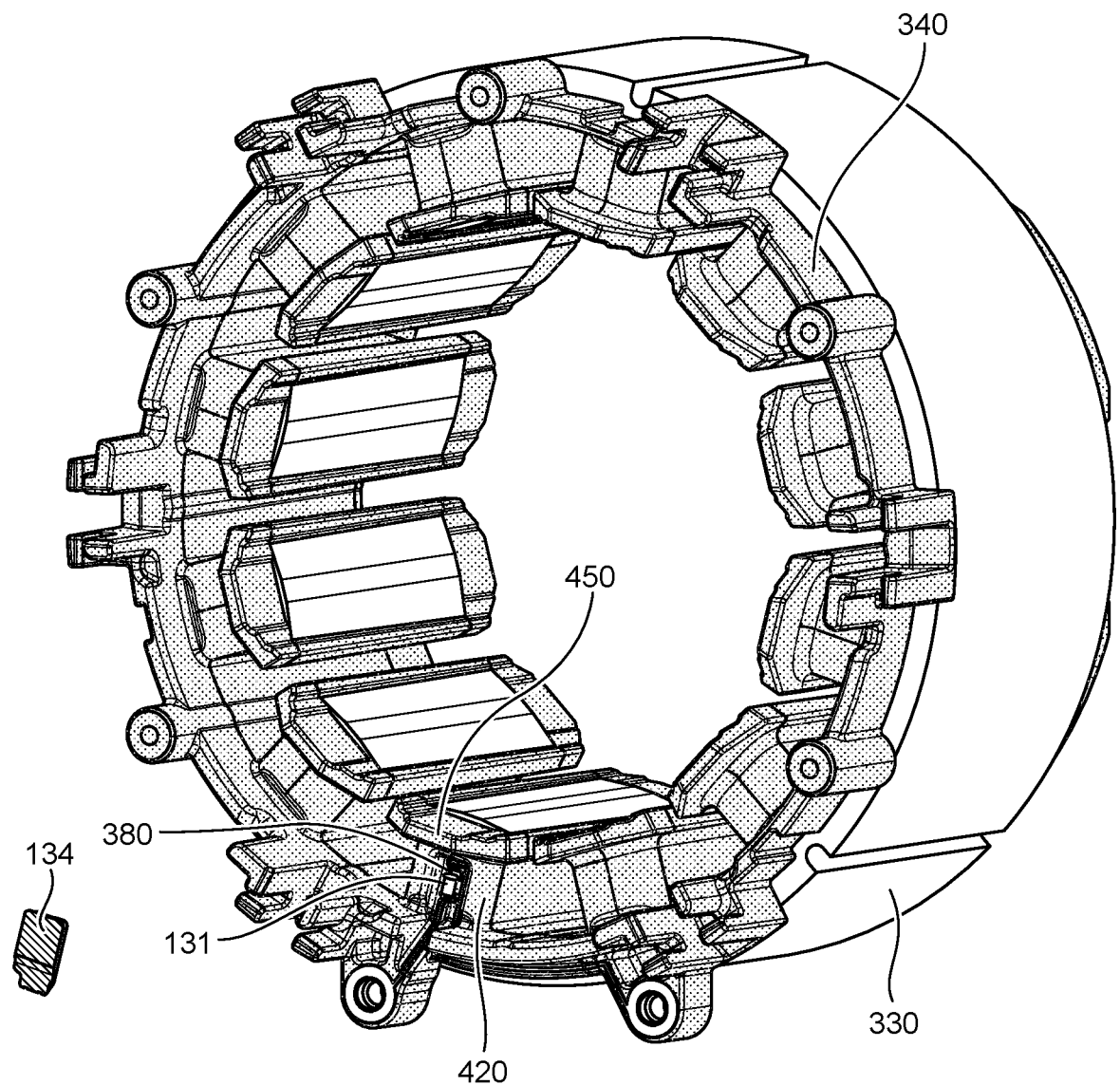
FIG. 30 is an exploded, oblique view, viewed from the front, that shows the stator core, the insulator, and a cover according to the fourth embodiment.

FIG. 26 is an oblique view, viewed from the front, that shows a stator 22D according to the present fourth embodiment. FIG. 27 is an exploded, oblique view, viewed from the front, that shows the stator 22D according to the present embodiment. FIG. 28 is an oblique view, viewed from the front, that shows a stator core 330, an insulator 340, and coils 350 according to the present embodiment. FIG. 29 is an oblique view, viewed from the front, that shows the stator core 330 and the insulator 340 according to the present embodiment. FIG. 30 is an exploded, oblique view, viewed from the front, that shows the stator core 330, the insulator 340, and a cover 134 according to the present embodiment. FIG. 31 shows a temperature-detecting device 131 and wiring patterns 133 according to the present embodiment.

Temperature-Detecting Unit

The stator 22D comprises the stator core 330, the insulator 340, the coils 350, a busbar unit 360, and a power-supply-line unit 280.

The insulator 340 is fixed to the stator core 330. The insulator 340 is fixed to the stator core 330 by, for example, insert molding (injection molding). A plurality of the coils 350 is provided. In the present embodiment, 12 of the coils 350 are provided. The coils 350 are fixed to the insulator 340.

As shown in FIGS. 26-28, the insulator 340 comprises a front-insulator part 400, screw-boss parts 470, and coupling parts 480. Screw holes 610 are respectively provided in the screw-boss parts 470. The coupling parts 480 are provided at lower portions of the front-insulator part 400. In addition, as shown in FIGS. 30 and 31, the insulator 340 comprises tooth-covering parts 420, which cover surfaces of the teeth 380 of the stator core 330, and coil-stop parts 450, which are respectively connected to radially-inward portions of the tooth-covering parts 420.

The busbar unit 360 comprises a plurality of fusing terminals 640. A plurality of openings 740 is provided along outer-perimeter portions of the busbar unit 360. Screws 920 are respectively inserted into the screw holes 610 via the openings 740. The busbar unit 360 and the insulator 340 are fixed to each other by the plurality of screws 920.

The busbar unit 360 comprises recessed parts 620, in which external terminals 630 of the busbar unit 360 are disposed. The recessed parts 620 are provided on a coupling part 720 of the busbar unit 360. The coupling part 720 is disposed at a lower portion of the busbar unit 360. Three of the recessed parts 620 are provided. The external terminals 630 are disposed in the three recessed parts 620.

The power-supply-line unit 280 comprises three power-supply lines 290, three connection terminals 300, two signal wires 1430, and a power-supply-line holder 520.

The same as in the embodiments described above, the power-supply lines 290 supply drive currents to the coils 350 via the connection terminals 300 and the busbar unit 360.

The power-supply-line holder 520 holds the power-supply lines 290, the connection terminals 300, and the signal wires 1430. The power-supply-line holder 520 is coupled to the coupling part 720 of the busbar unit 360.

The connection terminals 300 of the power-supply-line unit 280 are respectively disposed in the recessed parts 620 of the coupling part 720. In the recessed parts 620, the connection terminals 300 and the external terminals 630 are fixed to each other by respective screws 93. Each of the connection terminals 300 and each of the external terminals 630 has a ring shape. In the state in which the screws 93 have been inserted into the interiors of the connection terminals 300 and the interiors of the external terminals 630, the screws 93 are inserted into the screw holes provided in the coupling part 720. Thereby, the connection terminals 300 and the external terminals 630 are electrically connected to each other, and the power-supply-line holder 520 and the coupling part 720 of the busbar unit 360 are fixed to each other by the screws 93.

The signal wires 1430 are fixed to the coupling parts 480 of the front-insulator part 400 by screws 94. Screw holes 95 are respectively provided in the coupling parts 480. The screws 94 are respectively inserted into the screw holes 95. Two of the screw holes 95 are provided. Each of the screws 94 has a screw (thread) portion and a head portion. The screws 94 are respectively inserted into the screw holes 95 from forward of the coupling parts 480. The screw portions of the screws 94 are respectively inserted into the screw holes 95 such that the end portions of the signal wires 1430 are sandwiched between the head portions of the screws 94 and the front surfaces of the coupling parts 480. Owing to the end portions of the signal wires 1430 being sandwiched between the head portions of the screws 94 and the front surfaces of the coupling parts 480, the signal wires 1430 and the coupling parts 480 are fixed to each other by the screws 94.

As shown in FIG. 31, a recessed part 560 is provided on (in) the tooth-covering part 420. The temperature-detecting device 131 of a temperature-detecting unit 100D is disposed in the interior of the recessed part 560. In the interior of the recessed part 560, a front-end surface of the tooth 380 is exposed. In the present fourth embodiment, the temperature-detecting device 131 is not supported by (on) a support member but is disposed on a front-end surface of the tooth 380. The wiring patterns 133 are electrically connected to the temperature-detecting device 131. At least a portion of the wiring patterns 133 is disposed on the front-end surface of the tooth 380. At least a (another) portion of the wiring patterns 133 is disposed on the insulator 340.

The wiring patterns 133 comprise: terminal parts (pads) 133A, which are connected to the temperature-detecting device 131; terminal parts (pads) 133B, which are respectively disposed around the screw holes 95; and connection-line parts (conductive traces) 133C, which electrically connect the terminal parts 133A and the terminal parts 133B. The terminal parts 133A are disposed on the front-end surface of the tooth 380. The terminal parts 133B are respectively disposed around the screw holes 95 on the front surfaces of the coupling parts 480. A portion of the connection-line parts 133C is disposed on the front-end surface of the tooth 380, and a (another) portion of the connection-line parts 133C is disposed on the front surface of the front-insulator part 400.

As shown in FIGS. 29 and 30, the temperature-detecting device 131 is covered by the cover 134. The cover 134 is disposed in the recessed part 560. FIG. 31 shows the stator core 330 and the insulator 340 in the state in which the cover 134 is omitted.

The signal wires 1430 are electrically connected to the respective terminal parts 133B. When the end portions of the signal wires 1430 have been brought into contact with the respective terminal parts 133B of the wiring patterns 133, owing to the screw portions of the screws 94 being inserted into the screw holes 95, the signal wires 1430 are sandwiched between the head portions of the screws 94 and the front surfaces of the coupling parts 480. Furthermore, owing to the screw portions of the screws 94 being respectively inserted into the screw holes 95, the screws 94 can fix the signal wires 1430 and the coupling parts 480 of the insulator 340 to each other in the state in which the end portions of the signal wires 1430 have been brought into contact with the terminal parts 133B of the wiring patterns 133.

Effects

According to the present embodiment as explained above, the temperature-detecting device 131 is disposed on one of the teeth 380 of the stator 22D, and the cover 134 covers the temperature-detecting device 131. The coils 350 are wound on the teeth 380 via (over, around) the cover 134 and the tooth-covering part 420.

According to the above-mentioned configuration, because the coil 350 is wound on the tooth 380 via (over, around) the cover 134, which covers the temperature-detecting device 131, and the tooth-covering part 420, it is possible to manufacture the stator 22D, in which the temperature-detecting device 131 is disposed, at a lower cost.

In the present embodiment, the wiring patterns 133 are electrically connected to the temperature-detecting device 131. The power-supply lines 290 supply drive currents to the coils 350. The power-supply-line holder 520 holds the power-supply lines 290 and the signal wires 1430. The screws 94 fix the signal wires 1430 and the insulator 340 to each other. At least a portion of the wiring patterns 133 is disposed on the insulator 340. The screws 94 respectively fix the signal wires 1430 and the insulator 340 to each other in the state in which the signal wires 1430 have been brought into contact with the wiring patterns 133.

According to the above-mentioned configuration, because the signal wires 1430 and the wiring patterns 133 are connected by the screws 94, it is possible to manufacture the stator 22D, in which the temperature-detecting device 131 is disposed, at a lower cost.

Fifth Embodiment

A fifth embodiment will now be explained. In the explanation below, structural elements that are identical or equivalent to those in the preceding embodiments described above are assigned identical symbols, and explanations of those structural elements are abbreviated or omitted.

Figure 32:
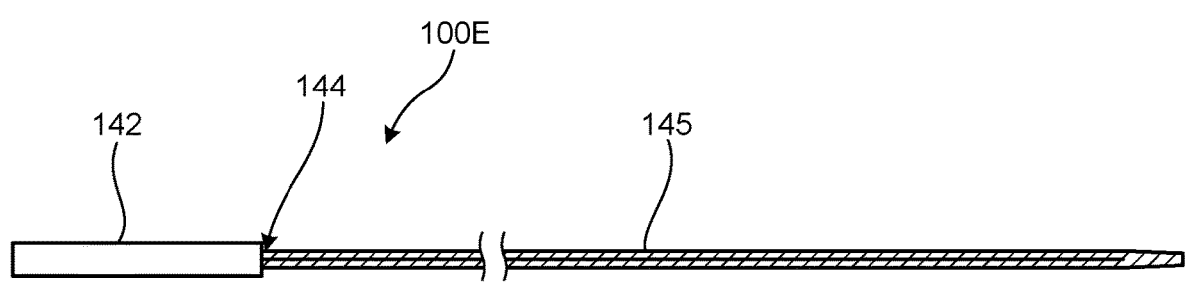
FIG. 32 shows the temperature-detecting unit according to a fifth embodiment of the present teachings.

FIG. 32 shows a temperature-detecting unit 100E according to the present fifth embodiment. The temperature-detecting unit 100E comprises a holder 142 and a lead wire 145. A temperature-detecting device, such as a thermistor, is disposed in the interior of the holder 142. The holder 142 is formed of a thermally conductive polyphenylene sulfide (PPS). The lead wire 145 is connected to the temperature-detecting device, which is disposed in the interior of the holder 142. An epoxy resin, which serves as a filler 144, is disposed at (along) the boundary between the holder 142 and the lead wire 145.

The temperature-detecting unit 100E shown in FIG. 32 may be disposed in any of the stators (22A, 22B, 22C, 22D) described above. The holder 142 may be disposed around the tooth.

Other Embodiments

In the embodiments described above, it is assumed that the electric work machine 1 is an impact driver, which is one type of power tool according to the present teachings. However, power tools according to the present teachings are not limited to being an impact driver. Illustrative examples of a power tool include a driver-drill, a hammer driver-drill, an angle drill, a screwdriver, a hammer, a hammer drill, a circular saw, and a reciprocating saw.

In the alternative, the electric work machine 1 may be a horticultural tool (outdoor power equipment). Illustrative examples of a horticultural tool according to the present teachings include a chain saw, a hedge trimmer, a lawn mower, a mowing machine, and a blower.

In the alternative, the electric work machine may be a vacuum cleaner.

In the embodiments described above, it is assumed that the battery pack 17 mounted on the battery-mounting part is used as the electric power supply of the electric work machine. However, a commercial power supply (AC power supply) may be used as the power supply of the electric work machine.

In each of the first to fourth embodiments, a single temperature-detecting unit was utilized in each stator. However, in modified embodiments of the present teachings, two or more of the temperature-detecting units may be provided in a single stator of any of the embodiments described above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
2 Housing
3 Rear case
4 Hammer case
5 Battery-mounting part
6 Motor
7 Fan
8 Anvil
9 Controller
10 Trigger switch
11 Forward/reverse change lever
12 Operation panel
13 Light
14 Motor-housing part
15 Grip part
16 Battery-connection part
17 Battery pack
18 Air-intake port
19 Air-exhaust port
20 Insertion hole
21 Chuck mechanism
22A Stator
22B Stator
22C Stator
22D Stator
23 Rotor
24 Sensor unit
25 Rotor core
26 Permanent magnet
27 Rotor shaft
28 Power-supply-line unit
29 Power-supply line
29U Power-supply line
29V Power-supply line
29W Power-supply line
30 Connection terminal
30U Connection terminal
30V Connection terminal
30W Connection terminal
33 Stator core
34 Insulator
35 Coil
36 Busbar unit
37 Yoke
38 Tooth
39 Inner-wall part
40 Front-insulator part
41 Rear-insulator part
42 Tooth-covering part
43 Coil-stop part
44 Coil-stop part
45 Coil-stop part
46 Wire-support part
47 Screw-boss part
48 Coupling part
49 Protruding part
50 Protruding part
51 Connection wire
52 Power-supply-line holder
53 Retaining part
54 Plate part
55 Hook part
56 Recessed part (recess)
57 First recessed part (first recess)
58 Second recessed part (second recess)
61 Screw hole
62 Recessed part
63 External terminal
63U External terminal
63V External terminal
63W External terminal
64 Fusing terminal
64U Fusing terminal
64V Fusing terminal
64W Fusing terminal
65 Short-circuiting member
65U Short-circuiting member
65V Short-circuiting member
65W Short-circuiting member
66 Insulating member
67 Base part
68 First screw-boss part
69 Second screw-boss part
70 Positioning pin
71 Positioning, recessed part
72 Coupling part
73 Screw hole 74 Opening
75 Support part
76 Sensor board
77 Connector
78 Rotation sensor
79 Plate part
82 Insulating member
87 Screw
88 Opening
89 Positioning hole
92 Screw
93 Screw
94 Screw
95 Screw hole
100A Temperature-detecting unit
100B Temperature-detecting unit
100C Temperature-detecting unit
100D Temperature-detecting unit
100E Temperature-detecting unit
101 Temperature-detecting device
102 Support member
103 Wiring pattern
103A Terminal part
103B Terminal part
103C Connection-line part
104 Cover
104A First cover part
104B Second cover part
105 First support part (first support)
105A Plate part (plate)
105B Perimeter-wall part (perimeter wall)
105C Recessed part
106 Second support part (second support)
106A Plate part
106B Perimeter-wall part
106C Recessed part
107 Partition wall
108 Groove
111 Temperature-detecting device
112 Support member
113 Wiring pattern
113A Terminal part
113B Terminal part
113C Connection-line part
113D Connection-ring part
114 Cover
114A First cover part
114B Second cover part
115 First support part (first support)
115A Plate part (plate)
115B Perimeter-wall part (perimeter wall)
115C Recessed part
116 Second support part (first support)
116A Plate part
116B Perimeter-wall part
116C Recessed part
119 Through hole
121 Temperature-detecting device
122 Support member
123 Wiring pattern
123A Terminal part
123B Terminal part
123C Connection-line part
124 Cover
125 First support part
126 Second support part
129 Support hole
131 Temperature-detecting device
132 Connecting member
133 Wiring pattern
133A Terminal part
133B Terminal part
133C Connection-line part
135 First connecting part
135B Frame part
135C Opening
136 Second connecting part
136B Frame part
136C Opening
136D Partition part
136E Protruding part
134 Cover
142 Holder
143 Signal wire
144 Filler
145 Lead wire
280 Power-supply-line unit
290 Power-supply line
300 Connection terminal
330 Stator core
340 Insulator
350 Coil
360 Busbar unit
380 Tooth
400 Front-insulator part
420 Tooth-covering part
450 Coil-stop part
470 Screw-boss part
480 Coupling part
520 Power-supply-line holder
560 Recessed part
610 Screw hole
620 Recessed part
630 External terminal
640 Fusing terminal
720 Coupling part
740 Opening
920 Screw
1430 Signal wire
AX Rotational axis

The invention claimed is:
1. An electric work machine comprising:
a motor comprising a rotor configured to rotate about a rotational axis relative to a stator;
an output part configured to be driven, directly or indirectly, by the rotor;
a support member comprising a first support; and
a temperature-detecting device;
wherein:
the stator comprises:
a stator core comprising teeth that radially protrude from a yoke;
an insulator having tooth-covering parts that respectively cover at least a portion of surfaces of the teeth, the insulator being fixed to the stator core; and
coils are respectively wound on the teeth over the respective tooth-covering parts;
a recess is defined in the insulator and at least a portion of the recess is provided between one of the teeth and the coil surrounding said one of the teeth in an axial direction, the recess including a first recess provided at or adjacent an end portion of said one of the teeth in an axial direction;

the first support is disposed in the first recess; and the temperature-detecting device is supported in the first recess on the first support.

2. The electric work machine according to claim 1, wherein:

the first support is disposed between said one of the teeth and the coil surrounding said one of the teeth; and the temperature-detecting device is disposed between the first support and the coil surrounding said one of the teeth.

3. The electric work machine according to claim 2, wherein:

the first support is disposed on an end surface of said one of the teeth on a first side in the axial direction; and the temperature-detecting device is disposed on a surface of the first support on the first side in the axial direction.

4. The electric work machine according to claim 3, wherein:

the first support comprises a perimeter wall disposed along a perimeter-edge portion of a surface of a plate on the first side in the axial direction; and the temperature-detecting device is disposed on the surface of the plate on the first side in the axial direction.

5. The electric work machine according to claim 3, further comprising:

wiring patterns electrically connected to the temperature-detecting device;

wherein the wiring patterns are disposed on the surface of the support member on the first side in the axial direction.

6. The electric work machine according to claim 1, wherein:

the first support is disposed between said one of the teeth and the coil surrounding said one of the teeth; and the temperature-detecting device is disposed between the first support and said one of the teeth.

7. The electric work machine according to claim 6, wherein:

the first support is disposed on an end surface of said one of the teeth on a first side in the axial direction; and the temperature-detecting device is disposed on a surface of the first support part on a second side in the axial direction.

8. The electric work machine according to claim 7, wherein:

the first support comprises a perimeter wall disposed along a perimeter-edge portion of a surface of a plate on the second side in the axial direction; and the temperature-detecting device is disposed on the surface of the plate on the second side in the axial direction.

9. The electric work machine according to claim 7, further comprising:

wiring patterns electrically connected to the temperature-detecting device;

wherein:

a portion of the wiring patterns is disposed on the surface of the support member on the second side in the axial direction; and a portion of the wiring patterns is disposed on the surface of the support member on the first side in the axial direction.

10. The electric work machine according to claim 9, wherein:

the support member has a through hole that passes through the surface of the support member on the second side in the axial direction and the surface of the support member on the first side in the axial direction; and a portion of the wiring patterns disposed on the surface of the support member on the second side in the axial direction is electrically connected to a portion of the wiring patterns disposed on the surface of the support member on the first side in the axial direction via the through hole.

11. The electric work machine according to claim 1, wherein:

the recess includes a second recess provided radially outward of the first recessed recess and connected to the first recess;

the support member comprises a second support disposed in the second recess; and in a circumferential direction, the second support part has a larger dimension than the first support.

12. The electric work machine according to claim 11, wherein the second recess is provided at an axial end portion of the yoke.

13. The electric work machine according to claim 1, further comprising a cover, which covers the temperature-detecting device supported by the support member.

14. An electric work machine comprising:

a motor comprising a rotor configured to rotate about a rotational axis relative to a stator;

an output part configured to be driven, directly or indirectly, by the rotor;

a support member having a first support part and a second support part that are partitioned by a partition wall;

a temperature-detecting device disposed on or in the first support part;

wiring patterns electrically connected to the temperature-detecting device, the wiring patterns being disposed over the first support part and the second support part and through grooves defined in the partition wall; and a cover, which covers the temperature-detecting device and the wiring patterns;

wherein:

the stator comprises:

a stator core including teeth that radially protrude from a yoke;

an insulator having tooth-covering parts that respectively cover at least a portion of surfaces of the teeth and is fixed to the stator core; and coils respectively wound on the teeth over the cover and the respective tooth-covering parts; and the cover includes:

a first cover part, which covers the temperature-detecting device and a first portion of the wiring patterns disposed in or on the first support part; and a second cover part, which covers a second portion of the wiring patterns disposed in the grooves.

15. The electric work machine according to claim 14, wherein the support member is disposed in a recess defined in the insulator.

16. The electric work machine according to claim 14, wherein:

a recess is defined in the insulator and includes a first recess defined in an axial end surface of one of the teeth and a second recess located radially outward of the first recess, the first and second recesses being connected;

the first support part is disposed in the first recess; and the second support part is disposed in the second recess.

17. An electric work machine, comprising:
a motor comprising:
a stator including a stator core having teeth;
an insulator fixed to the stator core;
coils respectively wound on the teeth over the insulator; and
a rotor configured to rotate about a rotational axis relative to the stator;
an output part configured to be driven, directly or indirectly, by the rotor;
a temperature-detecting device disposed on or in the stator;
wiring patterns electrically connected to the temperature-detecting device;
power-supply lines configured to supply drive currents to the coils;
a power-supply-line holder, which holds the power-supply lines and signal wires; and
screws fixing the signal wires and the insulator to each other;
wherein:
at least a portion of the wiring patterns is disposed on the insulator;
the screws respectively fix the signal wires and the insulator to each other in the state in which the signal wires are in contact with the wiring patterns; and
end portions of the signal wires are respectively sandwiched between head portions of the screws and front surfaces of coupling parts provided on the insulator.

18. The electric work machine according to claim 17, further comprising a cover, which covers the temperature-detecting device.

19. The electric work machine according to claim 17, wherein:
the wiring patterns include terminal pads respectively disposed on the front surfaces of the coupling parts around screw holes defined in the coupling parts;
the screws are respectively threadably fastened in the screw holes; and
the end portions of the signal wires respectively electrically contact the terminal pads.

20. The electric work machine according to claim 19, further comprising a cover, which covers the temperature-detecting device.

* * * * *